(12) United States Patent
Lapuschkin et al.

(10) Patent No.: US 12,061,966 B2
(45) Date of Patent: Aug. 13, 2024

(54) RELEVANCE SCORE ASSIGNMENT FOR ARTIFICIAL NEURAL NETWORKS

(71) Applicants: Fraunhofer-Gesellschaft zur Foerderung der Angewandten Forschung e.V., Munich (DE); Technische Universitaet Berlin, Berlin (DE)

(72) Inventors: Sebastian Lapuschkin, Berlin (DE); Wojciech Samek, Berlin (DE); Klaus-Robert Mueller, Berlin (DE); Alexander Binder, Berlin (DE); Grégoire Montavon, Berlin (DE)

(73) Assignees: Fraunhofer-Gesellschaft zur Foerderung der angewandten Forschung e.V., Munich (DE); Technische Universitaet Beriin, Berlin (DE)

(*) Notice: Subject to any disclaimer, the term of this patent is extended or adjusted under 35 U.S.C. 154(b) by 2094 days.

(21) Appl. No.: 15/710,455

(22) Filed: Sep. 20, 2017

(65) Prior Publication Data

US 2018/0018553 A1    Jan. 18, 2018

Related U.S. Application Data

(63) Continuation of application No. PCT/EP2015/056008, filed on Mar. 20, 2015.

(51) Int. Cl.
*G06N 3/04* (2023.01)
*G06F 18/2135* (2023.01)
(Continued)

(52) U.S. Cl.
CPC .......... *G06N 3/04* (2013.01); *G06F 18/2135* (2023.01); *G06F 40/279* (2020.01); *G06N 3/02* (2013.01);
(Continued)

(58) Field of Classification Search
CPC .................................. G06N 3/02; G10L 25/30
See application file for complete search history.

(56) References Cited

U.S. PATENT DOCUMENTS

2008/0195596 A1    8/2008   Sisk et al.
2009/0259651 A1   10/2009   Tankovich et al.
(Continued)

FOREIGN PATENT DOCUMENTS

BR    PI0708330 A2    5/2011
CN    103345656 A    10/2013
(Continued)

OTHER PUBLICATIONS

Olden, Julian D., Michael K. Joy, and Russell G. Death. "An accurate comparison of methods for quantifying variable importance in artificial neural networks using simulated data." Ecological modelling 178.3-4 (2004): 389-397. (Year: 2004).*

(Continued)

*Primary Examiner* — Kevin W Figueroa
(74) *Attorney, Agent, or Firm* — Perkins Coie LLP; Michael A. Glenn

(57) ABSTRACT

The task of relevance score assignment to a set of items onto which an artificial neural network is applied is obtained by redistributing an initial relevance score derived from the network output, onto the set of items by reversely propagating the initial relevance score through the artificial neural network so as to obtain a relevance score for each item. In particular, this reverse propagation is applicable to a broader set of artificial neural networks and/or at lower computational efforts by performing same in a manner so that for each neuron, preliminarily redistributed relevance scores of a set of downstream neighbor neurons of the respective neuron are distributed on a set of upstream neighbor neurons of the respective neuron according to a distribution function.

31 Claims, 19 Drawing Sheets

(51) Int. Cl.
  G06F 40/279      (2020.01)
  G06N 3/02        (2006.01)
  G06N 3/084       (2023.01)
  G06V 10/44       (2022.01)
  G06V 10/77       (2022.01)
  G10L 25/30       (2013.01)

(52) U.S. Cl.
  CPC ........... *G06N 3/084* (2013.01); *G06V 10/454* (2022.01); *G06V 10/7715* (2022.01); *G10L 25/30* (2013.01)

(56) References Cited

U.S. PATENT DOCUMENTS

| | | | |
|---|---|---|---|
| 2010/0082511 | A1 | 4/2010 | Niu et al. |
| 2011/0264659 | A1 | 10/2011 | Wang et al. |
| 2013/0066887 | A1 | 3/2013 | Downs et al. |

FOREIGN PATENT DOCUMENTS

| | | | |
|---|---|---|---|
| CN | 102016787 | B | 4/2014 |
| EP | 1006458 | A1 | 6/2000 |
| JP | H08202673 | A | 8/1996 |
| JP | H09330406 | A | 12/1997 |
| RU | 2501078 | C2 | 12/2013 |

OTHER PUBLICATIONS

Saehan, S et al., "Learning algorithm in neural network based on adjoint neuron model", IEICE Technical Report, The Institute of Electronics, Information and Communication Engineers, vol. 90, No. 262, Oct. 19, 1990, pp. 1-8.

Kang, Kai et al., "Fully Convolutional Neural Networks for Crowd Segmentation", Computer Version and Pattern Recognition, Nov. 2014.

Bishop, Christopher M., "Pattern Recognition and Machine Learning", vol. 1; Springer New York; 2006, 2006, 1-749.

Hansch, Ronnie et al., "Object Recognition from Polarimetric SAR Images", Radar Remote Sensing of Urban Areas; vol. 15 of Remote Sensing and Digital Image Processing; Springer Netherlands, 2010, 109-131.

Jia, Yangqing, "Caffe: An Open Source Convolutional Architecture for Fast Feature Embedding", http://caffe.berkeleyvision.org/, 2013.

Montavon, Gregorie et al., "Neural Networks: Tricks of the Trade", Reloaded; vol. 7700 of Lecture Notes in Computer Science (LNCS); Springer; 2nd edition, 2012.

Dahlkamp, Hendrick et al., "Self-Supervised Monocular Road Detection in Desert Terrain", Robotics: Science and Systems, 2006, 1-7.

Erhan, Dumitru et al., "Visualizing Higher-Layer Features of a Deep Network", Technical Report 1341, Jun. 9, 2009, 1-13.

Fei-Fei, Li et al., "A Bayesian Hierarchical Model for Learning Natural Scene Categories", Computer Vision and Pattern Recognition vol. 2, 2005, 524-531.

Gevrey, Muriel et al., "Review and Comparison of Methods to Study the Contribution of Variables in Artificial Neural Network Models", Ecological Modelling 160, 2003, 249-264.

Krizhevsky, Alex et al., "ImageNet Classification with Deep Convolutional Neural Networks", NIPS, 2012, 1-9.

Le, Quoc V. et al., "Building High-level Features Using Large Scale Unsupervised Learning", Proceedings of 29th International Conference on Machine Learning, Jul. 12, 2012, 8595-8598.

Lecun, Yann et al., "Convolutional Networks and Applications in Vision", IEE, 2010, 253-256.

Lecun, Yann et al., "The MNIST Database of Handwritten Digits", http://yann.lecun.com/exdb/mnist/, 1998, 1-8.

Olden, Julian D. et al., "An Accurate Comparison of Methods for Quantifying Variable Importance in Artificial Neural Networks Using Simulated Data", Ecological Modelling 178, 2004, 389-397.

Pinto, Nicolas et al., "Why is Real-World Visual Object Recognition Hard?", PLoS Computational Biology, 2004, 389-397.

Rumelhart, David E. et al., "Learning Representations by Back-Propagating Errors", Nature Publishing Group vol. 323, Oct. 9, 1986, 533-536.

Russakovsky, Olga et al., "ImageNet Large Scale Visual Recognition Challenge", Int J Comput Vis http://www.Image-net.org/challenges/LSVRC/2012/, 2015, 211-252.

Setiono, Rudy et al., "Understanding Neural Networks via Rule Extraction", Proceedings of the 14th International Joint Conference on Artificial Intelligence, 1995, 480-485.

Simonyan, Karen et al., "Deep Inside Convolutional Networks: Visualising Image Classification Models and Saliency Maps", CoRR, abs/1312.6034, Apr. 19, 2014, 1-8.

Szegedy, Christian et al., "Intriguing Properties of Neural Networks", CoRR abs/1312.6199, Feb. 19, 2014, 1-10.

Mola, Paul et al., "Rapid Object Detection Using a Boosted Cascade of Simple Features", Accepted Conference on Computer Vision and Pattern Recognition, 2001, 511-518.

Walker, Ross F. et al., "Classification of Cervical Cell Nuclei Using Morphological Segmentation and Textural Feature Extraction", Australian New Zealand Conference on Intelligent Information Systems, 1994, 297-301.

Zeiler, Matthew D. et al., "Adaptive Deconvolutional Networks for Mid and High Level Feature Learning", ICCV, 2011, 2018-2025.

Zeiler, Matthew D. et al., "Visualizing and Understanding Convolutional Networks", CoRR abs/1311.2901, 2013, 1-11.

Bach, Sebastian, et al., "[Uploaded in 2 parts] On pixel-wise explanations for non-linear classifier decisions by layer-wise relevance propagation", PLOS ONE, 10(7):1-46, pp. 1-38.

Yeom, Seul-Ki, et al., "Pruning by Explaining: A Novel Criterion for Deep Neural Network Pruning", Dec. 18, 2019, 24 pp.

* cited by examiner

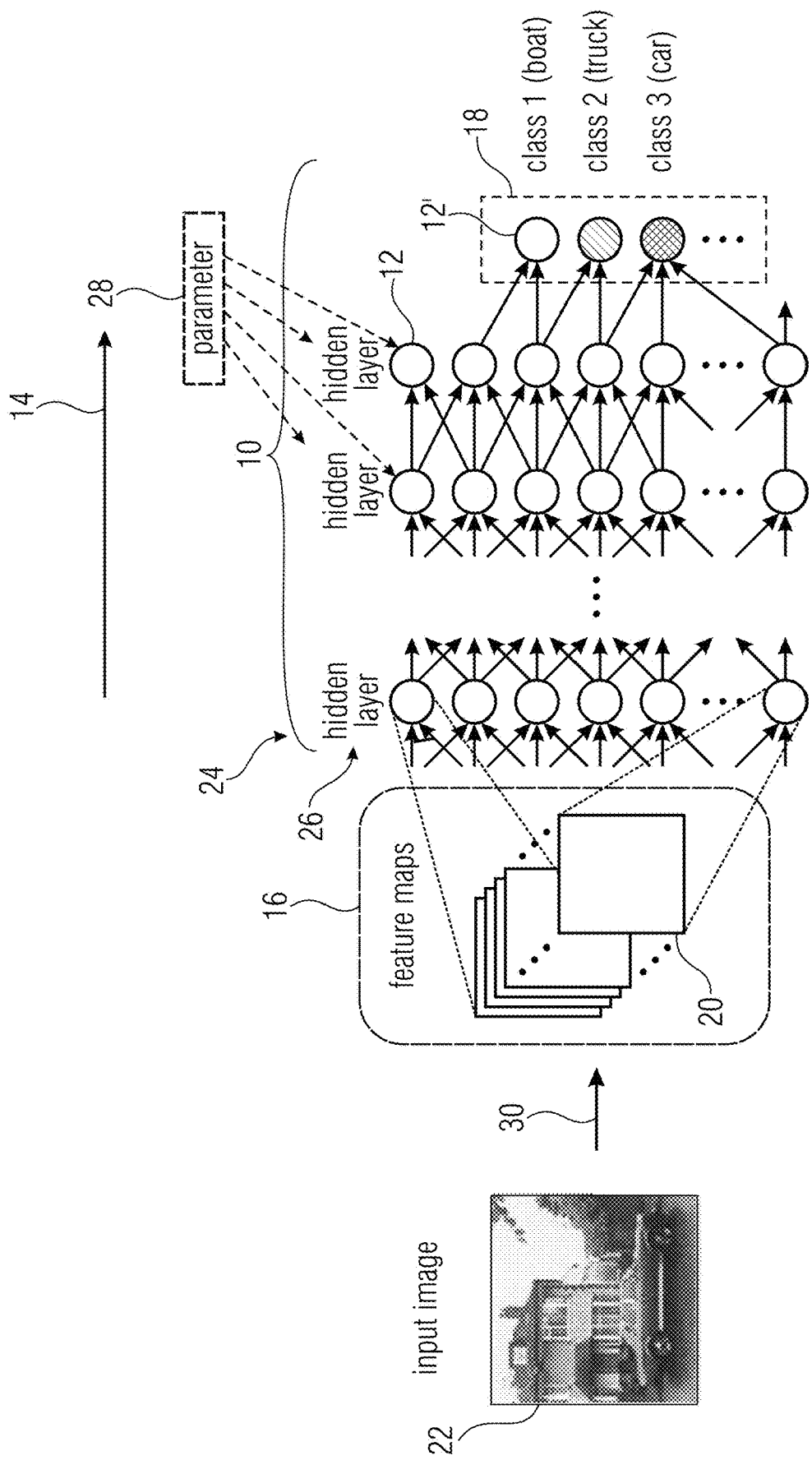

(b) Taylor approximation (a) Local gradient at prediction point

RELEVANCE SCORE ASSIGNMENT FOR ARTIFICIAL NEURAL NETWORKS

CROSS-REFERENCE TO RELATED APPLICATION

This application is a continuation of copending International Application No. PCT/EP2015/056008, filed Mar. 20, 2015, which is incorporated herein by reference in its entirety.

BACKGROUND OF THE INVENTION

The present application is concerned with relevance score assignment for artificial neural networks. Such relevance score assignment may be used, for example for region of interest (ROI) identification.

Computer programs are able to successfully solve many complex tasks such as the automated classification of images and text or to assess the creditworthiness of a person. Machine learning algorithms are especially successful because they learn from data, i.e., the program obtains a large labeled (or weakly labeled) training set and after some training phase, it is able to generalize to new unseen examples. Many banks have a system which classifies the creditworthiness (e.g. based on age, address, income etc.) of a person who applies for a credit. The main drawback of such systems is interpretability, i.e., the system usually does not provide information why and how it came to a decision (e.g. why someone is classified as not creditworthy); the knowledge and relations which determine the classification decision are rather 'implicit'.

Understanding and interpreting classification decisions is of high value in many applications as it allows to verify the reasoning of the system and provides additional information to the human expert e.g. banker, venture capital investor or medical doctor. Machine learning methods have in most cases the disadvantage of acting as a black box, not providing any information about what made them arrive at a particular decision. In general complex algorithms have much better performance than simple (linear) methods (when enough training data is available), however, they especially lack interpretability. Recently, a type of classifiers, Neural Networks, became very popular and produced excellent results. This type of methods consist of a sequence of nonlinear mappings and are especially hard to interpret.

In a typical image classification task, for example, an image (e.g. an image of a shark) may be given. See FIG. 15. The Machine learning (ML) algorithm 900 classifies the image 902 as belonging to a certain class 904 (e.g. 'images of a shark'). Note that the set 906 of classes (e.g. sharks, persons, nightlife, outdoors) is defined a priori. The algorithm 900 is a black box because it does not tell the user why it came to the decision that an image belongs to the class 'images of a shark'. An explanation for this classification decision on pixel level would be interesting, e.g. to see that the image has been classified as belonging to the class of 'images of a shark' mainly because of the shark fin. Such a "relevance map" is illustrated at 908.

Classification of images has become a key ingredient in many computer vision applications, e.g. image search [15], robotics [10], medical imaging [50], object detection in radar images [17] or face detection [49]. Neural networks [6] are widely used for these tasks and were among the top submissions in competitions on image classification and ranking such as ImageNet [11]. However, like many methods in machine learning, these models often lack a straightforward interpretability of the classifier predictions. In other words the classifier acts as a black box and does not provide detailed information about why it reaches a certain classification decision. That is, the interpretation possibility of FIG. 15 is not available.

This lack of interpretability is due to the non-linearity of the various mappings that process the raw image pixels to its feature representation and from that to the final classifier function. This is a considerable drawback in classification applications, as it hinders the human experts to carefully verify the classification decision. A simple yes or no answer is sometimes of limited value in applications, where questions like where something occurs or how it is structured are more relevant than a binary or real-valued one-dimensional assessment of mere presence or absence of a certain structure.

Several works have been dedicated to the topic of explaining neural networks. [54] is dedicated towards analyzing classifier decisions at neurons which is applicable also to the pixel level. It performs a layer-wise inversion down from output layers towards the input pixels for the architecture of convolutional networks [23]. This work is specific to the architecture of convolutional neural networks with layers of neurons with rectified linear activation functions. See [42] which establishes an interpretation of the work in [54] as an approximation to partial derivatives with respect to pixels in the input image. In a high-level sense, the work in [54] uses the method from their own predecessor work in [55] which solves optimization problems in order to reconstruct the image input, how to project the responses down towards the inputs, [54] uses rectified linear units to project information from the unfolded maps towards the inputs with one aim to ensure the feature maps to be non-negative.

Another approach which lies between partial derivatives at the input point x and a full Taylor series around a different point $x_0$ is presented in [42]. This work uses a different point $x_0$ than the input point x for computing the derivative and a remainder bias which both are not specified further but avoids for an unspecified reason to use the full linear weighting term $x-x_0$ of a Taylor series. Quantifying the importance of input variables using a neural network model has also been studied in specific areas such as ecological modeling, where [16, 34] surveyed a large ensemble of possible analyses, including, computing partial derivatives, perturbation analysis, weights analysis, and studying the effect of including and removing variables at training time. A different avenue to understanding decisions in neural network is to fit a more interpretable model (e.g. decision tree) to the function learned by the neural network [41], and extract the rules learned by this new model.

However, there is still a need for a robust, easy to implement and widely applicable concept for realizing the task of relevance score assignment for artificial neural networks.

Accordingly, it is an object of the present invention to provide a concept for assigning a relevance score to a set of items onto which an artificial neural network is applied, which concept is applicable to a broader set of artificial neural networks and/or lowers the computational efforts.

SUMMARY

An embodiment may have an apparatus for assigning a relevance score to a set of items, the relevance score indicating a relevance with respect to an application of an artificial neural network composed of neurons onto the set of items so as to map the set of items onto a network output, the apparatus being configured to redistribute an initial relevance score derived from the network output onto the set of items by reversely propagating the initial relevance score through the artificial neural network so as to obtain a relevance score for each item, wherein the apparatus is configured to perform the reverse propagation in a manner so that for each neuron, preliminarily redistributed relevance scores of a set of downstream neighbor neurons of the respective neuron are distributed to a set of upstream neighbor neurons of the respective neuron using a distribution function.

According to another embodiment, a system for data processing may have: an apparatus for assigning a relevance score to a set of items as mentioned above, and an apparatus for processing of the set of items or data to be processed and derived from the set of items with adapting the processing depending on the relevance scores.

According to another embodiment, a system for highlighting a region of interest may have: an apparatus for assigning a relevance score to a set of items as mentioned above, and an apparatus for generating a relevance graph depending on the relevance scores.

According to still another embodiment, a system for optimizing a neural network may have: an apparatus for assigning a relevance score to a set of items as mentioned above; an apparatus for applying the apparatus for assigning onto a plurality of different sets of items; and an apparatus for detecting a portion of increased relevance within the neural network by accumulating relevances assigned to the neurons of the network during the application of the apparatus for assigning onto the plurality of different sets of items, and optimizing the artificial neural network depending on the portion of increased relevance.

Another embodiment may have a method for assigning a relevance score to a set of items, the relevance score indicating a relevance with respect to an application of an artificial neural network composed of neurons onto the set of items so as to map the set of items onto a network output, the apparatus being configured to redistributing an initial relevance score derived from the network output onto the set of items by reversely propagating the initial relevance score through the artificial neural network so as to obtain a relevance score for each item, wherein the reverse propagation is performed in a manner so that for each neuron, preliminarily redistributed relevance scores of a set of downstream neighbor neurons of the respective neuron are distributed to a set of upstream neighbor neurons of the respective neuron using a distribution function.

Another embodiment may have a non-transitory digital storage medium having stored thereon a computer program for performing a method for assigning a relevance score to a set of items, the relevance score indicating a relevance with respect to an application of an artificial neural network composed of neurons onto the set of items so as to map the set of items onto a network output, the apparatus being configured to redistributing an initial relevance score derived from the network output onto the set of items by reversely propagating the initial relevance score through the artificial neural network so as to obtain a relevance score for each item, wherein the reverse propagation is performed in a manner so that for each neuron, preliminarily redistributed relevance scores of a set of downstream neighbor neurons of the respective neuron are distributed to a set of upstream neighbor neurons of the respective neuron using a distribution function, when said computer program is run by a computer.

It is a basic finding of the present application that the task of relevance score assignment to a set of items onto which an artificial neural network is applied may be obtained by redistributing an initial relevance value derived from the network output, onto the set of items by reversely propagating the initial relevance score through the artificial neural network so as to obtain a relevance score for each item. In particular, this reverse propagation is applicable to a broader set of artificial neural networks and/or at lower computational efforts by performing same in a manner so that for each neuron, preliminarily redistributed relevance scores of a set of downstream neighbor neurons of the respective neuron are distributed on a set of upstream neighbor neurons of the respective neuron according to a distribution function.

BRIEF DESCRIPTION OF THE DRAWINGS

Embodiments of the present application are described herein below in more detail with respect to the figures, among which:

FIGS. 1b and 2b show a modification of FIGS. 1a and 2a according to which the network and relevance assignment are operated on feature maps rather than pixels of an image;

DETAILED DESCRIPTION OF THE INVENTION

Before describing various embodiments of the present application with respect to block diagrams, the concepts underlying these embodiments shall first of all be described by way of a brief introduction into artificial neural networks and by then explaining the thoughts underlying the concept of the embodiments.

A neural network is a graph of interconnected nonlinear processing units that can be trained to approximate complex mappings between input data and output data. Note that the input data is e.g. the image (set of pixels) and the output is e.g. a classification decision (in the simplest case +1/−1 meaning 'yes' there is a shark or 'no' there is no shark in the image). Each nonlinear processing unit (or neuron) consists of a weighted linear combination of its inputs to which a nonlinear activation function is applied. Using the index i to denote the neurons that are incoming to neuron with index j, the nonlinear activation function is defined as:

$$x_j = g\left(\sum_i x_i w_{ij} + b_j\right)$$

where g(·) is a nonlinear monotonically increasing activation function, $w_{ij}$ is the weight connecting neuron i to neuron j and $b_j$ is a bias term. The neural network is defined by its connectivity structure, its nonlinear activation function, and its weights.

The below embodiments use a concept, which may be, and is in the subsequent description, called relevance propagation. It redistributes the evidence for a particular structure in the data as modeled by the output neurons, back to the input neurons. Thus, it seeks to produce an explanation of its own prediction in terms of input variables (e.g. pixels). Note that the concept does work for every type of (loop-free) neural network, irrespectively of the number of layers, the type of the activation function etc. Thus, it can be applied to many popular models as many algorithms can be described in terms of neural networks.

An illustration of the relevance propagation procedure is given below for a network composed of convolution/sub-sampling layers followed by a sequence of fully-connected layers.

Figure 1A:
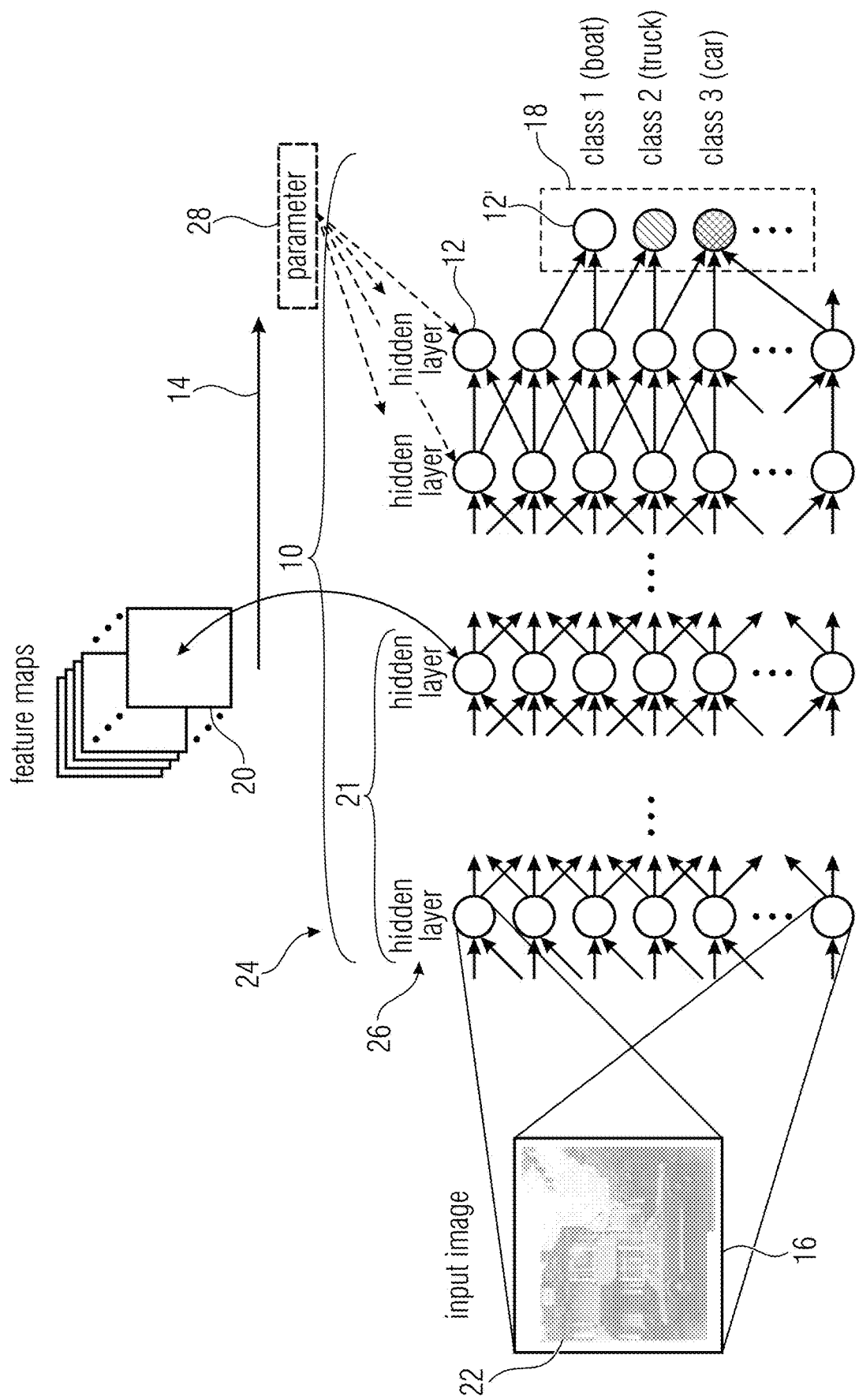
FIG. 1a shows a schematic diagram of an example of a prediction using an artificial neural network onto which a relevance score assignment using reverse propagation according to embodiments of the present invention may be applied.

In particular, FIG. 1a shows an example of an artificial neural network in a simplified exemplary manner. The artificial neural network 10 is composed of neurons 12 which are depicted in FIG. 1 as circles. The neurons 12 are interconnected to each other or interact with each other. Generally, each neuron is connected to downstream neighbor (or successor) neurons on the one hand and upstream neighbor (or predecessor) neurons on the other hand. The terms "upstream", "predecessor", "downstream" and "successor" refer to a general propagation direction 14 along which the neural network 10 operates when same is applied onto a set 16 of items so as to map the set 16 of items onto a network output 18, i.e. perform the prediction.

As shown in FIG. 1a, the set 16 of items may, for instance, be the set of pixels 22 forming an image by associating each pixel with a pixel value corresponding to a scene's color or intensity at a spatial location corresponding to the respective pixel's position in the array of pixels of the image 22. In that case, set 16 is an ordered collection of items, namely an array of pixels. In this case, the items would correspond to the individual pixel values, i.e. each item would correspond to one pixel. Later on, it will made clear that the present application is not restricted to the field of pictures. Rather, the set 16 of items may be a set of items without any order defined among the items. Mixtures therebetween may be true as well.

A first or lowest layer 24 of neurons 12 forms a kind of input of the artificial neural network 10. That is, each neuron 12 of this lowest layer 24 receives as its inputs values of at least a subset of the set 16 of items, i.e. at least a subset of the pixel values. The union of the subsets of items out of set 16, the values of which are input into a certain neuron 12 of the lowest layer 24, equals for example set 16, i.e., in case of FIG. 1a the whole image 22. In other words, for each item of set 16, its value is input into at least one of the neurons 12 of the lowest layer 24.

At the opposite side of neural network 10, i.e. at its downstream/output side, network 10 comprises one or more output neurons 12' which differ from neurons 12 in that the former lack downstream neighbor/successor neurons. After having been applied to set 16 and after having finished processing, the values stored in each output neuron 12' forms the network output 18. That is, the network output may, for instance, be a scalar. In that case, merely one output neuron 12' would be present and its value after the network's 10 operation would form the network output. As illustrated in FIG. 1, such a network output may, for instance, be a measure for a likelihood that the set 16 of items, i.e. in case of FIG. 1a the image 22, belongs to a certain class or not. The network output 18 may, however, alternatively be a vector. In that case, more than one output neuron 12' exist, and the value of each of these output neurons 12' as obtained at the end of the network's 10 operation forms a respective component of the network output vector. FIG. 1 illustrates, for example, that each component of the network output 18 is a measure measuring a likelihood that set 16 belongs to a respective class associated with the respective component, such as to a class of images "showing a boat", "showing a truck", "showing a car". Other examples are imaginable as well and will be presented herein below.

Thus, summarizing the above, the neural network comprises neurons 12 interconnected so as to map, in a forward propagation or normal operation, the set 16 of items to a neural output. In a manner similar to the output neurons 12', the value of which at the end of the network's operation form the network output 18, the items of set 16, i.e. the pixels of image 22 in the exemplary case of FIG. 1a, may be regarded as input neurons of network 10 with the neurons 12 and the layers formed thereby being intermediate neurons or intermediate layers, respectively. In particular, the input neurons may accordingly be regarded as upstream neighbor or predecessor neurons of intermediate neurons 12, namely those of layer 24, just as the output neurons 12' may form downstream neighbor/successor neurons of intermediate neurons 12 forming, for example, the highest intermediate layer of network 10 or, if interpreting the one or more output neurons 12' as forming the highest layer of network 10, the second highest layer of network 10.

FIG. 1 illustrates a simplified example of a neural network 10 according to which the neurons 12 of network 10 are strictly arranged in layers 26 in the sense that the layers 26 form a sequence of layers with the upstream neighbor/successor neurons of a certain neuron 12 all being members of the immediate lower layer relative to the layer to which the respective neuron 12 belongs, and all downstream neighbor/successor neurons being members of the immediate higher layer. However, FIG. 1 should not be interpreted as limiting the kind of neural networks 10 to which the embodiments of the present invention outlined further below may be applied with respect to this issue. Rather, this strict layered arrangement of the neurons 12 may be modified in accordance with alternative embodiments, with for instance the upstream neighbor/predecessor neurons being a subset out of neurons of more than one preceding layer and/or the downstream neighbor/successor neurons being a subset out of neurons of more than one higher layer.

Moreover, although FIG. 1 suggests that each neuron 12 would be traversed merely once during the forward propagation operation of network 10, one or more neurons 12 may be traversed two or more times. Further variation possibilities will be discussed below.

As described so far, when applying network 10 onto set 16, i.e. the image 22 in the exemplary case of FIG. 1a, network 10 performs a forward propagation operation. During this operation, each neuron 12, which has received all of its input values from its upstream neighbor/predecessor neurons, computes, by way of a respective neuron function, an output value which is called its activation. This activation, called $x_j$ in the above exemplary equation, then forms the input value of each downstream neighbor/successor neurons. By this measure, the values of the items of set 16 propagate through neurons 12 so as to end up into output neurons 12'. To be more precise, the values of the items of set 16 form the input values of the neurons 12 of the lowest layer of network 10 and the output neurons 12' receive the activations of their upstream neighbor/predecessor neurons 12 as input values and compute their output values, i.e. the network output 18, by way of a respective neuron function. The neuron functions associated with the neurons 12 and 12' of network 10 may be equal among all neurons 12 and 12' or may be different thereamong with "equality" meaning that the neuron functions are parametrizable and the function parameters may differ among the neurons without impeding the equality. In case of varying/different neuron functions, these functions may be equal among neurons of the same layer of network 10 or may even differ among neurons within one layer.

Thus, network 10 may be implemented, for example, in the form of a computer program running on a computer, i.e. in software, but an implementation in a hardwired form such as in the form of an electric circuit would be feasible as well. Each neuron 12 computes, as described above, an activation on the basis of its input values using a neuron function which is, for instance, presented in the above explicit example as a non-linear scalar function g(·) of a linear combination of the input values. As described, the neuron functions associated with neurons 12 and 12' may be parametrized functions. For example, in one of the specific examples outlined below, the neuron functions for a neuron j are parametrizable using an offset $b_j$ and a weight $w_{ij}$ for all input values i of the respective neuron. These parameters are illustrated in FIG. 1a using a dashed box 28. These parameters 28 may have been obtained by training network 10. To this end, network 10 is, for instance, repeatedly applied onto a training set of sets 16 of items for which the correct network output is known, i.e. a training set of labeled images in the example case of FIG. 1a. Other possibilities may, however, exist as well. Even a combination may be feasible. The embodiments described further below are not restricted to any kind of origin or way of determination of parameters 28. FIG. 1a illustrates, for example, that an upstream portion 21 of the network 10, consisting of layers 26 extending from the set 16, i.e. the network's input, to an intermediate hidden layer, has been artificially generated or learned so as to emulate a feature extraction of image 22 by way of convolutional filters, for example, so that each neuron of the (downstream) trailing layer represents a feature value out of feature maps 20. Each feature map 20 is, for example, associated with a certain characteristic or feature or impulse response or the like.

Accordingly, each feature map 20 may, for instance, be thought of as a sparsely sampled, filtered version of input image 22 with a feature map 20 differing in associated feature/characteristic/impulse response of the associated filter from another feature map. If, for example, set 16 has X·Y items, namely pixels, i.e. X columns and Y rows of pixels, each neuron would correspond to one feature value of one feature map 20, which value would correspond to a local feature score associated with a certain portion of image 22. In case of N feature maps with P·Q feature score samples, for instance, i.e. P columns and Q rows of feature values, the number of neurons at the downstream trailing layer of portion 21 would be, for instance, N·P·Q which may be smaller or larger than X·Y. A translation of the feature descriptors or filters underlying feature maps 20, respectively, may have been used to set the neuron functions, or parametrize the neuron functions, of the neurons within portion 21. However, it is again noted that the existence of such "translated", rather than "learned" portion 21 of network is not mandatory for the present application and its embodiments and that such portion may alternatively be not present. In any case, in stating that it is feasible that the neuron functions of neurons 12 may be equal among all neurons or equal among neurons of one layer or the like, the neural function may, however, be parametrizable and although the parametrizable neural function may be equal among those neurons, the function parameter(s) of this neural function may vary among these neurons. The number of intermediate layers is likewise free and may be equal to one or greater than one.

Summarizing the above, an application of network 10 in the normal operation mode is as follows: the input image 22 is, in its role as set 16, subject or coupled to network 10. That is, the pixel values of image 22 form the input values for the first layer's 24 neurons 12. These values propagate, as described, along forward direction 14 through network 10 and result into the network output 18. In the case of the input image 22 shown in FIG. 1, for instance, the network output 18 would, for example, indicate that this input image 22 belongs to the third class, i.e. the class of images showing a car. To be more precise, while the output neuron corresponding to the class "car" would end up into a high value, the other output neurons here exemplarily corresponding to "truck" and "boat" would end up into low(er) values.

However, as described in the introductory portion of the specification of the present application, the information as to whether or not image 22, i.e. set 16, shows a car or the like may not suffice. Rather, it would be of advantage to have an information at the granularity level of pixels indicating which pixels i.e. which items of set 16, were relevant for the network's 10 decision and which were not, e.g. which pixels show a car and which do not. This task is dealt with by way of the embodiments described below.

Figure 1C:
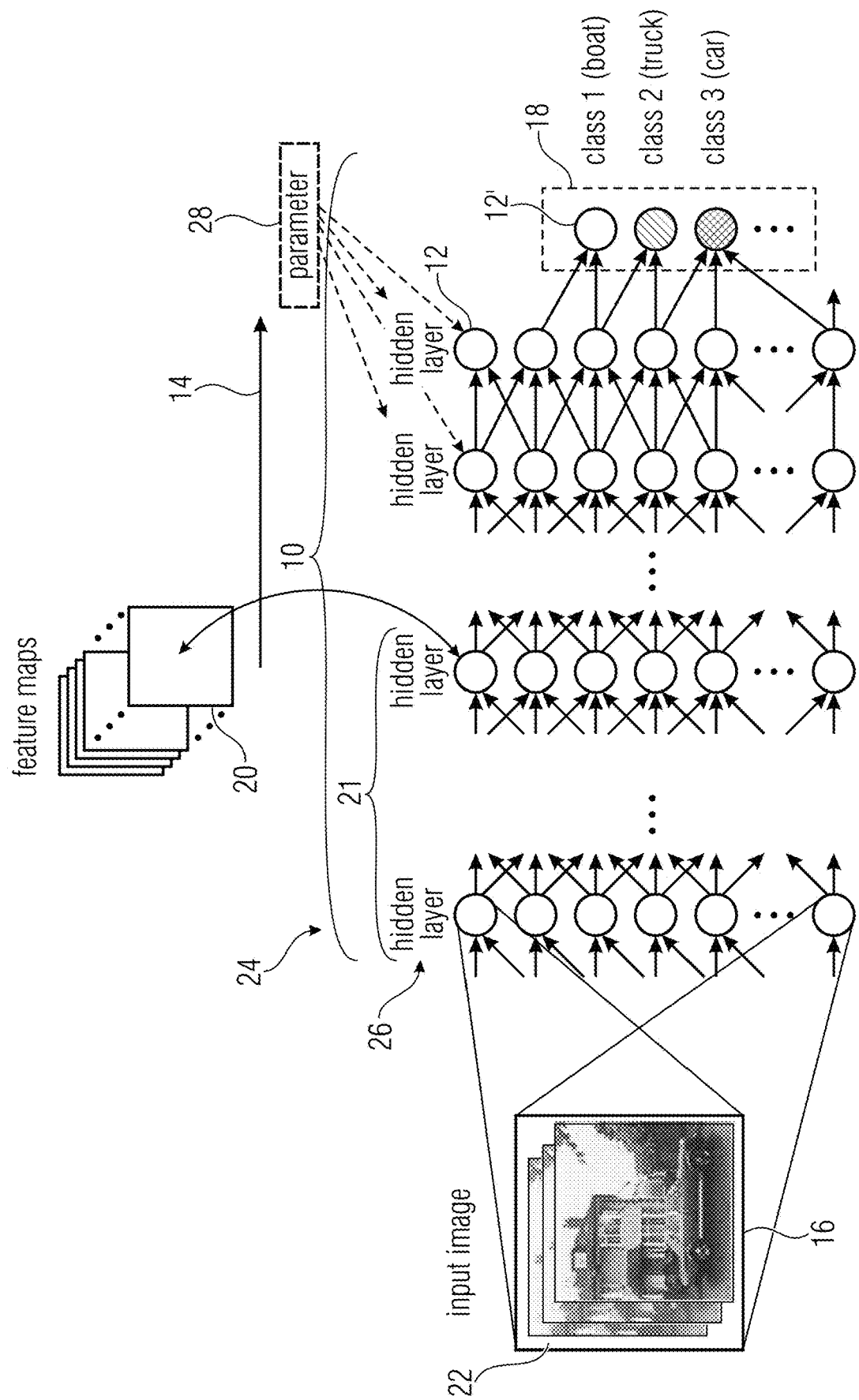
FIGS. 1c and 2c show a possibility of applying FIGS. 1a and 2a onto color images.
Figure 1D:
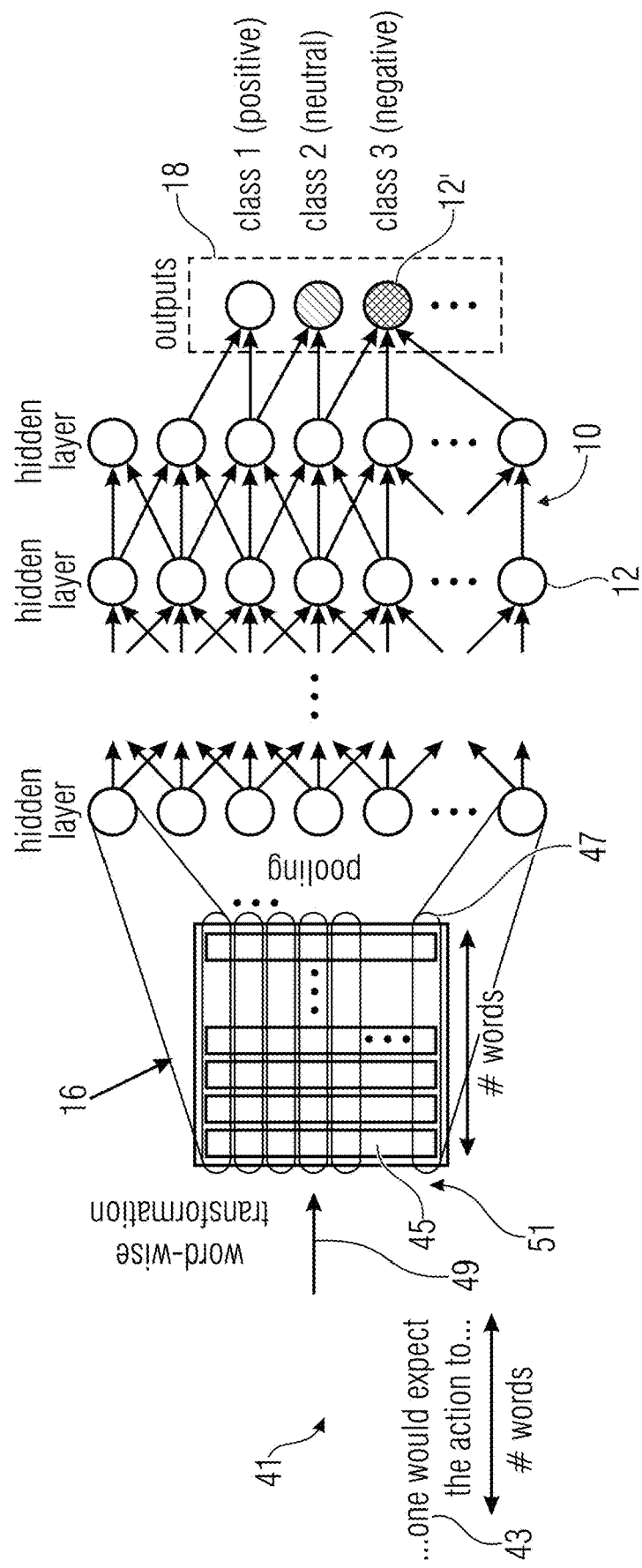
FIGS. 1d and 2d show a modification of FIGS. 1a and 2a according to which the network and relevance assignment are operated on texts rather than images.
Figure 2A:
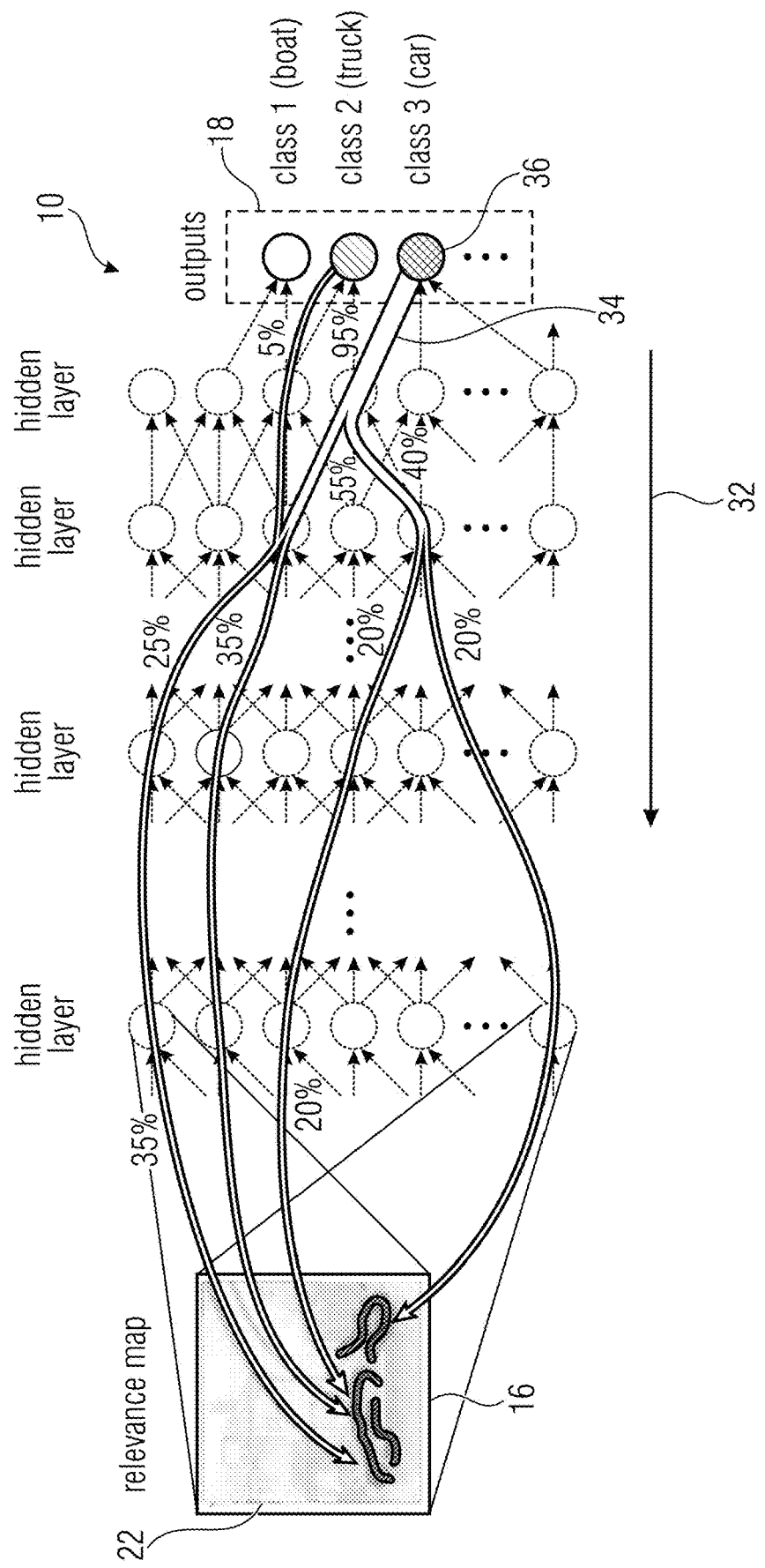
FIG. 2a shows a schematic diagram illustrating a reverse propagation process used in accordance with embodiments of the present application exemplarily using the artificial neural network of FIG. 1 as a basis.

In particular, FIG. 2a shows in an illustrative manner how the embodiments of the present invention, described in more detail below, operate in order to fulfill the task of relevance score assignment to the items of set 16, which, in the exemplary case of FIG. 2a is the domain of pixels. In particular, FIG. 2a illustrates that this relevance score assignment is performed by a reverse propagation process (back or relevance propagation) according to which a relevance value R is, for example, reversely propagated through network 10 towards the network input, i.e. the set 16 of items, thereby obtaining a relevance score $R_i$ for each item i of set 16, for each pixel of image. For an image comprising X·Y pixels for example, i might be within {1 . . . X·Y} with each item/pixel i corresponding, for example, to a pixel position $(x_i, y_i)$. In performing this reverse propagation along the reverse propagation direction 32, which runs opposite to the forward propagation direction 14 of FIG. 1, the embodiments described hereinafter obey certain constraints which are now explained in more detail and called relevance conservation and relevance redistribution.

Briefly speaking, the relevance score assignment starts from a finished appliance of artificial neural network 10 onto set 16. As explained above, this appliance ends-up in a network output 18. An initial relevance value R is derived from this network output 18. In the examples described below, for example, the output value of one output neuron 12' is used as this relevance value R. The derivation from the network output may, however, also be performed differently, using, for example, a monotonic function applied onto the network output. Other examples are set out below.

In any case, this relevance value is then propagated through network 10 in the reverse direction, i.e. 32, pointing into the opposite direction compared to the forward propagation direction 14 along which network 10 works when being applied onto set 16 so as to result in network output 18. The reverse propagation is done in a manner so that for each neuron 12 a sum of preliminarily redistributed relevance values of a set of downstream neighbor neurons of the respective neuron is distributed on a set of upstream neighbor neurons of the respective neuron so that the relevance is "substantially conserved". For example, the distribution function may be selected such that the initial relevance value R equals the sum of relevance scores $R_i$ of the items i of set 16 after having completed the reverse propagation, either exactly, i.e. $R = \Sigma R_i$ or via a monotonic function f( ) i.e. $R = f(\Sigma R_i)$. In the following, some general thoughts regarding the distribution function and how same should advantageously be selected are discussed.

During the reverse propagation, the neuron activations of neurons 12 are used to guide the reverse propagation. That is, the neuron activations of the artificial neural network 10 during applying network 10 onto set 16 in order to obtain the network output 18 are preliminarily stored and reused in order to guide the reverse propagation procedure. As will be described in more detail below, a Taylor approximation may be used in order to approximate the reverse propagation. Thus, as illustrated in FIG. 2a, the process of reverse propagation may be thought of as distributing the initial relevance value R, starting from the output neuron(s), towards the input side of network 10 along the reverse propagation direction 32. By this measure, relevance flow paths 34 of increased relevance, lead from the output neuron 36 towards the input side of network 10, namely the input neurons being formed by the set 16 of items itself. The paths intermittently branch during the passage through network 10 as illustrated in FIG. 2 exemplarily. The paths finally end-up in hotspots of increased relevance within the set 16 of items. In the specific example of using an input image 22, as depicted in FIG. 2a, the relevance scores $R_i$ indicate, at pixel level, areas of increased relevance within image 22, i.e. areas within image 22 which played the primary role in the network's 10 ending up into the corresponding network output 18. In the following, the just mentioned relevance conservation and relevance redistribution properties are discussed in more detail using the above example for nonlinear activation functions as the neuron functions for neurons of network 10.

Property 1: Relevance Conservation

The first basic property of the relevance propagation model imposes that evidence cannot be created nor lost. This applies both on a global scale (i.e. from the neural network output back to the neural network input) and on a local scale (i.e. at the level of individual nonlinear processing units). Such constraint amounts to applying Kirchhoff's circuits laws to a neural network, and replacing the physical notion of "electrical current" by the notion of "semantic evidence". In particular, see FIG. 3.

Figure 3:
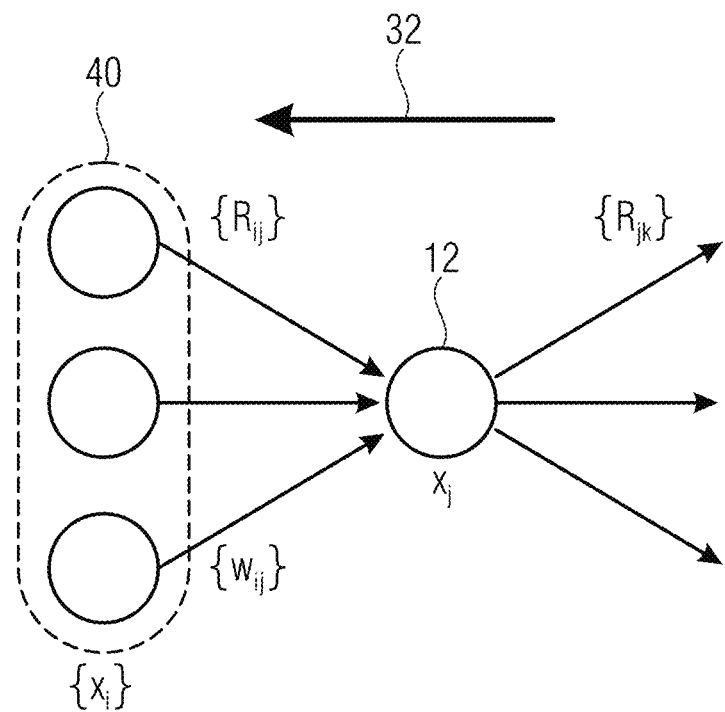
FIG. 3 schematically illustrates an intermediate neuron of an artificial neural network and its connection to upward and downstream neighbor neurons, wherein the exemplarily three upstream neighbor neurons are also shown.

Using the indices i and k to denote the neurons that are incoming and outgoing to a neuron with index j (the incoming ones are illustrated in FIG. 3 at 40 and, thus, form predecessors or upstream neighbors), the identity $$\sum_i R_{ij} = \sum_k R_{jk}$$

is to hold, where $R_{ij}$ denotes the relevance that flows from neuron j to neuron i, and $R_{jk}$ denotes the relevance that flows from neuron k to neuron j. Note that the relevance conservation principle states that the sum of the relevances which 'flow into a neuron' be the same as the sum of the relevances which 'flow out of this neuron'. The relevance conservation ensures that the sum of the input neuron relevances (e.g. relevances of pixels) equals the output value of the network (e.g. classification score).

Property 2: Relevance Redistribution

The second basic of the relevance propagation model is that the local redistribution of relevance follows a fixed rule that applies invariably to all neurons in the network. Many different rules can be defined for relevance redistribution.

Some of the rules are "meaningful" others are not. One such meaningful rule is, for example, $$R_{ij} = \frac{x_i w_{ij} + \frac{b_j}{n}}{\sum_{i'} \left( x_{i'} w_{i'j} + \frac{b_j}{n} \right)} \sum_k R_{jk}$$

where n is the number of neurons indexed by i. A rationalization for this redistribution rule is that neurons $x_i$ that contribute most to the activation of the neuron $x_j$ will be attributed most of the incoming relevance $\Sigma_k R_{jk}$. Also, summing the redistributed relevance $R_{ij}$ over all incoming neurons i, it should be clear that Property 1 is satisfied.

However, the deterministic relevance propagation rule above has two drawbacks: First, it can be numerically unstable when the denominator is close to zero. Second, it can produce negative values for $R_{ij}$, which have an undefined meaning. The first issue is addressed by redefining the rule as $$R_{ij} = \frac{x_i w_{ij} + \frac{b_j}{n}}{h\left(\sum_{i'} \left( x_{i'} w_{i'j} + \frac{b_j}{n} \right)\right)} \sum_k R_{jk}$$

where h(t)=t+ε·sign(t) is a numerical stabilizer that prevents the denominator from being close to zero, and where ε is chosen very small to comply with Property 1. The second issue is addressed by considering only positive contributions to the neuron activations, in particular, $$R_{ij} = \frac{\max\left(0, x_i w_{ij} + \frac{b_j}{n}\right)}{\sum_{i'} \max\left(0, x_{i'} w_{i'j} + \frac{b_j}{n}\right)} \sum_k R_{jk}$$

Here, we notice that the ratio of two positive quantities is positive, and so will relevance. These two enhancements can be easily combined to satisfy both the stability and positivity property.

Note that the relevance conservation states what the repropagation does (=distributing the output relevances to the input variables while keeping the overall value (the sum) constant) whereas the relevance redistribution states how to do it (=a "meaningful" redistribution should ensure that neurons that contribute most to the activation (have large weighted activations $x_i w_{ij}$) will be attributed most of the incoming relevances).

Before describing an apparatus in accordance with an embodiment of the present application, the above introduction shall be extended so as to present possible alternatives more clearly.

Figure 2B:
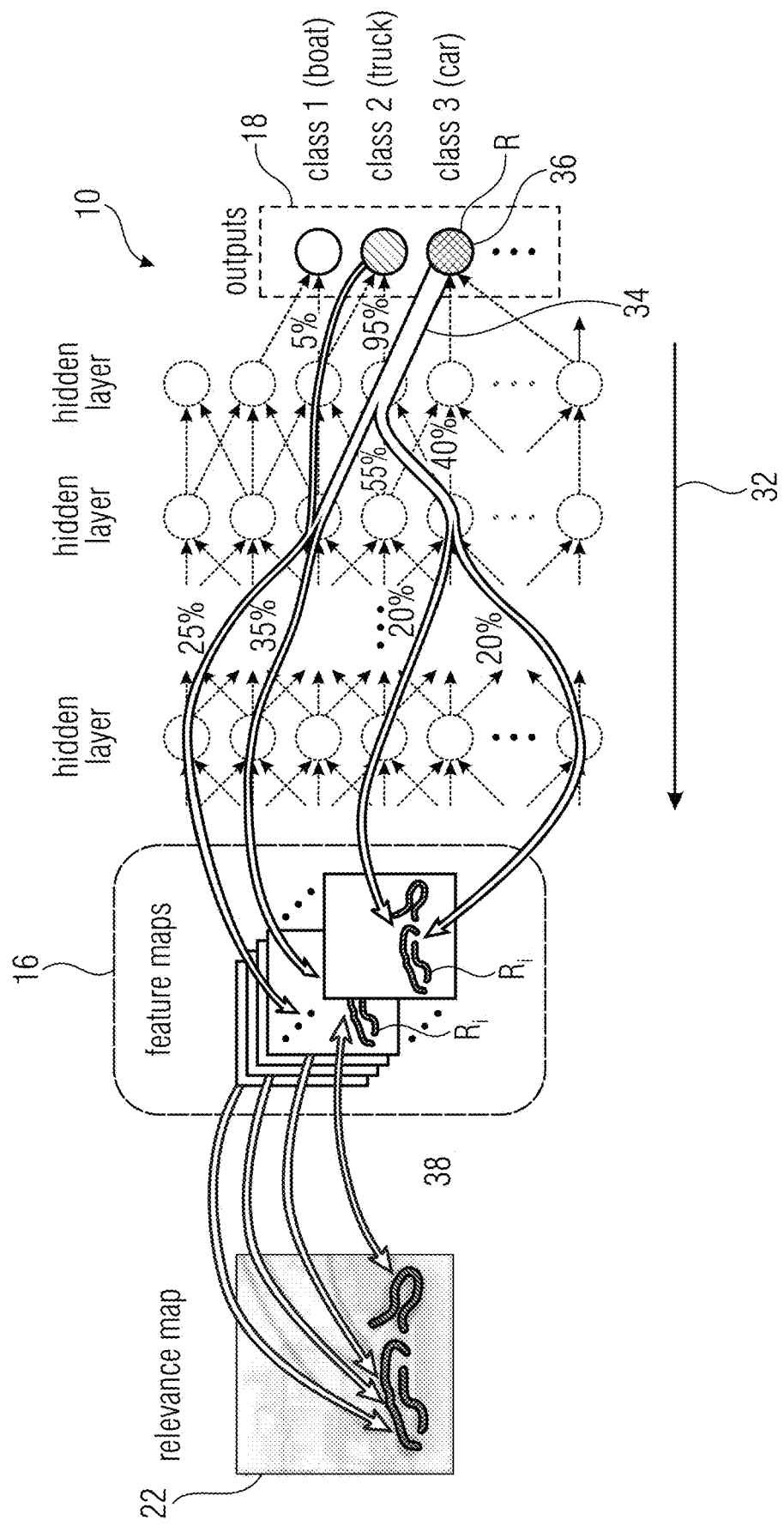

For example, while the embodiment described with respect to FIGS. 1a and 2a used an image 22 as item set 16, with possibly designing the network 10 in such a manner that the neuron activations of the neurons of one layer thereof represent "local features" of the image, i.e. samples of feature maps 20, the embodiment of FIGS. 1b and 2b uses the feature maps 20 as the set 16 of items. That is, network 10 is fed with feature samples of feature maps 20. The feature maps 20 may have been obtained from the input image 22 by subjecting the same to feature extractors, each extracting a respective feature map 20 from input image 22. This feature extraction operation is illustrated in FIG. 1b using arrow 30. A feature extractor may, for instance, locally apply a filter kernel onto the image 22 so as to derive, per appliance a feature sample, with moving the filter kernel across the image, so as to obtain the corresponding feature map 20 composed of the feature samples arranged, for example, in rows and columns, The filter kernel/template may be individual for the respective feature extractors and the corresponding feature maps 20, respectively. Here, the network 10 of FIG. 1b may coincide with the reminder portion of network 10 of FIG. 1a, the reminder of network 10 after removing portion 21. Thus, in case of FIG. 1b, The feature sample values propagate, as part of the so-called prediction process, along forward direction 14 through network 10 and result into the network output 18. FIG. 2b shows the relevance back propagation process for the network of FIG. 1b: The reverse propagation process reverse propagates the relevance value R through network 10 towards the network input, i.e. the set 16 of items, thereby obtaining a relevance score $R_i$ for each item. In case of FIG. 2b, thus, a relevance score $R_i$ is obtained per feature sample i. As the feature maps 20, however, are related to the image content via feature map individual filter extracting functions, each relevance score i may be translated into the pixel domain, i.e. onto the pixels, namely by distributing the individual relevance scores of the items of set 16 in a fixed manner onto the individual pixel positions of image 22. The "fixed manner" uniquely depends on the feature extractors associated with the feature map of the respective relevance score and represents a kind of reverse function 38 of the feature extraction 30. This reverse function 38, thus, forms a kind of extension of the back propagation process so as to close the gap from the feature set domain to the spatial domain of the pixels.

Further, it is noted that in case of FIG. 1a and FIG. 2a it has been preliminarily assumed that each pixel of image 22, i.e. each item of 16, carries a scalar. This interpretation may apply in case of a grey scale image 22, for example, with each pixel value corresponding to a grey scale value, for example. However, other possibilities exist as well. For example, the image 22 may be a color image. In that case, each item of set 16 may correspond to a sample or pixel value of one of more color planes or color components of image 22. Three components are exemplarily illustrated in FIGS. 1c and 2c, which show an extension of FIGS. 1a and 2a towards color images 22. Thus, the set 16 of items in case if FIGS. 1c and 2c would be X·Y·3 in case of having for each of X·Y pixel positions a color component value for each of the three color components. The number of color components could, however, be other than three.

Further, the spatial resolution of the color components needs not to be the same. The back propagation of FIG. 2c ends up into a relevance value per item, i.e. color component sample. In case of having a component value for all components for each pixel, a final relevance map may be obtained by summing the relevance values obtained for the color components of the respective pixel. This is illustrated at 37.

Figure 2C:
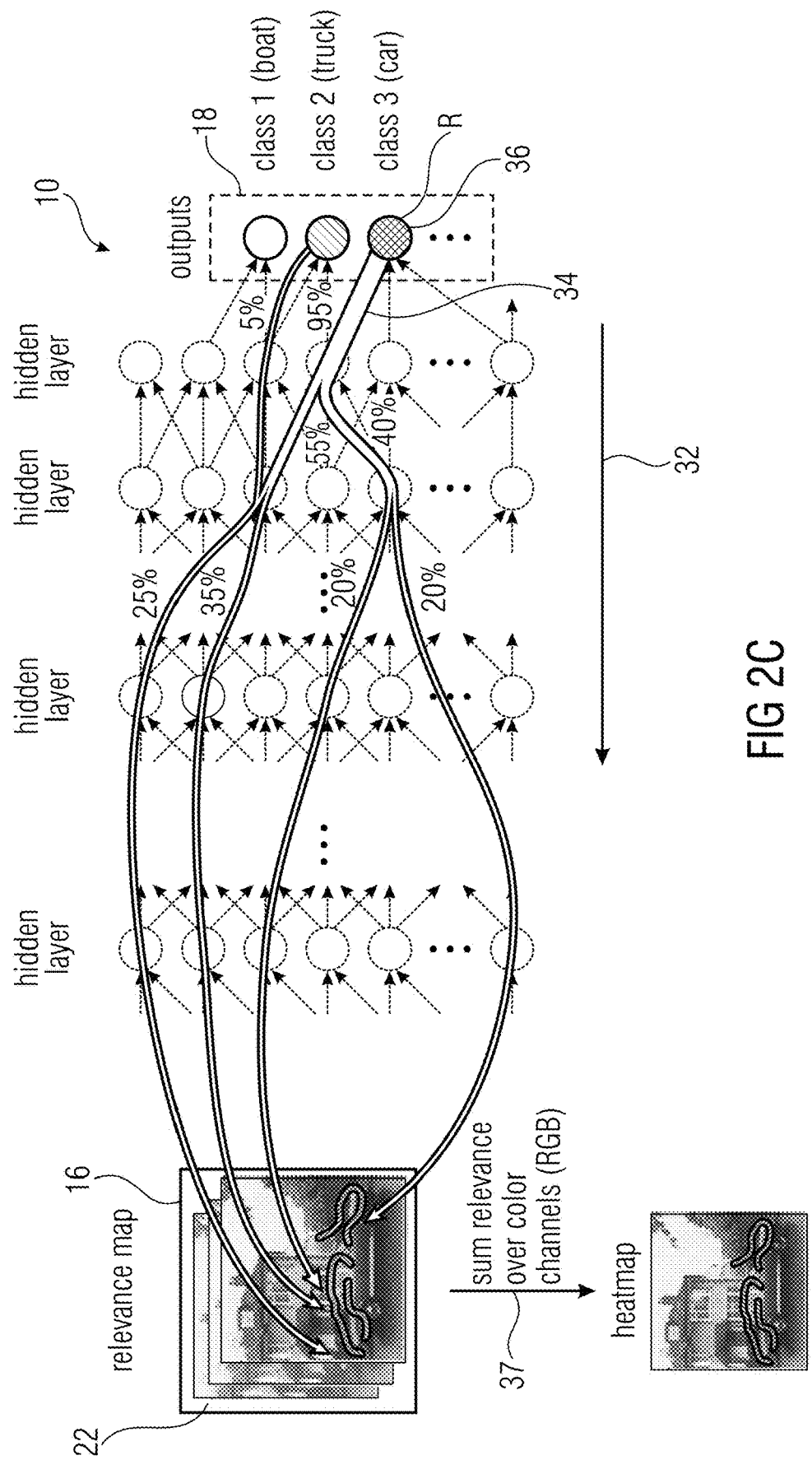

Although FIGS. 1 to 2c related to images and pixels, embodiments of the present application are not restricted to that kind of data. For example, texts and its words, may be used as a basis. A social graph analysis application could look as follows: a relevance is assigned to nodes and connections in a graph, where the graph is given as input to neural network 10. In the context of social graph analysis, nodes may represent users, and connections may represent the relation between these users. Such connections can also be directed to model information flows (e.g. citations network) or chain of responsibility within an organization. Neural networks can for example be trained to predict for the graph given as input a particular property of the graph (e.g. the productivity associated to a particular social graph). In this case, the relevance propagation and heatmapping method will seek to identify in this graph the substructures or nodes that explain the predicted property (i.e. the high or low productivity). Neural networks can also be trained to predict the state of the graph at a later point in time. In this case, the relevance propagation procedure will seek to identify which substructure in the graph explains the future state of the graph (e.g. which substructures or nodes are most influential in the social graph in their ability to spread information in the graph or to change its state). Thus, the neural network may, for example, be used to predict success (e.g. number of sold products) of an advertisement campaign (regression task). The relevance scores can be used to identify some influential aspects for the success. A company may save money by only focusing on these relevant aspects. The relevance score assignment process could give out a score for every item of the advertisement campaign. A decision processor may then take this input and also the information about the costs of every item of the advertisement campaign and decide an optimal strategy for the campaign. The relevance may, however, also used for feature selection as shown above.

The relevance score assignment starts with a derivation of the initial relevance value R. As mentioned above, same may be set on the basis of one of the neural network's output neurons so as to obtain, by the back propagation, the relevance values for the items of set 16, referring to the "meaning" of that one output neuron. However, the network output 18 may, alternatively, be a vector and the output neurons may be of such meanings that same may be partitioned into overlapping or non-overlapping subsets. For example, the output neurons corresponding to meaning (category) "truck" and "car" may be combined to result in subset of output neurons of the meaning "automobile". Accordingly, the output values of both output neurons may be used as a starting point in the back propagation, thereby resulting in relevance scores for the items 16, i.e. the pixels, indicating the relevance for the meaning of the subset, i.e. "automobile".

Although above description suggested that the item set is a picture with each of the items 42 of the set 16 of items 42 corresponding to one pixel of the picture, this may be different. For example, each item may correspond to a set of pixels or subpixels (a pixel has usually rgb values. A subpixel would be for example the green component of a pixel) such as a super pixel as illustrated in FIG. 2c. Further, the item set 16, may alternatively be a video with each of the items 42 of the set 16 of items 42 corresponding to one or more pixels of pictures of the video, pictures of the video or picture sequences of the video. The subset of pixels to which an item refers may contain pixels of pictures of different time stamps. Further, the item set 16 may be an audio signal with each items 42 of the set 16 of items 42 corresponding to one or more audio samples of the audio signal such as PCM samples. The individual items of set 16 may be the samples or any other part of an audio recording. Or the set of items is a product space of frequencies and time and each item is a set of one or more frequency time intervals such as a spectrogram composed of, for example, MDCT spectra of a sequence of overlapping windows. Further, the set 16 may be a feature map of local features locally extracted from a picture, video or audio signal with the items 42 of the set 16 of items 42 corresponding to local features, or a text with the items 42 of the set 16 of items 42 corresponding to words, sentences or paragraphs of the text.

Figure 2D:
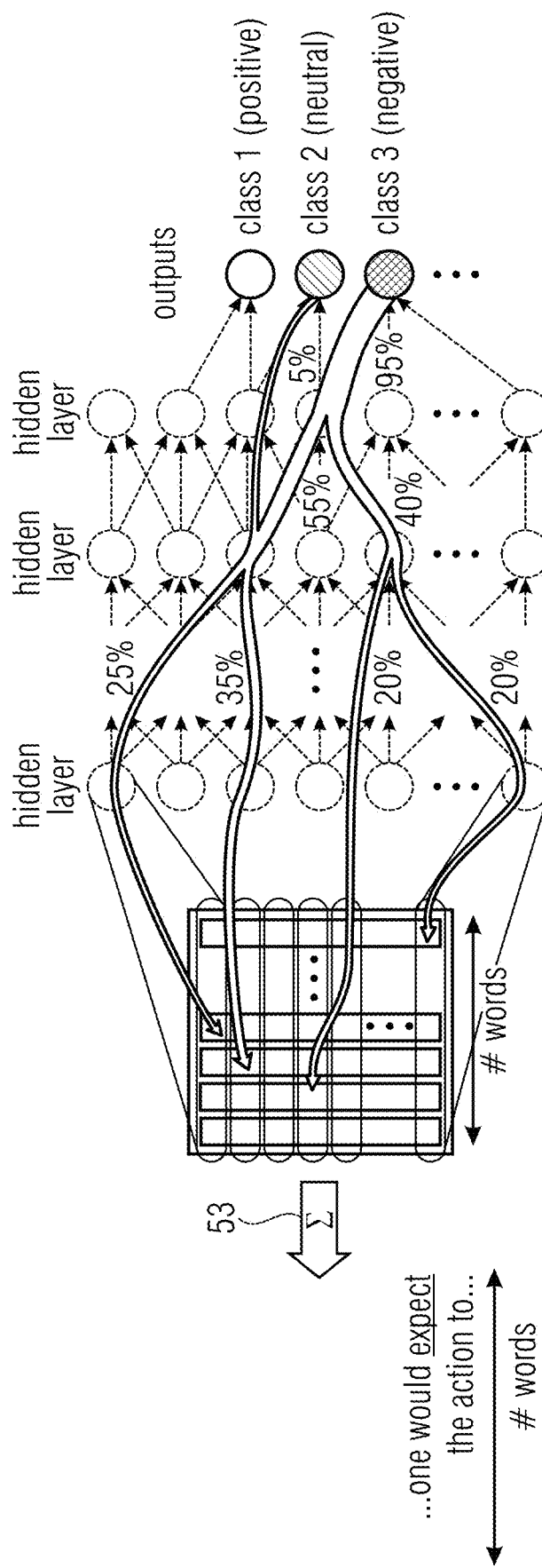

For sake of completeness, FIGS. 1d and 2d show a variant according to which the data set 16 of items is text rather than an image. For that case, FIG. 1d illustrates that the text which is actually a sequence 41 of (e.g. I) words 43, is transferred into an "abstract" or "interpretable" version by mapping each word $w_i$ 43 onto a respective vector $v_i$ 45 of common length, i.e. of a common number J of components $v_{ij}$ 47, according to a wordwise transformation 49. Each component may be associated with a semantic meaning. A wordwise transformation which may be used is, for example, Word2Vec or word indicator vectors. The components $v_{ij}$ 47 of vectors $v_i$ 45 represent the items of set 16 and are subject to network 10, thereby resulting into the prediction result 18 at the network's output nodes 12'. The reverse propagation shown in FIG. 2d results in a relevance value per item, i.e. for each vector component $v_{ij}$ (0<i<I; 0<j<J). Summing up 53, for each word $w_i$, the relevance scores for the components $v_{ij}$ of vector $v_i$ associated with the respective word $w_i$ with 0<j<J results into a relevance sum value (relevance score) per word, for example, and thus, each word $w_i$ in the text may be highlighted in accordance with its relevance score sum. The number of highlighting options may be two or greater. That is, the relevance sum values of the words may be quantized to result in a highlighting option per word. The highlighting option may be associated with different highlighting strength and the mapping from relevance sum values to highlighting options may result in a monotonic association between relevance sum values and highlighting strength. Again, similar to the examples where the neural network pertained the performance of a prediction onto images, an input-side portion of the network 10 of FIGS. 1d and 2d may have some interpretable meaning. In case of the images this has been the feature sets. In case of FIGS. 1d and 2d, an input portion of network 10 could represent another vector wise mapping of the vectors composed of the components of set 16 onto most likely lower dimensional vectors the components of which might have a rather semantic meaning compared to the rather word family related components of the vectors composed of the components of set 16.

Figure 4:
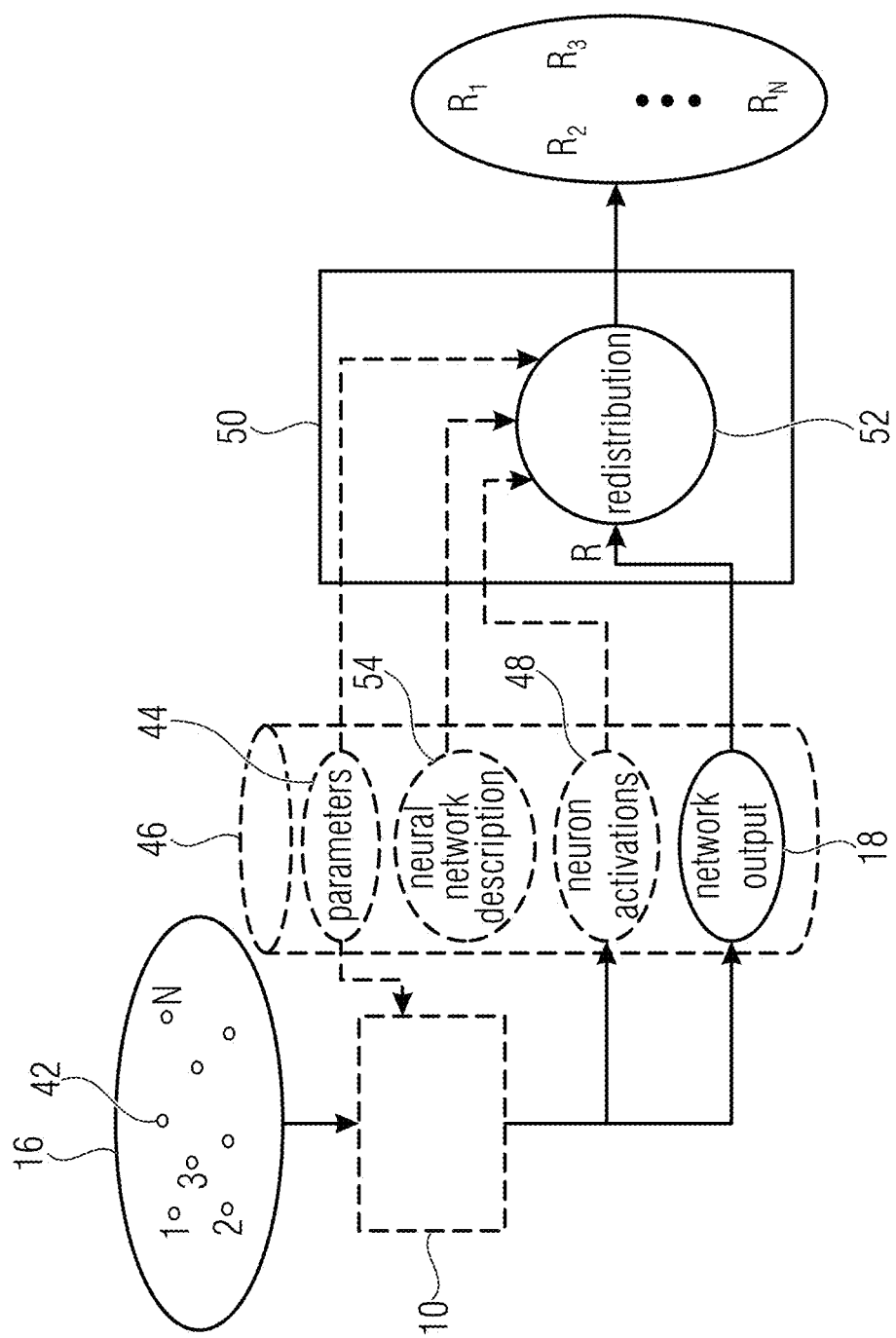
FIG. 4 shows a block diagram of an apparatus for assigning relevance scores to a set of items in accordance with an embodiment.

FIG. 4 shows an example of an apparatus for assigning a relevance score to a set of items. The apparatus is, for instance, implemented in software, i.e. as a programmed computer. Other implementation possibilities are, however, imaginable as well. In any case, apparatus 50 is configured to use the above outlined reverse propagation process in order to assign, item-wise, a relevance score to the set 16 of items, with a relevance score indicating for each item what relevance this item has in network's 10 derivation of its network output 18 based thereon. Accordingly, FIG. 4 also shows the neural network. Network 10 is shown as not being part of apparatus 50: Rather, network 10 defines the source of meaning of the "relevance" for which scores are to be assigned to the set 16 of items by apparatus 50. However, alternatively, apparatus 50 may include the network 10 as well.

FIG. 4 shows network 10 as receiving set 16 of items with the items being illustratively indicated as small circles 42. FIG. 4 also illustrates the possibility that network 10 is controlled by neuron parameters 44, such as function weights controlling the neuron activation computation based on the neuron's upstream neighbor/predecessor neurons as described above, i.e. the parameters of the neuron functions. These parameters 44 may, for instance, be stored in a memory or storage 46. FIG. 4 also illustrates the output of network 10 after having completed processing the set 16 of items 42 using parameters 44, namely the network output 18 and optionally, the neuron activations of neurons 12 resulting from processing set 16, the neuron activations being illustrated by reference sign 48. Neuron activations 48, network output 18 and parameters 44 are illustratively shown to be stored in memory 46, but they may also be stored in a separate storage or memory or may not be stored. Apparatus 50 has access to the network output 18 and performs the redistribution task 52 using the network output 18 and the reverse propagation principle set out above so as to obtain a relevance score $R_i$ for each item i 52 of set 16. In particular, as described above, apparatus 50 derives an initial relevance value R from the network output and redistributes this relevance R using the reverse propagation process so as to end-up in the individual relevance scores $R_i$ for items i. The individual items of set 16 are illustrated in FIG. 4 by small circles indicated by reference sign 42. As described above, the redistribution 52 may be guided by parameters 44 and neuron activations 48 and accordingly, apparatus 50 may have access to these data items as well. Further, as depicted in FIG. 4, the actual neural network 10 does not need to be implemented within apparatus 50. Rather, apparatus 50 may have access to, i.e. know about, the construction of network 10, such as the number of neurons, the neuron functions to which parameters 44 belong, and the neuron interconnection, which information is illustrated in FIG. 4 using the term neural network description 54 which, as illustrated in FIG. 4, may also be stored in memory or storage 46 or elsewhere. In an alternative embodiment, the artificial neural network 10 is also implemented on apparatus 50 so that apparatus 50 may comprise a neural network processor for applying the neural network 10 onto set 16 in addition to a redistribution processor which performs the redistribution task 52.

Thus, the above presented embodiments are able to, inter alias, close the gap between classification and interpretability for multilayered neural networks which enjoy popularity in computer vision. For neural networks (e.g. [6, 31]), we will consider general multilayered network structures with arbitrary continuous neurons and pooling functions based on generalized p-means.

The next Section Pixel-wise Decomposition as a General Concept will explain the basic approaches underlying the pixel-wise decomposition of classifiers. This pixel-wise decomposition was illustrated with respect to FIGS. 1a and 2c. Pixel-wise Decomposition for Multilayer Networks applies both the Taylor-based and layer-wise relevance propagation approaches explained in Pixel-wise Decomposition as a General Concept to neural network architectures. The experimental evaluation of our framework will be done in Experiments.

Pixel-Wise Decomposition as a General Concept

The overall idea of pixel-wise decomposition is to understand the contribution of a single pixel of an image x to the prediction unction $f(x)$ made by a classifier $f$ in an image classification task. We like to find out, separately for each image x, which pixels contribute to what extent to a positive or negative classification result. Furthermore we want to express this extent quantitatively by a measure. We assume that the classifier has real-valued outputs which are thresholded at zero. In such a setup it is a mapping $f:\mathbb{R}^V \rightarrow \mathbb{R}^1$ such that $f(x)>0$ denotes the presence of the learned structure. Probabilistic outputs for two-class classifiers can be treated without loss of generality by subtracting 0.5 or taking the logarithm of the prediction and adding then the logarithm of 2.0. We are interested to find out the contribution of each input pixel $x_{(d)}$ of an input image x to a particular prediction $f(x)$. The important constraint specific to classification consists in finding the differential contribution relative to the state of maximal uncertainty with respect to classification which is then represented by the set of root points $f(x_0)=0$. One possible way is to decompose the prediction $f(x)$ as a sum of terms of the separate input dimensions $x_d$ respectively pixels:

$$f(x) \approx \Sigma_{d=1}^V R_d \qquad (1)$$

The qualitative interpretation is that $R_d<0$ contributes evidence against the presence of a structure which is to be classified while $R_d>0$ contributes evidence for its presence. In terms of subsequent visualization, the resulting relevances $R_d$ for each input pixel $x_{(d)}$ can be mapped to a color space and visualized in that way as a conventional heatmap. One basic constraint will be in the following work that the signs of $R_d$ should follow above qualitative interpretation, i.e. positive values should denote positive contributions, negative values negative contributions.

In the following, the concept is denoted as layer-wise relevance propagation as a concept for the purpose of achieving a pixel-wise decomposition as in Equation (1). We also discuss an approach based on Taylor decomposition which yields an approximation of layer-wise relevance propagation. We will show that for a wide range of non-linear classification architectures, layer-wise relevance propagation can be done without the need to use an approximation by means of Taylor expansion. The methods we present subsequently do not involve segmentation. They do not require pixel-wise training as learning setup or pixel-wise labelling for the training phase. The setup used here is image-wise classification, in which during training one label is provided for an image as a whole, however, the contribution is not about classifier training. The methods are built on top of a pretrained classifier. They are applicable to an already pretrained image classifier.

Layer-Wise Relevance Propagation

Layer-wise relevance propagation in its general form assumes that the classifier can be decomposed into several layers of computation. Such layers can be parts of the feature extraction from the image or parts of a classification algorithm run on the computed features. As shown later, this is possible for neural networks.

The first layer may be the inputs, the pixels of the image, the last layer is the real-valued prediction output of the classifier $f$. The l-th layer is modeled as a vector $z=(z_{(d,l)})_{d=1}^{V(l)}$ with dimensionality V(l). Layer-wise relevance propagation assumes that we have a Relevance score $R_d^{(l+1)}$ for each dimension $z_{(d,l+1)}$ of the vector z at layer l+1. The idea is to find a Relevance score $R_d^{(l)}$ for each dimension $z_{(d,l)}$ of the vector z at the next layer l which is closer to the input layer such that the following equation holds.

$$f(x) = \ldots = \Sigma_{d \in l+1} R_d^{(l+1)} = \Sigma_{d \in l} R_d^{(l)} = \ldots = \Sigma_d R_d^{(1)} \qquad (2)$$

Iterating Equation (2) from the last layer which is the classifier output $f(x)$ down to the input layer x consisting of image pixels then yields the desired Equation (1). The Relevance for the input layer will serve as the desired sum decomposition in Equation (1). As we will show, such a decomposition per se is neither unique, nor it is guaranteed that it yields a meaningful interpretation of the classifier prediction.

We give here a simple counterexample. Suppose we have one layer. The inputs are $x \in \mathbb{R}^V$. We use a linear classifier with some arbitrary and dimension-specific feature space mapping $\phi_d$ and a bias b $$f(x) = b + \Sigma_d \alpha_d \phi_d(x_d) \qquad (3)$$

Let us define the relevance for the second layer trivially as $R_1^{(2)} = f(x)$. Then, one possible layer-wise relevance propagation formula would be to define the relevance $R^{(1)}$ for the inputs x as $$R_d^{(1)} = \begin{cases} f(x) & \text{if } \sum_d |\alpha_d \phi_d(x_d)| \neq 0 \\ \dfrac{b}{v} & \text{if } \sum_d |\alpha_d \phi_d(x_d)| = 0 \end{cases} \qquad (4)$$

This clearly satisfies Equations (1) and (2), however the Relevances $R^{(1)}(x_d)$ of all input dimensions have the same sign as the prediction $f(x)$. In terms of pixel-wise decomposition interpretation, all inputs point towards the presence of a structure if $f(x) > 0$ and towards the absence of a structure if $f(x) < 0$. This is for many classification problems not a realistic interpretation.

Let us discuss a more meaningful way of defining layer-wise relevance propagation. For this example we define $$R_d^{(1)} = \frac{b}{V} + \alpha_d \phi_d(x_d) \qquad (5)$$

Then, the relevance of a feature dimension $x_d$ depends on the sign of the term in Equation (5). This is for many classification problems a more plausible interpretation. This second example shows that the layer-wise relevance propagation is able to deal with non-linearities such as the feature space mapping $\phi_d$ to some extent and how an example of layer-wise relevance propagation satisfying Formula (2) may look like in practice. Note that no regularity assumption on the feature space mapping $\phi_d$ is required here at all, it could be even non-continuous, or non-measurable under the Lebesgue measure. The underlying Formula (2) can be interpreted as a conservation law for the relevance R in between layers of the feature processing.

The above example gives furthermore an intuition about what relevance R is, namely, the local contribution to the prediction function $f(x)$. In that sense the relevance of the output layer may be chosen as the prediction itself $f(x)$. This first example shows what one could expect as a decomposition for the linear case. The linear case provides a first intuition.

Figure 5:
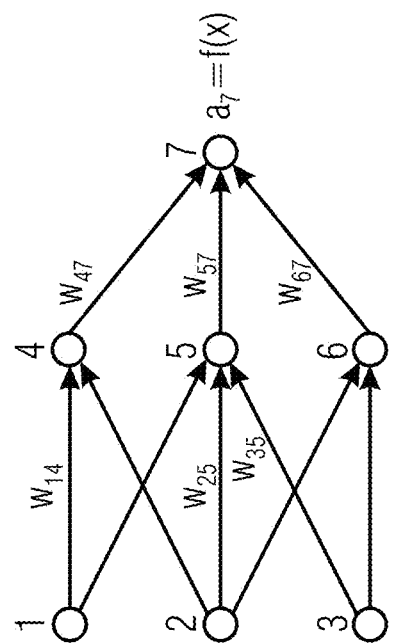
FIG. 5 shows a neural network-shaped classifier during prediction time. $w_{ij}$ are the connection weights. $a_i$ is the activation of neuron i.

We give a second, more graphic and non-linear, example. The FIG. 5 shows a neural network-shaped classifier with neurons and weights $w_{ij}$ on connections between neurons. Each neuron i has an output $a_i$ from an activation function.

The top layer consists of one output neuron, indexed by 7. For each neuron i we like to compute a relevance $R_i$. We will drop the layer index superscript $R^{(l)}$ for this example as all neurons have an explicit neuron index whenever the layer index is obvious. We initialize the top layer relevance $R_7^{(3)}$ as the function value, thus $R_7 = f(x)$. Layer-wise relevance propagation in Equation (2) is now to hold $$R_7^{(3)} = R_4^{(2)} + R_5^{(2)} + R_6^{(2)} \qquad (6)$$

$$R_4^{(2)} + R_5^{(2)} + R_6^{(2)} = R_1^{(1)} + R_2^{(1)} + R_3^{(1)} \qquad (7)$$

Figure 6:
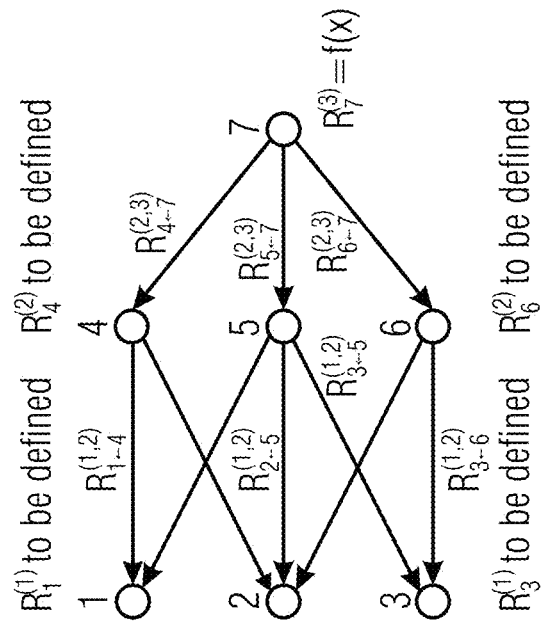
FIG. 6 shows the neural network-shaped classifier of FIG. 5 during layer-wise relevance computation time is shown. $R_i^{(l)}$ is the relevance of neuron i which is to be computed. In order to facilitate the computation of $R_i^{(l)}$ we introduce messages $R_{i \leftarrow j}^{(l,l+1)}$. $R_{i \leftarrow j}^{(l,l+1)}$ are messages which need to be computed such that the layer-wise relevance in Equation (2) is conserved. The messages are sent from a neuron i to its input neurons j via the connections used for classification, e.g. 2 is an input neuron for neurons 4, 5, 6. Neuron 3 is an input neuron for 5, 6. Neurons 4, 5, 6 are the input for neuron 7.

We will make two assumptions for this example. Firstly, we express the layer-wise relevance in terms of messages $R_{i \leftarrow j}^{(l, l+1)}$ between neurons i and j which can be sent along each connection. The messages are, however, directed from a neuron towards its input neurons, in contrast to what happens at prediction time, as shown in FIG. 6. Secondly, we define the relevance of any neuron except neuron 7 as the sum of incoming messages:

$$R_i^{(l)} = \Sigma_{k:\, i \text{ is input for neuron } k} R_{i \leftarrow k}^{(l, l+1)} \qquad (8)$$

For example $R_3^{(1)} = R_{3 \leftarrow 5}^{(1,2)} + R_{3 \leftarrow 6}^{(1,2)}$. Note that neuron 7 has no incoming messages anyway. Instead its relevance is defined as $R_7^{(3)} = f(x)$. In equation (8) and the following text the terms input and source have the meaning of being an input to another neuron in the direction as defined during classification time, not during the time of computation of layer-wise relevance propagation. For example in FIG. 6 neurons 1 and 2 are inputs and source for neuron 4, while neuron 6 is the sink for neurons 2 and 3. Given the two assumptions encoded in Equation (8), the layer-wise relevance propagation by Equation (2) can be satisfied by the following sufficient condition:

$$R_7^{(3)} = R_{4 \leftarrow 7}^{(2,3)} + R_{5 \leftarrow 7}^{(2,3)} + R_{6 \leftarrow 7}^{(2,3)} \qquad (9)$$

$$R_4^{(2)} = R_{1 \leftarrow 4}^{(1,2)} + R_{2 \leftarrow 4}^{(1,2)} \qquad (10)$$

$$R_5^{(2)} = R_{1 \leftarrow 5}^{(1,2)} + R_{2 \leftarrow 5}^{(1,2)} + R_{3 \leftarrow 5}^{(1,2)} \qquad (11)$$

$$R_6^{(2)} = R_{2 \leftarrow 6}^{(1,2)} + R_{3 \leftarrow 6}^{(1,2)} \qquad (12)$$

In general, this condition can be expressed as:

$$R_k^{(l+1)} = \Sigma_{i:\, i \text{ is input for neuron } k} R_{i \leftarrow k}^{(l, l+1)} \qquad (13)$$

The difference between condition (13) and definition (8) is that in the condition (13) the sum runs over the sources at layer l for a fixed neuron k at layer l+1, while in the definition (8) the sum runs over the sinks at layer l+1 for a fixed neuron i at a layer l. This condition is a sufficient condition, not a necessary one. It is a consequence of definition (8). One can interpret sufficient condition (13) by saying that the messages $R_{i \leftarrow k}^{(l, l+1)}$ are used to distribute the relevance $R_k^{(l+1)}$ of a neuron k onto its input neurons at layer l. The following sections will be based on this notion and the more strict form of relevance conservation as given by definition (8) and the sufficient condition (13).

Now we can derive an explicit formula for layer-wise relevance propagation for our example by defining the messages $R_{i \leftarrow k}^{(l, l+1)}$. The layer-wise relevance propagation should reflect the messages passed during classification time. We know that during classification time, a neuron i inputs $a_i w_{ik}$ to neuron k, provided that i has a forward connection to k. Thus we can represent Equations (9) and (10) by $$R_7^{(3)} = R_7^{(3)} \frac{a_4 w_{47}}{\sum_{i=4,5,6} a_i w_{i7}} + R_7^{(3)} \frac{a_5 w_{57}}{\sum_{i=4,5,6} a_i w_{i7}} + R_7^{(3)} \frac{a_6 w_{67}}{\sum_{i=4,5,6} a_i w_{i7}} \qquad (14)$$

$$R_4^{(2)} = R_4^{(2)} \frac{a_1 w_{14}}{\sum_{i=1,2} a_i w_{i4}} + R_4^{(2)} \frac{a_2 w_{24}}{\sum_{i=1,2} a_i w_{i4}} \qquad (15)$$

In general this can be expressed as $$R_{i \leftarrow k}^{(l, l+1)} = R_k^{(l+1)} \frac{a_i w_{ik}}{\sum_h a_h w_{hk}} \qquad (16)$$

While this definition still needs to be adapted such that it is usable when the denominator becomes zero, the example given in Equation (16) gives an idea what a message $R_{i \leftarrow k}^{(l,l+1)}$ could be, namely the relevance of a sink neuron $R_k^{(l+1)}$ which has been already computed weighted proportionally by the input of the neuron i from the preceding layer l. This notion holds in an analogous way when we use different classification architectures and replace the notion of a neuron by a dimension of a feature vector at a given layer.

The Formula (16) has a second property: the sign of the relevance sent by message $R_{i \leftarrow k}^{(l,l+1)}$ gets switched if the contribution of a neuron $a_i w_{ik}$ has different sign then the sum of the contributions from all input neurons, i.e. if the neuron fires against the overall trend for the top neuron from which it inherits a portion of the relevance. Same as for the example with the linear mapping in Equation (5), an input neuron can inherit positive or negative relevance depending on its input sign.

One further property is shown here as well. The formula for distribution of relevance is applicable to non-linear and even non-differentiable or non-continuous neuron activations $a_k$. An algorithm would start with relevances $R^{(l+1)}$ of layer l+1 which have been computed already. Then the messages $R_{i \leftarrow k}^{(l,l+1)}$ would be computed for all elements k from layer l+1 and elements i from the preceding layer l—in a manner such that Equation (13) holds. Then definition (8) would be used to define the relevances $R^{(l)}$ for all elements of layer l.

Taylor-Type Decomposition

One alternative approach for achieving a decomposition as in (1) for a general differentiable predictor $f$ is first order Taylor approximation.

$$f(x) \approx f(x_0) + Df(x_0)[x - x_0] = f(x_0) + \sum_{d=1}^{V} \frac{\partial f}{\partial x_{(d)}}(x_0)(x_{(d)} - x_{0(d)}) \quad (17)$$

The choice of a Taylor base point $x_0$ is a free parameter in this setup. As said above, in case of classification we are interested to find out the contribution of each pixel relative to the state of maximal uncertainty of the prediction which is given by the set of points $f(x_0)=0$, since $f(x)>0$ denotes presence and $f(x)<0$ absence of the learned structure. Thus, $x_0$ should be chosen to be a root of the predictor $f$. For the sake of precision of the Taylor approximation of the prediction, $x_0$ should be chosen to be close to x under the Euclidean norm in order to minimize the Taylor residuum according to higher order Taylor approximations. In case of multiple existing roots $x_0$ with minimal norm, they can be averaged or integrated in order to get an average over all these solutions. The above equation simplifies to $$f(x) \approx \sum_{d=1}^{V} \frac{\partial f}{\partial x_{(d)}}(x_0)(x_{(d)} - x_{0(d)}) \quad (18)$$

such that $$f(x_0) = 0$$

The pixel-wise decomposition contains a non-linear dependence on the prediction point x beyond the Taylor series, as a close root point $x_0$ needs to be found. Thus the whole pixel-wise decomposition is not a linear, but a locally linear algorithm, as the root point $x_0$ depends on the prediction point x.

Figure 7:
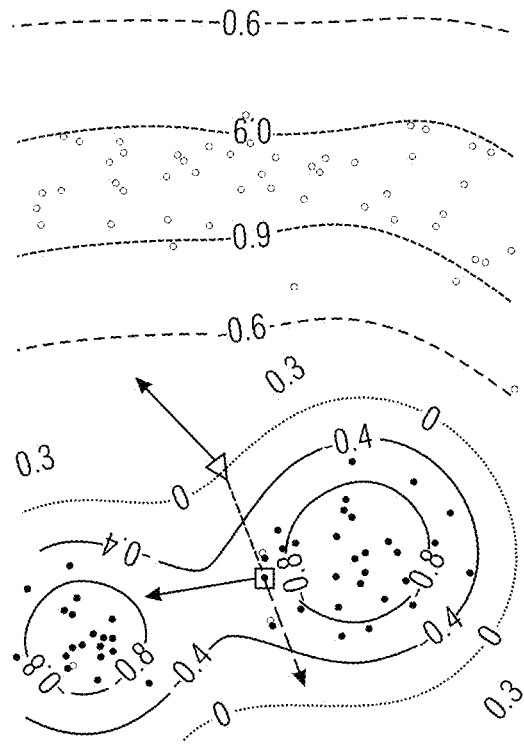
FIG. 7 shows an exemplary real-valued prediction function for classification with the dashed black line being the decision boundary which separates the blue dots at the area of −0.8 from the green dots at the area of 0.6-0.9. The former dots are labelled negatively, the latter dots are labelled positively. At the left hand side, a local gradient of the classification function at the prediction point is depicted, and at the right hand side, a Taylor approximation relative to a root point on the decision boundary is illustrated.
Figure 7:
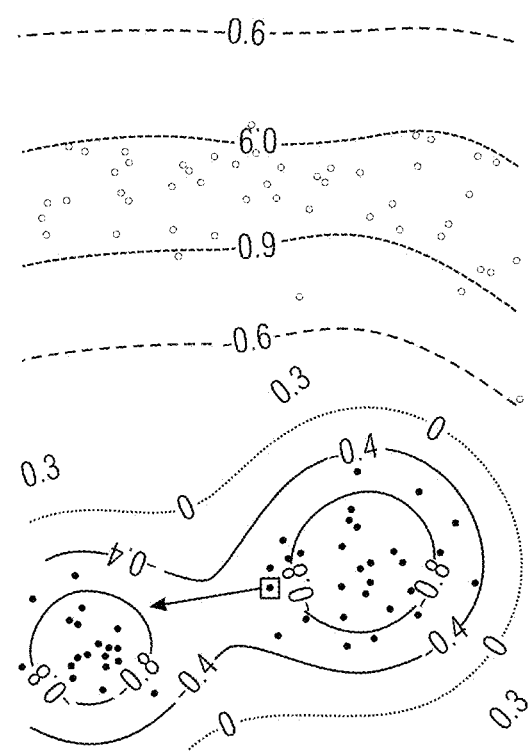

Several works have been using sensitivity maps [2, 18, 38] for visualization of classifier predictions which were based on using partial derivatives at the prediction point x. There are two essential differences between sensitivity maps based on derivatives at the prediction point x and the pixel-wise decomposition approach. Firstly, there is no direct relationship between the function value $f(x)$ at the prediction point x and the differential $Df(x)$ at the same point x. Secondly, we are interested in explaining the classifier prediction relative to a certain state given by the set of roots of the prediction function $f(x_0)=0$. The differential $Df(x)$ at the prediction point does not necessarily point to a root which is close under the Euclidean norm. It points to the nearest local optimum which may still have the same sign as the prediction $f(x)$ and thus be misleading for explaining the difference to the set of root points of the prediction function. Therefore derivatives at the prediction point x are not useful for achieving our aim. FIG. 7 illustrates the qualitative difference between local gradients (upwardly heading arrows) and the dimension-wise decomposition of the prediction (downwardly heading arrow). In particular, this figure depicts the intuition that a gradient at a prediction point x—here indicated by a square—does not necessarily point to a close point on the decision boundary. Instead it may point to a local optimum or to a far away point on the decision boundary. In this example the explanation vector from the local gradient at the prediction point x has a too large contribution in an irrelevant direction. The closest neighbors of the other class can be found at a very different angle. Thus, the local gradient at the prediction point x may not be a good explanation for the contributions of single dimensions to the function value f(x). Local gradients at the prediction point in the left image and the Taylor root point in the right image are indicated by black arrows. The nearest root point $x_0$ is shown as a triangle on the decision boundary. The downwardly heading arrow in the right image visualizes the approximation of f(x) by Taylor expansion around the nearest root point $x_0$. The approximation is given as a vector representing the dimension-wise product between $Df(x_0)$ (the grey arrow in the right panel) and $x-x_0$ (the dashed line in the right panel) which is equivalent to the diagonal of the outer product between $Df(x_0)$ and $x-x_0$.

One technical difficulty is to find a root point $x_0$. For continuous classifiers we may use unlabeled test data or by data produced by a generative model learned from the training data in a sampling approach and perform a line search between the prediction point x and a set of candidate points {x'} such that their prediction has opposite sign: f(x)f(x')<0. It is clear that the line l(a)=ax+(1−a)x' contains a root of $f$ which can be found by interval intersection. Thus each candidate point x' yields one root, and one may select a root point which minimizes the Taylor residuum or use an average over a subset of root points with low Taylor residues.

Note that Taylor-type decomposition, when applied to one layer or a subset of layers, can be seen as an approximate way of relevance propagation when the function is highly non-linear. This holds in particular when it is applied to the output function $f$ as a function of the preceding layer $f=f(z_{l-1})$, as Equation (18) satisfies approximately the propagation Equation (2) when the relevance of the output layer is initialized as the value of prediction function $f(x)$. Unlike the Taylor approximation, layer-wise relevance propagation does not require to use a second point besides the input point. The formulas in Section Pixel-wise Decomposition for Multilayer Networks will demonstrate that layer-wise relevance propagation can be implemented for a wide range of architectures without the need to approximate by means of Taylor expansion.

Pixel-Wise Decomposition for Multilayer Networks

Figure 8:
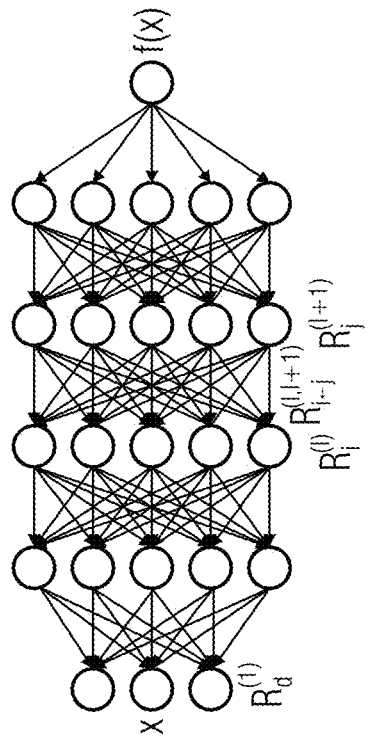
FIG. 8 illustrates an example for a multilayer neural network annotated with the different variables and indices describing neurons and weight connections. Left: forward pass. Right: backward pass.
Figure 8:
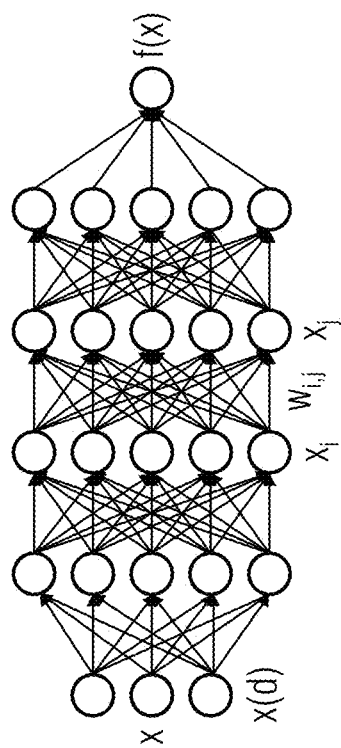

Multilayer networks are commonly built as a set of interconnected neurons organized in a layer-wise manner. They define a mathematical function when combined to each other, that maps the first layer neurons (input) to the last layer neurons (output). We denote each neuron by $x_i$ where i is an index for the neuron. By convention, we associate different indices for each layer of the network. We denote by "$\Sigma_i$" the summation over all neurons of a given layer, and by "$\Sigma_j$" the summation over all neurons of another layer. We denote by $x_{(d)}$ the neurons corresponding to the pixel activations (i.e. with which we would like to obtain a decomposition of the classification decision). A common mapping from one layer to the next one consists of a linear projection followed by a non-linear function:

$$z_{ij} = x_i w_{ij}, \tag{50}$$

$$z_j = \Sigma_i z_{ij} + b_j, \tag{51}$$

$$x_j = g(z_j), \tag{52}$$

where $w_{ij}$ is a weight connecting the neuron $x_i$ to neuron $x_j$, $b_j$ is a bias term, and g is a non-linear activation function (see FIG. 8 for clarifying the nomenclature used). Multilayer networks stack several of these layers, each of them, composed of a large number of neurons. Common non-linear functions are the hyperbolic tangent g(t)=tan h(t) or the rectification function g(t)=max(0,t). This formulation of a neural network is general enough to encompass a wide range of architectures such as the simple multilayer perceptron [39] or convolutional neural networks [25], when convolution and sum-pooling are linear operations.

Taylor-Type Decomposition

Denoting by $f: \mathbb{R}^M \mapsto \mathbb{R}^N$ the vector-valued multivariate function implementing the mapping between input and output of the network, a first possible explanation of the classification decision $x \mapsto f(x)$ can be obtained by Taylor expansion at a near root point $x_0$ of the decision function $f$:

$$R_d^{(1)} = (x - x_0)_{(d)} \cdot \frac{\partial f}{\partial x_{(d)}}(x_0) \tag{53}$$

The derivative $\partial f(x)/\partial x_{(d)}$ for pixel-wise decomposition can be computed efficiently by reusing the network topology using the backpropagation algorithm [39]. In particular, having backpropagated the derivatives up to a certain layer j, we can compute the derivative of the previous layer i using the chain rule:

$$\frac{\partial f}{\partial x_i} = \sum_j \frac{\partial f}{\partial x_j} \cdot \frac{\partial x_j}{\partial x_i} = \sum_j \frac{\partial f}{\partial x_j} \cdot w_{ij} \cdot g'(z_j). \tag{54}$$

A requirement of the Taylor-based decomposition is to find roots $x_0$ (i.e. points on the classification boundary) that support a local explanation of the classification decision for x. These roots can be found by local search in the neighborhood of x. However, as noted in [43], this can lead to points of the input space that are perceptually equivalent to the original sample x and whose choice as a root would produce non-informative pixel-wise decompositions.

Alternatively, root points can be found by line search on the segment defined by x and its closest neighbor of a different class. This solution is problematic when the data manifold is sparsely populated, as it is the case for natural images. In such case, it is likely that following a straight line between x and its nearest neighbor will strongly depart from the data manifold and produce roots $x_0$ with similarly poor pixel-wise decompositions.

Layer-Wise Relevance Backpropagation

As an alternative to Taylor-type decomposition, it is possible to compute relevances at each layer in a backward pass, that is, express relevances $R_i^{(l)}$ as a function of upper-layer relevances $R_j^{(l+1)}$, and backpropagating relevances until we reach the input (pixels). The method works as follows: Knowing the relevance of a certain neuron $R_j^{(l+1)}$ for the classification decision $f(x)$, one would like to obtain a decomposition of such relevance in terms of messages sent to neurons of the previous layers. We call these messages $R_{i \leftarrow j}$. In particular, as expressed by Equations (8) and (13), the conservation property $$\Sigma_i R_{i \leftarrow j}^{(l,l+1)} = R_j^{(l+1)} \tag{55}$$

is to hold.

In the case of a linear neuron $x_j = \Sigma_i z_{ij}$ where the relevance $R_j = f(x)$, such decomposition is immediately given by $R_{i \leftarrow j} = z_{ij}$. However, in the general case, the neuron activation $x_j$ is a non-linear function of $z_j$. Nevertheless, for the hyperbolic tangent and the rectifying function—two simple monotonically increasing functions satisfying g(0)=0,—the preactivations $z_{ij}$ still provide a sensible way to measure the relative contribution of each neuron $x_i$ to $R_j$. A first possible choice of relevance decomposition is based on the ratio of local and global preactivations and is given by:

$$R_{i \leftarrow j}^{(l,l+1)} = \frac{z_{ij}}{z_j} \cdot R_j^{(l+1)} \tag{56}$$

These relevances $R_{i \leftarrow j}$ are easily shown to approximate the conservation properties of Equation (2), in particular:

$$\sum_i R_{i \leftarrow j}^{(l,l+1)} = R_j^{(l+1)} \cdot \left(1 - \frac{b_j}{z_j}\right) \tag{57}$$

where the multiplier accounts for the relevance that is absorbed (or injected) by the bias term. If needed, the residual bias relevance can be redistributed onto each neuron $x_i$.

A drawback of the propagation rule of Equation (56) is that for small values $z_j$, relevances $R_{i \leftarrow j}$ can take unbounded values. Unboundedness can be overcome by introducing a predefined stabilizer $\epsilon \geq 0$:

$$R_{i \leftarrow j}^{(l,l+1)} = \begin{cases} \frac{z_{ij}}{z_j + \epsilon} \cdot R_j^{(l+1)} & z_j \geq 0 \\ \frac{z_{ij}}{z_j - \epsilon} \cdot R_j^{(l+1)} & z_j < 0 \end{cases} \tag{58}$$

The conservation law then becomes $$\sum_i R_{i \leftarrow j}^{(l,l+1)} = \begin{cases} R_j^{(l+1)} \cdot \left(1 - \frac{b_j + \varepsilon}{z_j + \varepsilon}\right) & z_j \geq 0 \\ R_j^{(l+1)} \cdot \left(1 - \frac{b_j - \varepsilon}{z_j - \varepsilon}\right) & z_j < 0 \end{cases} \quad (59)$$

where we can observe that some further relevance is absorbed by the stabilizer. In particular, relevance is fully absorbed if the stabilizer $\varepsilon$ becomes very large.

An alternative stabilizing method that does not leak relevance consists of treating negative and positive preactivations separately. Let $z_j^+ = \Sigma_i z_{ij}^+ + b_j^+$ and $z_j^- = \Sigma_i z_{ij}^- + b_j^-$ where "−" and "+" denote the negative and positive part of $z_{ij}$ and $b_j$. Relevance propagation is now defined as $$R_{i \leftarrow j}^{(l,l+1)} = R_j^{(l+1)} \cdot \left(\alpha \cdot \frac{z_{ij}^+}{z_j^+} + \beta \cdot \frac{z_{ij}^-}{z_j^-}\right) \quad (60)$$

Where $\alpha > 0$, $\beta < 0$, $\alpha + \beta = 1$. For example, for $\alpha = 2\beta = -1$, the conservation law becomes:

$$\sum_i R_{i \leftarrow j}^{(l,l+1)} = R_j^{(l+1)} \cdot \left(1 - \frac{b_j^+}{2z_j^+} - \frac{b_j^-}{2z_j^-}\right) \quad (61)$$

which has similar form to Equation (57). This alternate propagation method also allows to control manually the importance of positive and negative evidence, by choosing different factors $\alpha$ and $\beta$.

In the following, more generally we will write $R_{ij}$ for relevance messages from neuron j to neuron i, which is an upstream neighbor of neuron j. In particular case of a neural network with layered structure, $R_{ij}$ is a shortened way of writing $R_{i \leftarrow j}^{(l,l+1)}$, where i and j are neurons of layers l and l+1 respectively. Analogously we may drop the layer index for the relevance score of a neuron, and write $R_j$ instead of $R_j^{(l+1)}$.

In addition to the redistribution formulas above, we can define alternative formulas as follows:

$$R_{ij} = \frac{x_i w_{ij} + \frac{b_j}{n}}{h\left(\sum_r \left(x_r w_{rj} + \frac{b_j}{n}\right)\right)} R_j \quad \text{(equation A5)}$$

Or $$R_{ij} = \frac{x_i w_{ij}}{h\left(\sum_r \left(x_r w_{rj} + \frac{b_j}{n}\right)\right)} R_j \quad \text{(equation A6)}$$

where n is the number of upstream neighbor neurons of the respective neuron, $R_{ij}$ is the relevance value redistributed from the respective neuron j to the upstream neighbor neuron i and $R_j$ is the relevance of neuron j which is a downstream neuron of neuron i, $x_i$ is the activation of upstream neighbor neuron i during the application of the neural network, $w_{ij}$ is the weight connecting the upstream neighbor neuron i to the respective neuron j, $w_{rj}$ is also a weight connecting the upstream neighbor neuron r to the respective neuron j, and $b_j$ is a bias term of the respective neuron i, and $h(\ )$ is a scalar function. Typically $h(\ )$ is a numerical stabilizer term which keeps the value away from zero by adding a small $\varepsilon$, for example $h(x) = x + \varepsilon \cdot \text{sign}(x)$ Similarly, other alternatives are:

$$R_{ij} = \quad \text{(equation A7)}$$

$$\left(\alpha \frac{\left(x_i w_{ij} + \frac{b_j}{n}\right)_+}{h\left(\sum_r \left(x_r w_{rj} + \frac{b_j}{n}\right)_+\right)} - \beta \frac{\left(x_i w_{ij} + \frac{b_j}{n}\right)_-}{h\left(\sum_r \left(x_r w_{rj} + \frac{b_j}{n}\right)_-\right)}\right) R_j$$

Or $$R_{ij} = \quad \text{(equation A8)}$$

$$\left(\alpha \frac{(x_i w_{ij})_+}{h\left((b_j)_+ + \sum_r (x_r w_{rj})_+\right)} - \beta \frac{(x_i w_{ij})_-}{h\left((b_j)_- + \sum_r (x_r w_{rj})_-\right)}\right) R_j$$

Once a rule for relevance propagation has been selected, the overall relevance of each neuron in the lower layer is determined by summing up the relevance coming from all upper-layer neurons in consistence with Equations (8) and (13):

$$R_i^{(l)} = \Sigma_j R_{i \leftarrow j}^{(l,l+1)} \quad (62)$$

The relevance is backpropagated from one layer to another until it reaches the input pixels $x_{(d)}$, and where relevances $R_d^{(1)}$ provide the desired pixel-wise decomposition of the decision $f(x)$. The complete layer-wise relevance propagation procedure for neural networks is summarized in Algorithm 2.

---

Algorithm 2 Pixel-wise decomposition for neural networks

Input: $R^{(L)} = f(x)$
for $l \in \{L - 1, \ldots, 1\}$ do
    Compute $R_{i \leftarrow j}^{(l,l+1)}$ as in Equations (58) or (60)
    $R_i^{(l)} = \Sigma_j R_{i \leftarrow j}^{(l,l+1)}$
end for
Output: $\forall d: R_d^{(1)}$

---

Above formulas (58) and (60) are directly applicable to layers which satisfy a certain structure. Suppose we have a neuron activation $x_1$ from one layer which is modeled as a function of inputs from activations $x_i$ from the preceding layer. Then layer-wise relevance propagation is directly applicable if there exists a function $g_j$ and functions $h_{ij}$ such that $$x_j = g_j(\Sigma_i h_{ij}(x_i)) \quad (63)$$

In such a general case, the weighting terms $z_{ij} = x_i w_{ij}$ from Equation (50) have to be replaced accordingly by a function of $h_{ij}(x_i)$. We remark again, that even max pooling fits into this structure as a limit of generalized means, see Equation (32) for example. For structures with a higher degree of non-linearity, such as local renormalization [26, 36], Taylor approximation applied to neuron activation $x_j$ can be used again to achieve an approximation for the structure as given in Equation (63).

Finally, it can be seen from the formulas established in this section that layer-wise relevance propagation is different from a Taylor series or partial derivatives. Unlike Taylor series, it does not require a second point other than the input image. Layer-wise application of the Taylor series can be interpreted as a generic way to achieve an approximative version of layer-wise relevance propagation. Similarly, in contrast to any methods relying on derivatives, differentiability or smoothness properties of neuron activations are not a necessary requirement for being able to define formulas which satisfy layer-wise relevance propagation. In that sense it is a more general principle.

Generalized View

Above formulas A5-A8 can be generalized.

Let us assume that we have already the relevance scores $R_k^{(l+1)}$ for all neurons k at layer l+1. Note first, that the basic idea is to generate messages $R_{i \leftarrow k}^{(l,l+1)}$ such that equation (13)

$$R_k^{(l+1)} = \sum_{i:\ i\ is\ input\ for\ neuron\ k} R_{i \leftarrow k}^{(l,l+1)}$$

is satisfied, and then to compute from these messages the relevances $R_i^{(l)}$ for all neurons i at layer l. As described above, equations A5 to A8 are examples on how to compute the messages $R_{i \leftarrow k}^{(l,l+1)}$. The in the approach described above equation (8)

$$R_i^{(l)} = \sum_{k:\ i\ is\ input\ for\ neuron\ k} R_{i \leftarrow k}^{(l,l+1)}$$

was used to compute the relevances $R_i^{(l)}$ for all neurons i at layer l.

A first generalization can be made with respect to equation (8):

Given all the messages $R_{i \leftarrow k}^{(l,l+1)}$, we can compute the relevances $R_i^{(l)}$ for all neurons i at layer l by using another function than the sum of relevance messages $R_{i \leftarrow k}^{(l,l+1)}$, which we denote as $m(\cdot)$, and which takes the messages $R_{i \leftarrow k}^{(l,l+1)}$ as input: The relevance of a neuron i is computed by a function $m(\cdot)$ as $$R_i^{(l)} = m(\{R_{i \leftarrow k}^{(l,l+1)} | k:\ i\ is\ input\ for\ neuron\ k\})$$

which should be monotonically increasing in each of its arguments and can be seen as a generalization of the sum in equation (8). When using the terminology of upstream and downstream neurons, we can write:

$$R_i = m(\{R_{i \leftarrow k} | k\ is\ downstream\ neuron\ of\ i\})$$

A slightly less general but possibly frequently used variant of this generalization is:

$$R_i = m_2\left( \sum_{k\ is\ downstream\ neuron\ of\ i} m_3(R_{i \leftarrow k}) \right)$$

With $m_2$ and $m_3$ being a monotonically increasing function of one variable.

For example:

$$R_i = c\left( \sum_{k\ is\ downstream\ neuron\ of\ i} (R_{i \leftarrow k})^2 \right)^{1/n}$$

Where c is a constant which is chosen such that relevance conservation holds. This example puts more weight on large terms for large values of n.

A second generalization can be made with respect to equation (13), when considering formulas A5 to A8 in which $R_{i \leftarrow k}^{(l,l+1)}$ is a term times $R_k^{(l+1)}$:

$$R_{i \leftarrow k}^{(l,l+1)} = q(i) R_k^{(l+1)}$$

Where q(i) is a weight function such that $$1 = \sum_{k:\ i\ is\ input\ for\ neuron\ k} q(i) = \sum_{i\ is\ upstream\ neuron\ of\ k} q(i)$$

Which ensures that equation (13) still holds.

Since the neuron relevance scores for neurons k at layer l+1 have been previously computed from neuron relevance scores for neurons p at layer l+2, we can also rewrite above equation as:

$$R_{i \leftarrow k}^{(l,l+1)} = q(i) m(\{R_{k \leftarrow p} | p\ is\ downstream\ neuron\ of\ k\})$$

Therefore we arrive at the first level of generalization:

Generalization 1

Given a set of neuron relevance scores $R_k$ for a set of neurons {k}, we compute relevance messages to the set of neurons {i} which are upstream neurons for the set of neurons {k} such that there is a message weighting function $q(\cdot)$ such that $R_{i \leftarrow k} = q(i) R_k$.

Given a set of relevance messages $R_{i \leftarrow k}$, we compute the relevance score of a neuron i by a function $m(\cdot)$ which is monotonously increasing in its arguments such that:

$$R_i = m(\{R_{i \leftarrow k} | k\ is\ downstream\ neuron\ of\ i\})$$

In particular, when using only relevance message terms, and assuming we have the messages $\{R_{k \leftarrow p} | p\ is\ downstream\ neuron\ of\ k\}$ for all neurons k which are downstream neurons of neuron i, then we can compute:

$$R_{i \leftarrow k} = q(i) m(\{R_{k \leftarrow p} | p\ is\ downstream\ neuron\ of\ k\})$$

End of Generalization 1

In addition, we may need the relevance conservation property to be satisfied. This is the case, for example if, the network is layered, the function $m(\cdot)$ is a sum over elements, and if equation $$1 = \sum_{k:\ i\ is\ input\ for\ neuron\ k} q(i) = \sum_{i\ is\ upstream\ neuron\ of\ k} q(i)$$

holds.

Note that requirements of numerical stability may entail including numerical stabilizer terms such that the relevance conservation property is satisfied only approximately, for example that the layer-wise sum of relevances is equal up to deviations of 5%. See the function $h(z) = z + \varepsilon \cdot sign(z)$ used in formulas A5 and A6 as an example for a numerical stabilizer.

Generalization 2

The requirement of relevance conservation property up to some tolerance be expressed by conditions like:

$$0.95 \sum_{k\ is\ neuron\ at\ layer\ l+1} R_k \leq \sum_{i\ is\ neuron\ at\ layer\ l} R_i \leq 1.05 \sum_{k\ is\ neuron\ at\ layer\ l+1} R_k$$

In terms of upstream and downstream terminology this would be:

$$0.95 \sum_{k \text{ is downstream neuron for some neuron from set } I} R_k \leq$$

$$\sum_{i \text{ is neuron from a set } I} R_i \leq 1.05 \sum_{k \text{ is downstream neuron for some neuron from set } I} R_k$$

This can be also reformulated with two different views. In the first view, we consider only the initial relevance R from the output and the relevances $R_i$ for each item in the set of input items which serve as inputs to the neural network. Then we can formulate the above requirement in these terms without specifying the sum of relevances in intermediate layers of the neural network:

$$0.95 R \leq \Sigma_{i \text{ in items}} R_i \leq 1.05 R$$

In the second view, we consider instead of relevances scores for neurons, relevance messages between neurons which enter and leave one fixed neuron.

The sum of messages which enter a particular neuron j from all its downstream neurons is to approximately equal to the sum of messages which are sent from neuron j to its upstream neurons, again exemplarily with a 5% tolerance:

$$0.95 \sum_{k \text{ is upstream neuron of neuron } j} R_{jk} \leq$$

$$\sum_{i \text{ is downstream neuron of neuron } j} R_{ij} \leq 1.05 \sum_{k \text{ is upstream neuron of neuron } j} R_{jk}$$

End of Generalization 2

All these three views can be generalized further when we consider for the middle term a monotonic function $\zeta$, f or $\xi$ or which solely depends on its input:

Generalization 2B

View 1: relevance scores $R_k$ of neurons $$0.95 \sum_{k \text{ is downstream neuron for some neuron from set } I} R_k \leq$$

$$\zeta\left(\sum_{i \text{ is neuron from a set } I} R_i\right) \leq 1.05 \sum_{k \text{ is downstream neuron for some neuron from set } I} R_k$$

View 2: relevance score R of the output neurons and relevance scores for the items in the set of input items $$0.95 R \leq f(\Sigma_{i \text{ in items}} R_i) \leq 1.05 R$$

View 3: relevance messages $R_{jk}$ for upstream and downstream neuron neighbors of neuron j.

$$0.95 \sum_{k \text{ is upstream neuron of neuron } j} R_{jk} \leq$$

$$\xi\left(\sum_{i \text{ is downstream neuron of neuron } j} R_{ij}\right) \leq 1.05 \sum_{k \text{ is upstream neuron of neuron } j} R_{jk}$$

End of Generalization 2B

Now let's consider a third level of generalization.

Inspecting equations A5 to A8 we can identify some additional requirements for above levels of generalization. First of all q(i) in equations A5 to A8 depends on the weighted activations $z_{ij}$. The difference between formulas A5 versus A6 and A7 versus A8 lies merely in the definition of weighted activations $z_{ij}$.

In A5 and A7 the weighted activation is $z_{ij} = x_i w_{ij}$. In A6 and A8 the weighted activation is $$z_{ij} = x_i w_{ij} + \frac{b_j}{l}$$

where $b_j$ is the bias of neuron j and l is the number of upstream neurons for neuron j. This difference of definition of weighted activation comes from two different views of the bias term. In the first equation $z_{ij} = x_i w_{ij}$ the bias term is modeled by a separate neuron which outputs a constant output with value equaling the value of $b_j$. Since the bias is generated by a separate neuron, it does not enter the computations of weighted activations.

In the second view, the bias is an additional term which is added to the each input to neuron j—this explains the added term $$\frac{b_j}{l}$$

in the second definition of weighted activation.

So actually we have only two base formulas derived from the two equations A5 and A7 with two different ways to define the weighted activation $z_{ij}$.

$$R_{ij} = \frac{z_{ij}}{h(b_j [\![A]\!] + \Sigma_r z_{ij})} \sum_k R_{jk} \qquad \text{equation (A5*)}$$

And $$R_{ij} = \qquad \text{equation (A7*)}$$
$$\left(\alpha \frac{(z_{ij})_+}{h((b_j)_+ [\![A]\!] + \Sigma_r (z_{ij})_+)} - \beta \frac{(z_{ij})_-}{h((b_j)_- [\![A]\!] + \Sigma_r (z_{ij})_-)}\right)$$
$$\sum_k R_{jk}$$

Where $[\![A]\!]$ is one if the definition of $z_{ij}$ does not incorporate the bias, that is if $z_{ij}$ is defined as $z_{ij} = x_i w_{ij}$, and zero otherwise. Here we used implicitly $$R_j = \sum_{k \text{ is downstream neuron of } j} R_{jk}$$

instead of the general definition of neuron relevance score $R_j$ by a monotonically increasing function $m(\cdot)$. In these special cases given by equations A5* and A7* we have $$q(i) = \frac{z_{ij}}{h((b_j) [\![A]\!] + \Sigma_r z_{rj})}$$

And $$q(i) = \left(\alpha \frac{(z_{ij})_+}{h((b_j)_+ [\![A]\!] + \Sigma_r (z_{rj})_+)} - \beta \frac{(z_{ij})_-}{h((b_j)_- [\![A]\!] + \Sigma_r (z_{rj})_-)}\right)$$

This inspection leads to the third level of generalization:
Generalization 3

The function $q(i)$ depends on weighted activations $z_{ij}$ where the weighted activation is a function of the neuron activations $x_i$, the connection weights $w_{ij}$ and bias terms $b_j$.

$$z_{ij} = s(x_i, w_{ij}, b_j),$$

As special cases $$z_{ij} = x_i w_{ij}$$

and $$z_{ij} = x_i w_{ij} + \frac{b_j}{I}$$

End of Generalization 3

Finally there is a fourth level of generalization. When inspecting equations A5* and A7* one can see one implicit property—namely the dependence of $q(i)$ on the ordering of weighted activations $z_{ij}$. Intuitively if for two neurons $i_1$ and $i_2$ one of the weighted activation is larger than the other: $z_{i_1 j} < z_{i_2 j}$, then neuron $i_2$ should also receive a larger share of the relevance from neuron $j$ than neuron $i_1$. Care has to be taken to define this intuitive notion, however, because the neuron relevance scores $R_j$, the weighted activations $z_{ij}$ and the weights $q(i)$ may have different signs, which leads to sign flippings in the resulting relevance message $R_{i \leftarrow j}$. That's why one CANNOT simply claim $z_{i_1 j} < z_{i_2 j} \Rightarrow q(i_1) < q(i_2)$. To give a counterexample: in formula A5* if $0 < z_{i_1 j} < z_{i_2 j}$ but $h(b_j \llbracket A \rrbracket + \Sigma_r z_{rj}) < 0$ then it follows: $q(i_1) > q(i_2) > 0$. However what holds in this case is: $|q(i_1)| < |q(i_2)|$ because the term $h(b_j \llbracket A \rrbracket + \Sigma_r z_{rj})$ is the same for $q(i_1)$ and $q(i_2)$.

Inspecting formulas A5* AND A7* one can come up with a set of ordering properties which is satisfied by these formulas. One way to define ordering properties is to consider a generalization of absolute values of weighted activations $z_{ij}$ and the absolute values of the message weighting function $(\cdot)$.

For formula A5* the following ordering property does hold:

$$|z_{i_1 j}| < |z_{i_2 j}| \Rightarrow |q(i_1)| < |q(i_2)|$$

For formula A7* a slightly different ordering property does hold. Consider $$\alpha^* = \frac{\alpha}{h\left((b_j)_+ \llbracket A \rrbracket + \sum_r (z_{rj})_+\right)}$$

And $$\beta^* = \frac{\beta}{h\left((b_j)_- \llbracket A \rrbracket + \sum_r (z_{rj})_-\right)}$$

Then for the function $$g(z) = \alpha^*(z)_+ - \beta^*(z)_- = \alpha^* \max(0, z) - \beta^* \min(0, z)$$

the following ordering property does hold:

$$g(z_{i_1 j}) < g(z_{i_2 j}) \Rightarrow |q(i_1)| < |q(i_2)|$$

Note here that $|z| = \alpha(z)_+ - \beta(z)_-$ with $\alpha = 1$, $\beta = 1$ so that the function $g(\cdot)$ Also includes the ordering property for formula A5* with different values for $\alpha$, $\beta$.

A further generalization of the function $g(\cdot)$ given above leads to a function that has its minimum at zero, and that is monotonically decreasing on the interval $(-\infty, 0)$ and monotonically increasing on the interval $(0, +\infty)$.

Therefore we arrive at
Generalization 4

The message function $q(\cdot)$ needs to satisfy the ordering property that for all $i_1$ and $i_2$ being upstream neighbor neurons of neuron $j$ for which $$g(z_{i_1 j}) < g(z_{i_2 j})$$

it holds true that $|q(i_1)| \leq |q(i_2)|$ for a function $g(\cdot)$ that has its minimum at zero, and that is monotonically decreasing on the interval $(-\infty, 0)$ and monotonically increasing on the interval $(0, +\infty)$.

In particular one choice for the function $g(\cdot)$ is $g(z) = \alpha \max(0, z) - \beta \min(0, z)$ with $\alpha \geq 0$, $\beta \geq 0$
End of Generalization 4

Another way to define ordering properties is to restrict oneself to the case when $R_j > 0$. That makes sense when one is not interested in propagating negative neuron relevances. To understand this, one should consider that one is usually interested in making predictions for single items in a set of items, when the prediction made by the neural net is certain about the presence of a structure, which implies that the output of the neural has highly positive scores on the set of items as input. If the output of the neural has highly positive scores, then one can expect that most of neuron relevances are positive, too, simply because most neurons are supporting the highly positive prediction of the neural net, and therefore one can ignore the minor fraction of neurons with negative relevances in practice.

To deduce another ordering property please note that if $\Sigma_i z_{ij} > 0$, then we also have if $h(\Sigma_i z_{ij}) > 0$ for $h(t) = t + \varepsilon \, \text{sign}(t)$.

In particular, when considering formula A5*, then the following ordering property holds:

If $\Sigma_i z_{ij} > 0$, then for all $i_1$ and $i_2$, which are upstream neurons of neuron $j$, we have:

$$z_{i_1 j} < z_{i_2 j} \Rightarrow q(i_1) < q(i_2)$$

If $\Sigma_i z_{ij} < 0$, then for all $i_1$ and $i_2$, which are upstream neurons of neuron $j$, we have:

$$z_{i_1 j} < z_{i_2 j} \Rightarrow q(i_1) > q(i_2)$$

This property does not hold for formulas A7*.
Generalization 5

The message function $q(\cdot)$ needs to satisfy the ordering property that if $R_j > 0$ and $\Sigma_i z_{ij} > 0$, then for all $i_1$ and $i_2$, which are upstream neurons of neuron $j$, we have: $z_{i_1 j} < z_{i_2 j} \Rightarrow q(i_1) < q(i_2)$
End of Generalization 5

Another ordering property, which can be useful for the case $R_j > 0$, would be:

$$0 < z_{i_1 j} < z_{i_2 j} \Rightarrow 0 < q(i_1) < q(i_2)$$

This holds for formula A7*.

There is a further ordering property which also holds for both formulas, A5* and A7*, namely if we compare only weighted activations having the same sign:

The message function $q(\cdot)$ needs to satisfy the ordering property that if $|z_{i_1 j}| < |z_{i_2 j}|$ and $(z_{i_1 j}) = \text{sign}(z_{i_2 j})$, then it holds true that $|q(i_1)| \leq |q(i_2)|$. This is a way to replace the function $g(\cdot)$ by the absolute value.

Note that formula A5* satisfies a more narrow ordering property, namely $$|z_{i_1 j}| < |z_{i_2 j}| \Rightarrow |q(i_1)| < |q(i_2)|$$

All these formulas hold, when we plug in $z_{ij}=x_iw_{ij}$ or $$z_{ij} = x_iw_{ij} + \frac{b_j}{l},$$

so that we could create from each of above ordering properties two versions depending on what definition of the weighted activations $z_{ij}$ we use.

Note that there are other possibilities to define ordering properties.

For example the following eight conditions would also yield meaningful ordering properties which are expressed in terms of relevance messages:

$$|x_iw_{ij}| < |x_kw_{kj}| \Rightarrow |R_{ij}| < |R_{kj}|$$

OR $$\left|x_iw_{ij} + \frac{b_j}{n}\right| < \left|x_kw_{kj} + \frac{b_j}{n}\right| \Rightarrow |R_{ij}| < |R_{kj}|$$

OR $$|x_iw_{ij}| < |x_kw_{kj}| \text{ and } \text{sign}(x_iw_{ij}) = \text{sign}(x_kw_{kj}) \Rightarrow |R_{ij}| < |R_{kj}|$$

OR $$\left|x_iw_{ij} + \frac{b_j}{n}\right| < \left|x_kw_{kj} + \frac{b_j}{n}\right| \text{ and } \text{sign}\left(x_iw_{ij} + \frac{b_j}{n}\right) =$$

$$\text{sign}\left(x_kw_{kj} + \frac{b_j}{n}\right) \Rightarrow |R_{ij}| < |R_{kj}|$$

OR $$\left(R_j > 0 \bigwedge \sum_i x_iw_{ij} > 0\right) \Rightarrow (\forall \, i, k: x_iw_{ij} < x_kw_{kj} \Rightarrow R_{ij} \leq R_{kj})$$

OR $$\left(R_j > 0 \bigwedge \sum_i x_iw_{ij} > -b_j\right) \Rightarrow (\forall \, i, k: x_iw_{ij} < x_kw_{kj} \Rightarrow R_{ij} \leq R_{kj})$$

OR $$\forall \, i, k: (R_j > 0 \wedge (0 < x_iw_{ij} < x_kw_{kj})) \Rightarrow (0 \leq R_{ij} \leq R_{kj})$$

OR $$\forall \, i, k: \left(R_j > 0 \bigwedge \left(-\frac{b_j}{n} < x_iw_{ij} < x_kw_{kj}\right)\right) \Rightarrow (0 \leq R_{ij} \leq R_{kj})$$

Instead of applying the Taylor expansion onto the network output function as a function of the network inputs, the Taylor expansion can be also applied to redistribute the relevance score of a single neuron onto its upstream neighbors. This allows to combine the presented strategies above for one set of neurons with relevance distribution according to Taylor distribution for another set of neurons. Taylor expansion could be used in the following way: suppose $x_j$ $(x_{i_1}, \ldots, x_{i_n})$ is the neuron activation function of neuron $j$ as a function of the inputs $x_{i_k}$ of upstream neighbor neurons $i_1, \ldots, i_n$. Then let $$\sum_k \frac{\partial x_j}{\partial x_{i_k}} \bigg|_{\{(\tilde{x}_{i_1}, \ldots, \tilde{x}_{i_n})\}} \cdot (x_{i_k} - \tilde{x}_{i_k})$$

be the Taylor expansion of $x_j$ for the inputs $(x_{i_1}, \ldots, x_{i_n})$ around a point $(\tilde{x}_{i_1}, \ldots, \tilde{x}_{i_n})$. Then we can use Taylor expansion with above formulas by setting:

$$z_{i_k,j} = \frac{\partial x_j}{\partial x_{i_k}} \bigg|_{\{(\tilde{x}_{i_1}, \ldots, \tilde{x}_{i_n})\}} \cdot (x_{i_k} - \tilde{x}_{i_k}).$$

Various Additional Explanations

Thus, state-of-the-art classifiers such as deep neural networks (DNNs) work as follows.
1) A network structure (e.g. number of layers, units etc.) is designed by the human.
2) The network parameters (weights) are trained/optimized using potentially millions of labeled (and unlabeled) data samples e.g. images. Note that some pre-trained networks are available on the web.
3) The network can be applied to a new image and is able to e.g. classify an image as belonging to a specific class, e.g., the class of 'images containing a shark', 'text documents which are news articles' or 'persons lacking creditworthiness'.
4) Since the network is highly non-linear and very complex, it is hard to understand why this particular image is classified as 'shark'. Thus, the network acts as a black box (see FIG. 4).
5) The presented embodiments are able to explain why the classifier arrives at its decision, i.e., we are able to visualize where (e.g. in terms of pixels) the important information is located. Abstractly speaking we are able to break down the classification decision which was computed on a large scale (e.g. whole image, whole text document) to smaller scales (e.g. individual pixels, individual words).
6) Since DNNs can not only be trained on images, but have been applied to practically every type of data e.g. time series, words, physical measurements etc. the principles of the described embodiments are applicable to many different scenarios.

The description brought forward with respect to FIGS. 5 to 10 shall, in the following, be used in order to provide some additional notes on the description of the relevance score assignment apparatus of FIG. 4. It has already been described above that apparatus 50 may merely be configured to perform the redistribution 52. Additionally, however, the apparatus 50 may also be configured to perform the actual application of the artificial neural network 10 onto set 16. Thus, apparatus 50 may, for this alternative, be thought of as comprising a neural network processor for which the reference sign 10 could be reused, and a redistribution processor for which the reference sign 52 could be reused. In either case, apparatus 50 could, for example, comprise the storage or memory 46. Interestingly, however, it should be noted that there may be a gap between the layer from which on the prediction process, such as classification process, involves network 10 on the one hand and the layer up to which the reverse propagation process 52 traverses through network 10 reversely. In the case of FIGS. 1a-c and 2a-c, for example, it has been illustrated that the forward propagation 14 involved in the prediction process spans or encompasses the same layers of network 10 as the reverse propagation process 32. That is, the forward propagation process 14 or network 10 was directly applied onto set 16 and the reverse propagation 32 directly ended-up into relevance scores for the set 16. In case of FIGS. 1b and 2b, for example, within the prediction process, this set 16 was pre-filled by way of the feature extraction process 30, and in order to highlight the relevant portions of increased relevance score, for example, in a manner overlaid with the original image 22, a reversal of this feature extraction, namely 38, has been used in order to extend the back propagation process and perform the highlighting of relevant portions in the spatial (pixel) domain. However, the description set out above also revealed that the feature extraction process 30 may alternatively be translated into, or described, using one or more additional layers of the artificial neural network, i.e. layers of neurons preceding the actual (trained) portion of network 10 in forward propagation direction 14, i.e. the layers or portion 21. These layers which merely mirror the task of the feature extraction 30 do not need to be actually traversed in the backward propagation in the relevance assignment process. However, these additional (translated) layers of portion 21 at the higher level side may be traversed in the forward propagation process during the prediction process, namely at its end beginning before traversing the actual (trained) portion of network 10. Thereby, relevance scores $R_i$ would be obtained for feature samples rather than pixels. Differently speaking, the relevance can be decomposed not only in terms of input variables (e.g. red, green, and blue components of each pixel in case of images or components of the vector associated to each word in case of texts), but also in terms of nonlinear transformation of these items (e.g. neurons at certain layer of the network). Thus, one may want to stop the relevance back projection at certain intermediate layer. Naturally, the example of this gap between the starting point of forward propagation on the one hand and the end-point in the reverse propagation 32 on the other hand may be applied onto other sort of data as well, i.e. onto data other than images such as, for example, audio signals, texts or the like.

Additional notes seem to be worthwhile with respect to the sort of network output 18 and the items 42 of set 16. With respect to network output 18, it has also been outlined above that same may be a scalar or a vector, the scalar or the components of the vector being, for example, real values. The relevance value R derived therefrom may be a real value derived from the scalar or one of the components of the vector, respectively. With respect to the "items" 42, the above examples should have already made it sufficiently clear that same may, likewise, be scalars or vectors. The juxtaposition of FIGS. 1a and 2a on the one hand and FIGS. 1c and 2c on the other hand renders this clear. In case of pixels of colored pictures, such as depicted in FIGS. 1c and 2c, the pixel values are vectors, namely here exemplarily vectors of three or even more components corresponding to three (or more) scalar color components such as RGB, CMYK or the like. The items 42 of set 16 are the pixel's scalar components. The redistribution of the relevance value onto the set of items results in a relevance value $R_i$ for each item, namely each component for each pixel. In order to derive one scalar relevance value for each pixel, the relevance values of all components of the respective pixel may be summed-up in order to obtain such a common relevance value for that pixel. This has been shown at 37 in FIG. 2c. Similar measures may occur in cases of texts. Thus, the relevance decomposition in terms of input variables can be regrouped in a way that allows for an easy visualization and interpretation of the relevance decomposition. For example, in order to visualize the relevance as a heatmap in the pixel domain, one can sum for each pixel the relevance associated to its red, green and blue components as explained with respect to FIG. 2c. Similarly, for text analysis, in order to visualize the relevance decomposition of a document as a heatmapped text, one can sum for each word the relevance associated to each component of the corresponding vector.

Other examples could be assessed as well. Circumstances such as imposed by the stabilizing function h(·) (see equations A5* and A7*), however, may result in relevance "leakage" so that the relevance property described, for example, by way of the aforementioned functions f, ξ and ζ from generalization 2B might, for example not be met for each set 16 of items. For example, it may only be met for sets or items resulting in a network output reaching at least 75% of the maximum network output. Imagine, for example, the prediction performed by an artificial neural network is whether a certain picture shows a "cat", then predictions for images for which the prediction at the network output results in a value of higher than 75% that same show a cat, may, when subject to the reverse propagation, result in relevance scores for the pixels which meet the condition concerning f (for all of them or at least more than 99%) while other pictures might not or not with certainty.

From another point of view, the distribution function should advantageously be selected such that same results in "meaningful" reverse propagated relevance scores. To this end, the distribution function may obey some "ordering" property, additionally or alternatively to the relevance conservation property. In other words, even without obeying the relevance conservation property discussed above, the distribution function may result in meaningful reversely propagated relevance scores. In particular, for each neuron j, the distribution function yielding how much relevance $R_{ij}$ is redistributed from the respective neuron j to the upstream neighbor neuron i may be $$R_{ij}=q(i)\cdot m(\{R_{jk}, k \text{ is downstream neuron of } j\})$$

where $m(\mathbb{R}^K)$ with K being the number of downstream neighbors of the respective neuron j is a monotonically increasing function for all its components and yields the preliminarily redistributed relevance value of the respective neuron j and q(i) is a function satisfying an ordering property depending on activations $x_i$ of upstream neighbor neurons i of the respective neuron j—with l being the number of upstream neighbor neurons i—and weights $w_{ij}$ connecting the upstream neighbor neuron i to the respective neuron j, and, if present, a bias term $b_j$ of the respective neuron j which is assumed to be zero if absent, where the ordering property is one of those given in and around generalization 4 and generalization 5.

It should be noted as well that FIG. 4 concurrently reveals a diagram of a relevance score assignment process and that the elements shown therein, such as 10 and 52, represent process steps performed during such a method/process, wherein steps such as 30 and 38 represent optional steps or tasks additionally performed during the process. Alternatively, apparatus 50 may be configured to additionally perform tasks 30 and 38 or 30. For example, all of these tasks may represent different portions of a code of a computer program on the basis of which the process or apparatus 50 is implemented.

Further, the above description shall, in the following, be described using some different terminology in order to avoid a misunderstanding with respect to the scope of the present application.

In particular, the above description reveals an analysis of a prediction made on a sample, wherein the "sample" is a set 16 of items. The prediction is the process of deriving the network output on the basis of the set 16 of items and is performed by mapping, which takes the sample as input. The prediction is made on the sample as a whole and results in a vector-valued or real-valued output or an output which can be transformed into a vector-valued or real-valued output, i.e. the network output 18. The prediction mapping involves the forward propagation 14 through the neural network. It can be decomposed in the following way: it consists of elements 12 which take inputs and compute an output by applying a function to the inputs, namely the neural function. At least one element 12 has one item of the sample, i.e. of set 16, as input. The model is made without loss of generality such that each element takes at most one item of the sample as input. At least one element 12 takes outputs of other elements as input. These may be, as described above, weighted by multiplying a value which depends on the element 12 and its input. At least one of the weights is non-zero. The output of at least one element is used for making the prediction of the sample. There is a connection from sample item to predictions in the model.

Worded differently, the above outlined (layered) reverse propagation is performed on the assumption that a prediction on the set of items has already been performed. The process starts with the initialization of the relevance of all those elements which were directly computed by the prediction, i.e. on the basis of the network output. If this output is real-valued, then the relevance R forms the output neuron which computed the respective prediction network output is initialized by use of the prediction value of the model. If the output is vector valued, then the relevance R may be set for all output neurons, may be initialized by using the initialization described for the case of real-value outputs for the one output neuron case and by setting the relevance to zero for the remaining output neurons. After initialization, the following two formulas are subject to computation in an alternating fashion.

In particular, for each element (neuron) k, for which a relevance $R_k$ has been already computed, messages $R_{i \leftarrow k}$ for all elements i which provide inputs to element k are computed such that $$R_k = \sum_{i | i \text{ provides input to } k} R_{i \leftarrow k} \quad \text{(Equation A1)}$$

$$R_i = \sum_{k | k \text{ receives input from } i} R_{i \leftarrow k} \quad \text{(Equation A2)}$$

Alternatively one can use equation A2 only and compute the messages $R_{i \leftarrow k}$ implicitly only, in a manner such that they satisfy equation A1.

In case the neural network contains cycles, i.e., the neural network is recurrent and has time-dependent state, its structure can be unfolded in time resulting in a feedforward mapping to which we can apply the same procedure as described above. By unfolding in time we mean having one layer that models the state of the network in each time step.

At least one of the messages $R_{i \leftarrow k}$ may be replaced by a random value before computing the relevance $R_i$ of the inputting element i (even if that $R_{i \leftarrow k}$ message can be computed because at some step the relevance $R_k$ needed for its computation has been computed).

At least one of the messages $R_{i \leftarrow k}$ may be replaced by a constant value before computing the relevance $R_i$ of the inputting element i (even if that $R_{i \leftarrow k}$ message can be computed because at some step the relevance $R_k$ needed for its computation has been computed).

In a following we provide a more technical view on the layer-wise relevance propagation principle. Each layer shall be assigned an index. The first layer has index 1, the last layer the highest index. A score for each item in the set 16 may be computed in the following way: We assume that we have already a prediction on the ordered collection of items.

Firstly, initialize the relevance of the last layer which is the output layer as described below:
  if the output is real-valued, then initialize the relevance for the single element in the last layer as the prediction value of the model.
  If the output is vector-valued, then initialize the relevance for all elements in the last layer by either using the initialization described for the case of real-valued outputs for at least one element in the output layer and by setting the relevance to zero for the remaining elements.

Secondly, perform an iteration over the layers from one layer index to the upstream layer.

The iteration is done as follows:

Given the relevances $R_k^{(l+1)}$ for all elements in the current layer (indexed as l+1), compute message terms $R_{i \leftarrow k}^{(l,l+1)}$ from each element in the current layer (index l+1) to all elements in the upstream layer (index l) such that $$R_k^{(l+1)} = \sum_{i : i \text{ is input for element } k} R_{i \leftarrow k}^{(l,l+1)} \quad \text{(Equation A3)}$$

holds up to approximation errors.

Given all messages $R_{i \leftarrow j}^{(l,l+1)}$ from the layer to its upstream layer, compute the relevance for the upstream layer by $$R_i^{(l)} = \sum_{k : i \text{ provides input for element } k} R_{i \leftarrow k}^{(l,l+1)} \quad \text{(Equation A4)}$$

From here the iteration would be carried out for the next upstream layer l−1, because all relevances $R_i^{(l)}$ at layer l have been computed.

The result of the iteration through all layers down to layer 1 are relevance scores $R_d^{(1)}$ for all elements in the first layer, which are the scores for the items in the ordered collection.

The result of the method is one score per item which denotes the relevant of the item for the prediction made on the ordered collection of items OR the result is the score combined with at least one of the following
  a mapping of these scores onto a color such that each interval of scores is mapped onto one color
  sorted list of items according to an order determined by the scores for each item
  It may be that
  If the function is at layer l, then we denote the output value of an element indexed with the letter i as $x_i^{(l)}$
  The connections from one element indexed as i to another element indexed as j can have weights $w_{ij}$
    which are multiplied to the output from the previous element. Therefore the input to an element indexed as j from an element in layer l indexed as i can be written as $$z_{ij} = x_i^{(l)} w_{ij}$$

Bias terms can be represented by elements which take no input and provide constant outputs.

In particular we compute the messages terms $R_{i \leftarrow j}^{(l,l+1)}$ by applying to at least one element in the model and to the set of inputs of this element at least one of the following sets of formulas:
equations A5 or A6 or A7 or A8 (given above)
The message terms $R_{i \leftarrow j}^{(l,l+1)}$ may be computed by applying to at least one element in the model and to the set of inputs of this element at least one of the above Equations A1-A26.

The sample may be an ordered collection of items. In the following we will give a list of several possible examples of ordered collections of items.

The ordered collection of items may be an image and each item may be a set of one or more pixels thereof.

The ordered collection of items may be a text and each item may be a set of one or more words thereof.

The ordered collection of items may be a text and each item may be a set of one or more sentences thereof.

The ordered collection of items may be a text and each item may be a set of one or more paragraphs thereof.

The ordered collection of items may be a list of key value pairs and each item may be a set of one or more key value pairs thereof.

The ordered collection of items may be a list of key value pairs of financial data or company-related data and each item may be a set of one or more key value pairs.

The ordered collection of items may be a video and each item may be a set of one or more pairs of pixels with timestamps.

The ordered collection of items may be a video and each item may be a set of one or more frames The ordered collection of items may be a video and each item may be a set of one or more pixels.

Technical Specification of a Learnable Neural Network

The following paragraph describes a neural network in a way that most of its layers are learned during a training phase which is a difference to other types of shallow learning algorithms. It may have the following properties
  If the model is two layered at test time, then the first layer weights are optimized using a set of training data and an error measure which depends on a subset of the training data.
  if the model is three or four layered at test time, then at least the first or the second layer weights are optimized using a set of training data and an error measure which depends on a subset of the training data.
  if the model is five or more layered at test time, then at least the weights of one layer from the first layer until the third last layer are optimized using a set of training data and an error measure which depends on a subset of the training data. (this allows for the last layers also to be optimized)
  At least one of the elements in the layer may be rectified linear activation units.
  At least one of the elements in the layer may be Heaviside activation units.
  At least one of the elements in the layer may be tan h activation units.
  At least one of the elements in the layer may be logistic activation units.
  At least one of the elements in the layer may be sigmoidal activation units.

Experiments

We show results on two data sets, two sets of results on MNIST which are easy to interpret, and a second set of experiments in which we rely on a 15-layer already trained network provided as part of the Caffe open source package [20], which predicts the 1000 categories from the ILSVRC challenge. On one side, by the experiments on MNIST digits, we intend to show that we can uncover details specific to the training phase. On the other side, the results for the pretrained network from the Caffe toolbox demonstrate, that the method works with a deep neural network out of the box and does not rely on possible tricks during the training phase.

Figure 9:
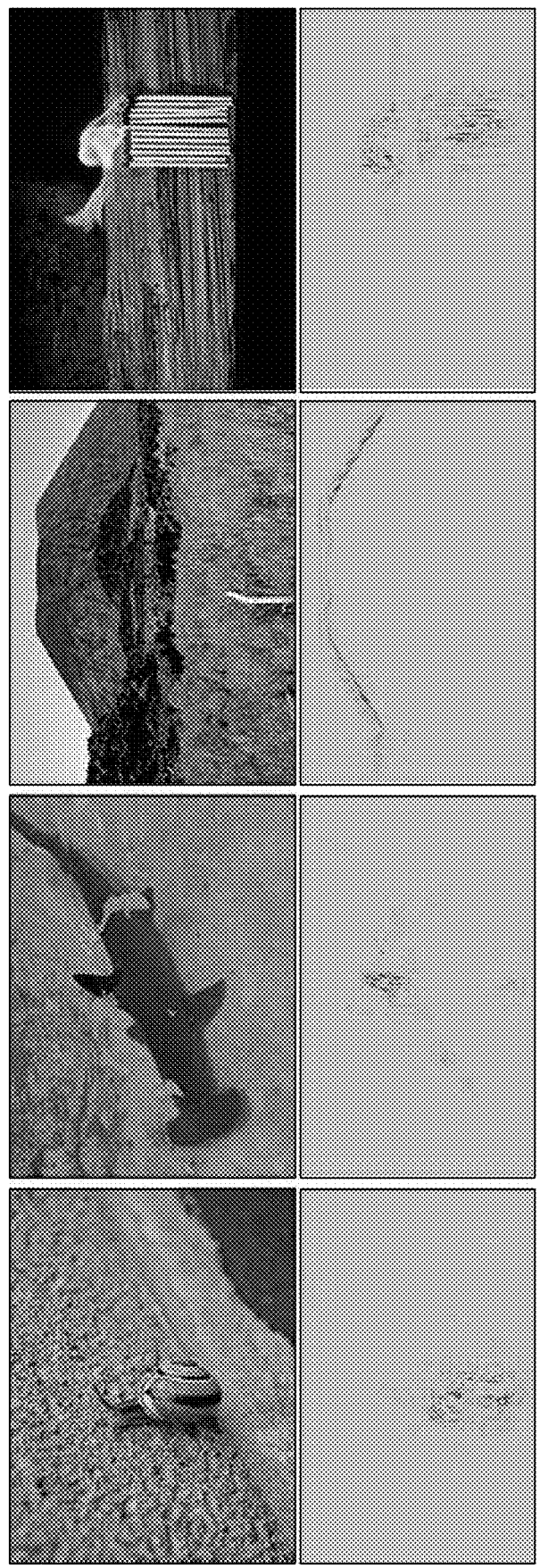
FIG. 9 illustrates a pixel-wise decomposition for a neural network trained to discriminate 1000 classes from the ImageNet data set.
Figure 10:
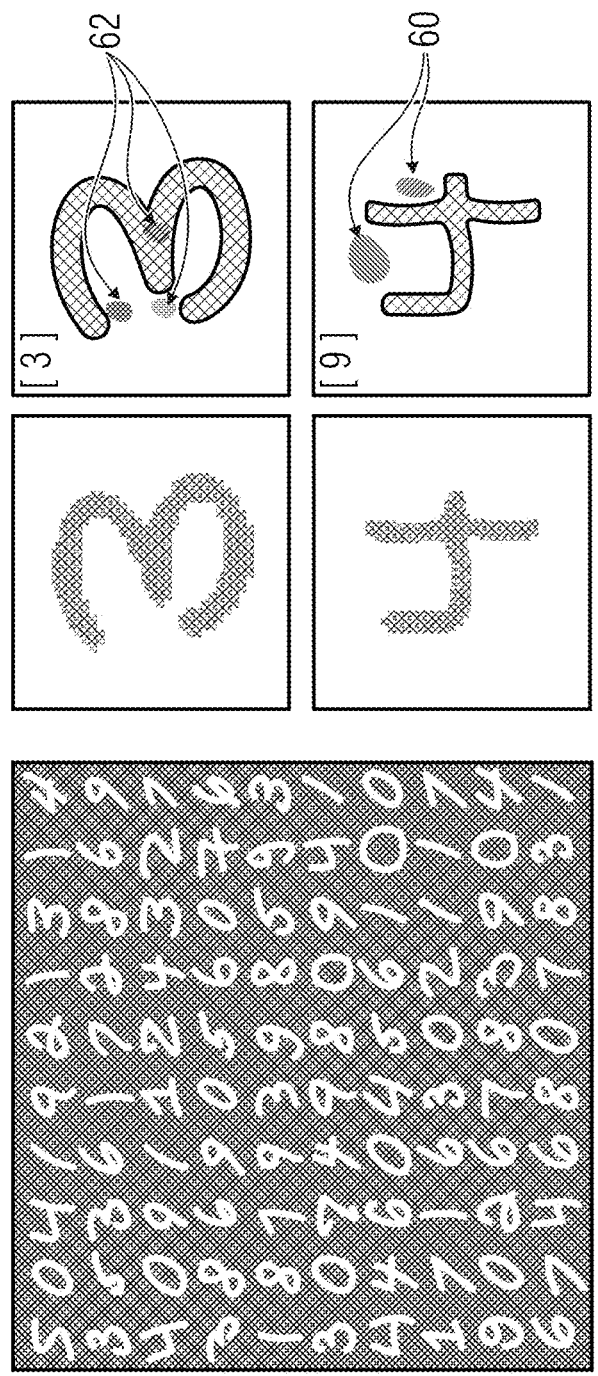
FIG. 10 shows an experiment according to which a concept of the embodiments of the present application has been applied to the MNIST (Mixed National Institute of Standards and Technology) data set which contains images of numbers from 0 to 9, exemplarily showing, at the right hand side, heat maps exemplarily illustrating the portions around numbers "3" and "4" which are of high relevance so as to recognize these numbers as "3" and differentiate the respective number from "9" respectively.

We have applied the reference score assignment to other realistic images using a pretrained network. The explanations of the classification decisions in the form of the relevance scores highlight the meaningful features of a class, e.g. shark fin for 'shark', round shape for 'cups', mountain shape for 'volcano' etc. Note that the relevance score assignment does not highlight all gradients in the image, but it highlights the discriminative features. FIG. 9, for example, shows the application of the above-outlined relevance score assignment to a neural network trained to discriminate 1000 classes from the ImageNet data set: The upper images show the input to the network, i.e. the set 16, and the lower images show a heatmap indicating the relevance scores assigned to the pixels according to the above embodiments, one for each input image. The heatmaps may, as outlined above, overlaid onto the input images. One sees that in case of snakes (left image) the pixels representing the shell receive most of the initial relevance score, i.e. are identified as the main reason for resulting in the network's prediction of classifying the image as showing a snake, in case of a shark (second from left image) the pixels representing the fin receive most of the initial relevance score, in case of a hill (second from right image) the pixels representing the crest receive most of the initial relevance score, and in case of matches (left image) the pixels representing the matches and the fire receive most of the initial relevance score.

We have also trained a neural network on the MNIST data set. This data set contains images of numbers from 0 to 9. After training the network is able to classify new unseen images. With back-propagating relevance score assignment we can ask why does the network classify an image of a 3 as class '3', in other words what makes a 3 different from the other numbers. One can see in the heatmap In FIG. 10 that the most important features of a 3 (with respect to the other numbers) are the middle horizontal stroke and the absence of vertical connections on the left (which would be there for the number 8). One can also ask e.g. why an image of a 4 is not classified as '9', in other words that speaks against a 9 when seeing an image of a 4. One can see that the evidence against a '9' is the gap at the top of the 4. Note that red color indicated using arrow 62 stands for evidence for a certain class and blue color indicated at 60 represents evidence against the class. In summary, we have shown that the method provides meaningful explanations of classification decisions.

Applications

Up to now, the description concentrated on the relevance score assignment process. In the following, it shall briefly be described what the relevance scores assigned to the items of set 16 may be used for.

A General Application would be to use the Relevance Score Assignment (RS assignment) proposed here as part of a larger, more complex algorithm (CA). One can think of situations where it is very expensive to apply algorithm CA, so our RS assignment could define some regions of interest where algorithm CA could be applied. For example,
  the time of a medical doctor is precious. RS assignment can identify the important regions in an image when screening for cancer.
  in video coding the channel bandwidth is precious. RS assignment could inform algorithm CA about which parts of the video are more important than others e.g. to determine a better coding strategy (e.g. using more bits for important parts) or a better transmission schedule (e.g. transmit important information first).

the heatmap could be used for computing additional features for some prediction task. For instance we could use a trained network, apply it to some image and extract more features from regions which are more important. This may result in reduction of computation time or transmission of information. Alternatively the regions or additional information extracted from it could be used to retrain and improve the trained network.

RS assignment could be used as an investigative tool in the case where a user or company would like to know what regions or features are important for a certain task.

Further, in the Image Application field,

RS assignment can be used in medical applications, e.g. as aid for doctors in identifying tumors in pathological images or identify observations in MRI images. More concrete examples include:
  detection of inflammation signs in images of biological tissues,
  detection of cancer signs in images of biological tissues,
  detection of pathological changes in images of biological tissues, RS assignment can be applied to general images. For instance, social website platforms or search engines have many images and may be interested in what makes an image 'funny', 'unusual', 'interesting' or what makes a person, an image of housing or interiors of houses attractive/aesthetic or less attractive/less aesthetic.

RS assignment can be used in surveillance applications to detect which part of the image triggers the system to detect an unusual event.

Detection of land use changes in images taken by satellites, aircrafts or remote sensing data.

In the Video Application field,

Heatmaps can be used to set the compression strength of coding, e.g., using more bits for areas containing important information and less bits for other areas.

RS assignment can be used for video summarization, i.e. to identify 'relevant' frames in a video. This would allow intelligent video browsing.

Animated movies sometimes do not look very realistic. It is not clear what is 'missing' to make the movies look more realistic. Heatmaps can be used in this case to highlight unrealistic portions of the video.

In the case of Text Applications,

The classification of text documents into categories can be performed by DNNs or BoW models. RS assignment can visualize why documents are classified into a specific class. The relevance of a text for a topic can be highlighted or selected for further processing. RS assignment could highlight important words and thus provide a summary of a long text. Such systems could be useful for e.g. patent lawyers to quickly browse many text documents.

In the case of Financial Data Applications,

Banks use classifiers such as (deep) neural networks to determine whether someone gets a credit loan or not (e.g. the German Schufa system). It is not transparent how these algorithms work, e.g. some people who do not get a credit don't know why. RS assignment could exactly show why someone does not get the credit.

In the field of Marketing/Sales,

RS assignment could be used to determine what makes a particular product description image/text sell the product (e.g. apartment rental, ebay product description).

RS assignment could be used to determine what makes an online video/blog post highly viewed or liked Companies may be in general interested what 'features' makes e.g. their website or product attractive.

Companies are interested in why some users buy a product and others don't buy it. RS assignment can be used to identify the reason for users not to buy a product and improve the advertisement strategy accordingly.

In the Linguistics/Education field

RS assignment could be used to determine which part of a text differentiates native from non-native speakers for a particular language such as English, French, Spanish or German.

RS assignment can be used to find elements of proof in the text that a document has been written by a particular person, or not.

In the above description, different embodiments have been provided for assigning relevance scores to a set of items. For example, examples have been provided with respect to pictures. In connection with the latter examples, embodiments have been provided with respect to a usage of the relevance scores, namely in order to highlight relevant portions in pictures using the relevance scores, namely by use of a heatmap which may be overlaid with the original picture. In the following, embodiments which use or exploit the relevance scores are presented, i.e. embodiments which use the above-described relevance score assignment as a basis.

Figure 11:
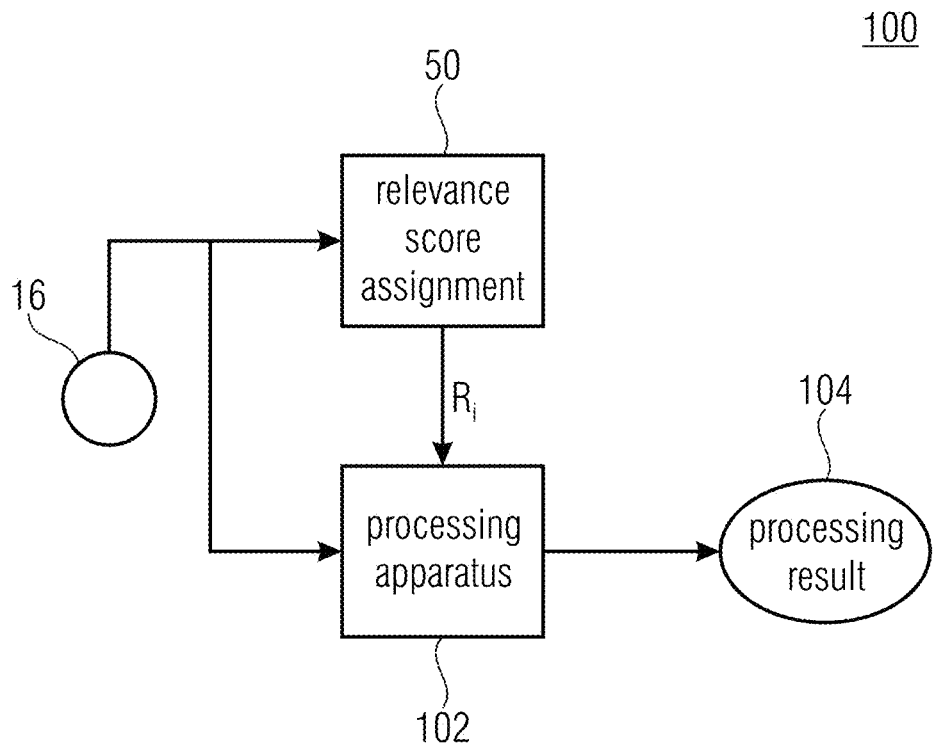
FIG. 11 shows a block diagram of a system for data processing in accordance with an embodiment.

FIG. 11 illustrates a system for processing a set of items. The system is generally indicated using reference sign 100. The system comprises, besides apparatus 50, a processing apparatus 102. Both operate on the set 16. The processing apparatus 102 is configured to process the set of items, i.e. set 16, in order to obtain a processing result 104. In doing so, processing apparatus 102 is configured to adapt its processing depending on the relevance scores $R_i$ having been assigned to the items of set 16 by relevance score assigner 50. Apparatus 50 and apparatus 102 may be implemented using software running on one or more computers. They may be implemented on separate computer programs or on one common computer program. With respect to set 16, all of the examples presented above are valid. For example, imagine that processing apparatus 102 performs a lossy processing such as data compression. For example, the data compression performed by apparatus 102 may include irrelevance reduction. Set 16 may, for instance, represent image data such as a picture or video and the processing performed by apparatus 102 may be a compression of lossy nature, i.e. the apparatus may be an encoder. In that case, apparatus 102 may, for instance, be configured to decrease the lossiness of the process for items having higher relevance scores assigned thereto than compared to items having lower relevance scores assigned thereto. The lossiness may, for example, be varied via quantization step size or by varying the available bitrate of a rate control of the encoder. For example, areas of samples for which the relevance score is high may be coded less lossy such as using higher bitrate, using lower quantization step size or the like. Thus, the relevance score assignment performs its relevance score assignment, for example, with respect to a detection/prediction of suspect persons in a video scene. In that case, processing apparatus 102 is able to spend more data rate in lossy compressing the video, which in accordance with this example represents set 16, with respect to interesting scenes, i.e. spatiotemporal portions being of interest because suspects have been "detected" within same. Or the processing apparatus 102 uses the same data rate, but due to the weighting achieved by the relevance scores, the compression is lower for items of samples with high relevance scores and the compression is higher for items of samples with low relevance scores. The processing result 104 is in that case the lossy compressed data or data stream, i.e. the compressed version of video 16. However, as mentioned before, set 16 is not restricted to video data. It may be a picture or an audiostream or the like.

Figure 12:
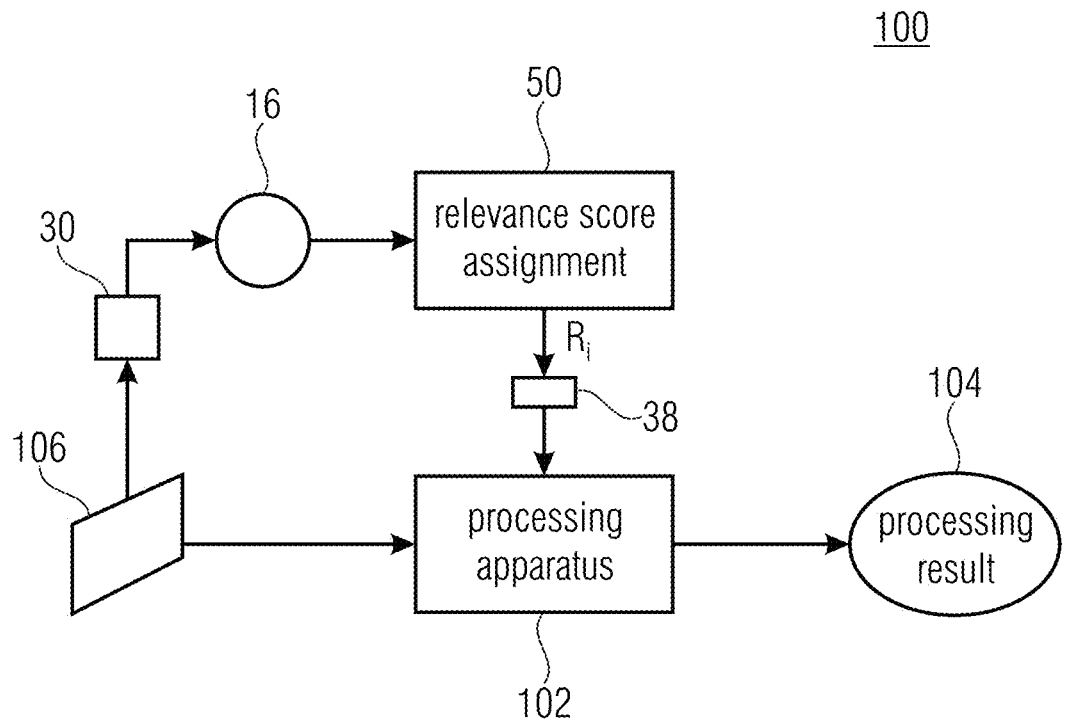
FIG. 12 shows a block diagram of a system for data processing in accordance with an embodiment differing from FIG. 11 in that the processing is performed on data from which the set of items has been derived.

For the sake of completeness, FIG. 12 shows a modification of the system of FIG. 11. Here, a relevance score assignment 50 operates on set 16 in order to derive the relevance scores $R_i$ for the items of set 16, but processing apparatus 102 operates on data to be processed 106 which is not equal to set 16. Rather, set 16 has been derived from data 106. FIG. 12, for example, illustrates the exemplary case of FIG. 1 according to which set 16 has been derived from data 106 by feature extraction process 30. Thus, set 16 "describes" data 106. The relevance values $R_i$ may, in a manner described above, be associated with the original data 106 via a reverse mapping process 38, which represents a reversal or reverse mapping with respect to feature extraction process 30. Thus, processing apparatus 102 operates on data 106 and adapts or streamlines its processing dependent on the relevance scores $R_i$.

The processing performed by processing apparatus 102 in FIGS. 11 and 12 is not restricted to a lossy processing such as a lossy compression. For example, in many of the above examples for set 16 or data 106, the items of set 16 form an ordered collection of items ordered in 1, 2 or more dimensions. For example, pixels are ordered in at least 2-dimensions, namely x and y are the two lateral dimensions, and 3-dimensions when including the time axis. In the case of audio signals, the samples such as time domain (e.g. PCM) samples or MDCT coefficients are ordered along a time axis. However, the items of set 16 may also be ordered in a spectral domain. That is, the items of set 16 may represent coefficients of a spectral decomposition of, for example, a picture, video or audio signal. In that case, process 30 and reverse process 38 could represent a spectral decomposition or forward transformation or an inverse transformation, respectively. In all of these cases, the relevance scores $R_i$ as obtained by the relevance score assigner 50 are likewise ordered, i.e. they form an ordered collection of relevance scores, or in other words, form a "relevance map" which may be overlaid with set 16 or, via processing 38, data 106. Thus, processing apparatus 102 could, for example, perform a visualization of set 16 of data 106 using the order among the items of set 16 or the order of the samples of data 106 and use the relevance map in order to highlight a relevant portion of the visualization. For example, the processing result 104 would be a presentation of a picture on a screen and using the relevance map apparatus 102 highlighting some portion on the screen using, for example, blinking, color inversion or the like, in order to indicate a portion of increased relevance in set 16 or data 106, respectively. Such a system 100 could, for instance, be used for the purpose of video surveillance in order to draw, for example, the attention of security guards onto a certain portion of a scene represented by data 106 or set 16, i.e. a video or picture, for example.

Alternatively, the processing performed by apparatus 102 may represent a data replenishment. For example, the data replenishment may refer to a reading from a memory. As another alternative, the data replenishment may involve a further measurement. Imagine, for example, that set 16 is again an ordered collection, i.e. is a feature map belonging to a picture 106, is a picture itself or a video. In that case, processing apparatus 102 could derive from the relevance scores $R_i$ in information of an ROI, i.e. a region of interest, and could focus the data replenishment onto this ROI so as to avoid performing data replenishment with respect to the complete scene which set 16 refers to. For instance, the first relevance score assignment could be performed by apparatus 50 on a low resolution microscope picture and apparatus 102 could then perform another microscope measurement with respect to a local portion out of the low resolution microscope picture for which the relevance scores indicate a high relevance. The processing result 104 would accordingly be the data replenishment, namely the further measurement in the form of a high resolution microscope picture.

Thus, in the case of using system 100 of FIG. 11 or 12 for the purpose of controlling the data rate expenditure, system 100 results in an efficient compression concept. In the case of using system 100 for visualization processes, system 100 is able to increase the likelihood that a viewer realizes some region of interest. In the case of using system 100 in order to streamline a data replenishment, system 100 is able to avoid the amount of data replenishment by avoiding the performance of data replenishment with respect to areas of no interest.

Figure 13:
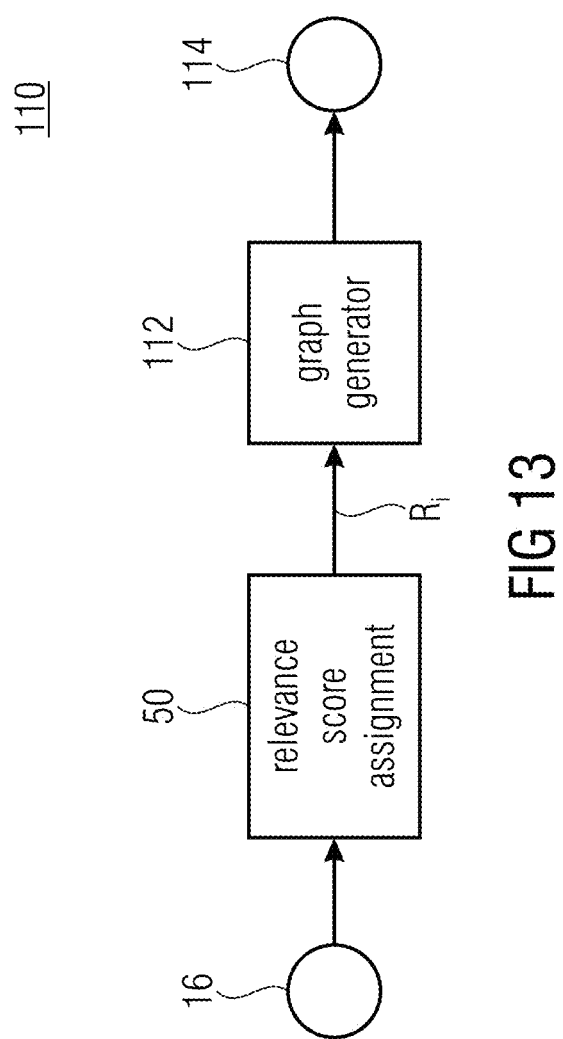
FIG. 13 shows a block diagram of an ROI highlighting system in accordance with an embodiment.

FIG. 13 shows a system 110 for highlighting a region of interest of a set of items. That is, in the case of FIG. 13, the set of items is again assumed to be an ordered collection, such as a feature map, a picture, a video, an audio signal or the like. The relevance score assigner 50 is comprised by system 110 in addition to a graph generator 112, which generates a relevance graph depending on the relevance scores $R_i$ provided by relevance score assigner 50. The relevance graph 114 may, as already described above, be a heatmap where color is used in order to "measure" the relevances $R_i$. The relevance sores $R_i$ are, as described above, scalar, or same may be made scalar by summing-up mapping relevance scores belonging together such as relevance scores of sub-pixels of different color components belonging to one color pixel of an image. The scalar relevance scores $R_i$ may then be mapped onto grey scale, or color with using, for example, the individual pixel's one-dimensional scalar relevance scores as CCT value, for instance. However, any mapping from one dimension to a three dimensional color space like RGB can be used for generating a colored map. For example one maps the scores onto an interval of hues, fix the saturation and value dimensions and then transforms the HSV representation into an RGB representation.

However, the relevance graph 114 may, alternatively, be represented in the form of a histogram or the like. A graph generator 112 may include a display for displaying the relevance graph 114. Beyond this, graph generator 112 may be implemented using software such as a computer program which may be separate to or included within a computer program implementing relevance score assigner 50.

As a concrete example, imagine that the set 16 of items is an image. The pixel-wise relevance scores for each pixel obtained in accordance with the assigner may be discretized/quantized into/onto a set of values and the discretization/quantization indices may be mapped onto a set of colors. The mapping may be done in graph generator 112. The resulting assignment of pixels to colors, i.e. such as an "heatmap" in case of the relevance-color mapping following some CCT (color temperature)-measure for the colors, can be saved as an image file in a database or on a storage medium or presented to a viewer by generator 112.

Alternatively the assignment of pixels to colors can be overlaid with the original image. In that case, the processor 102 of FIGS. 11 and 12 could act as a graph generator. The resulting overlay image can be saved as an image file on a medium or presented to a viewer. The "overlaying" may be done, for example, by turning the original image into a greyscale image, and use for the mapping of the pixel-wise relevance scores to color values a mapping to hue values. An overlay image can be created by the processor 102 by using the hue-saturation-value representation, i.e. the value (however with a cap on too small values because an almost black pixel has no clearly visible colors, and possibly also the saturation is taken from the original image,) is gained from a respective sample's grey scale value of the original image's grey scale version and the hue values are taken from the color map. Processor 102 could subject an image generated as just outlined, e.g. the color map or the overlay or the ordered set of relevance scores (which can be represented as an image, but this is not a requirement), to segmentation. Those segments in such a segmented image, which correspond to regions with scores which are very high or to regions with scores which have large absolute values, could be extracted, stored in a database or a storage medium and used (with or without subsequent manual inspection) as additional training data for a classifier training procedure. If the set 16 of items is text, the outcome of the relevance assignment could be a relevance a score per word or per sentence as described above. The relevance score could then be discretized into a set of values and mapped onto a set of colors. The words could then, by processor 102, be marked by the color, the resulting color-highlighted text could be saved in a database or on a storage medium or presented to a human. Alternatively or additionally to highlighting the words, the processor 102 merely selects a subset of words, sentence parts or sentences of the text, namely those with the highest scores or the highest absolute values of scores (e.g. by thresholding of the score or its absolute value) and save this selection in a database or on a storage medium or present it to a human. If the relevance assignment is applied to a data set 16 such that a sample consists of a set of key value pairs, for example finance data about companies, stored in a table in a database, then the outcome for each sample would be a relevance score per key-value pair. For a given sample, a subset of key-value pairs with the highest scores or the highest absolute values of scores (e.g. by thresholding of the score or its absolute value) could then be selected and this selection could be saved in a database or on a storage medium or present it to a human. This could be done by processor 102 or generator 112.

It has already been outlined above with respect to FIG. 12, that the data set 16 may be an image or a video. The pixel-wise relevance scores may then be used to find regions with high scores. To this end, the above mentioned segmentation or a video segmentation may exemplarily be used. In case of a video, a region of high score would be a spatio-temporal subset or portion of the video. For each region, a score per region, for example by computing a p-mean $$M_p(x_1, \ldots, x_N) = \left(\frac{1}{2}\sum_{i=1}^{N} x_i^p\right)^{\frac{1}{p}}$$

or a quantile of the pixel-wise scores for the pixels of the region could be computed. The data set, e.g. the video, would then be subject to a compression algorithm by processor 102 for which the compression rate can be adjusted for regions according to the computed score. A monotonous (falling or rising) mapping of region scores to compression rates could be used. Each of the regions would then be encoded according to the mapping of the region scores to compression rates.

Further, the processor 102 could act as follows in case of an image as the set 16: The just outlined segmentation could be applied to the set of scores for all pixels or to an overlay image or to the color map, and segments corresponding to regions with scores which are very high or to regions with scores which have large absolute values, may be extracted. The processor may then present these co-located segments of the original image 16 to a human or another algorithm for checking of content for possibility of conspicuous or anomalous content. This could be used, for example, in security guard applications. Likewise, the set 16 could be a video. The whole video, in turn, is composed of a set of frames. An item in the set 16 of items could be a frame or a subset of frames or a set of regions from a subset of frames as already stated above. Spatio-temporal video segmentation could be applied to the relevance score assignment to the items, as to find spatio-temporal regions with either high average scores for the items or high average absolute values of scores for the items. As mentioned above, the average scores assigned to items within a region could be measured for example using a p-mean or a quantile estimator. The spatio-temporal regions with highest such scores, such as scores above some threshold, can be extracted by processor 102 (for example by means of image or video segmentation) and presented to a human or another algorithm for checking of content for possibility of conspicuous or anomalous content. The algorithm for checking could be included in the processor 102, or could be external thereto with this being true also for the above occasions of mentioning the checking of regions of high(est) score.

In accordance with an embodiment, the just-mentioned spatio-temporal regions with highest such scores are used for the purpose of training improvement for predictions made on videos. As stated, the set 16 of items is the whole video which can be represented by a set of frames. An item in the set of items is a frame or a subset of frames or a set of regions from a subset of frames. Video segmentation is then applied to find spatio-temporal regions with either high average scores for the items or high average absolute values of scores for the items. Processor 102 may select neurons of the neural network which are connected to other neurons such that via indirect connections above regions are part of the input of the selected neurons. Processor 102 may optimize the neural network in the following way: given the input image and a neuron selected as above (for example by having direct or indirect inputs from regions with high relevance scores or high absolute values of them), processor 102 tries to increase the network output or the square of the network output, or to decrease the network output by changing the weights of the inputs of the selected neuron and the weights of those neurons which are direct or indirect upstream neighbors of the selected neuron. Such a change can be done for example by computing the gradient of the neuron output for the given image with respect to the weights to be changed. Then the weights are updated by the gradient times a stepsize constant. Needless to say, that the spatio-temporal region may also be obtained by segmentation of pixel-wise scores, i.e. by using pixels as the items of set 16, with then performing the optimization which was outlined above.

Even alternatively, the relevance assignment may be applied to graph data consisting of nodes, and directed or undirected edges with or without weights; an item of set 16 would then be a subgraph, for example. An element-wise relevance score would be computed for each subgraph. A subgraph can be an input to a neural network for example if it is encoded as an integer by encoding nodes and their edges with weights by integer numbers while separating semantic units by integers which are reserved as stop signs. Alternatively, an item of set 16 for computing the relevance score per item could be a node. Then we compute item-wise relevance scores. After that a set of subgraphs with high average score could be found (the average score can be computed by p-mean $$M_p(x_1, \ldots, x_N) = \left(\frac{1}{2}\sum_{i=1}^{N} x_i^p\right)^{\frac{1}{p}}$$

or by a quantile of the scores over the nodes) by graph segmentation. The scores for each node are discretized into a set of values and the discretization indices are mapped onto a set of colors.

The resulting assignment of nodes and subgraphs to colors and/or the extracted subgraphs can be saved as a file in a database or on a storage medium or presented to a viewer.

Figure 14:
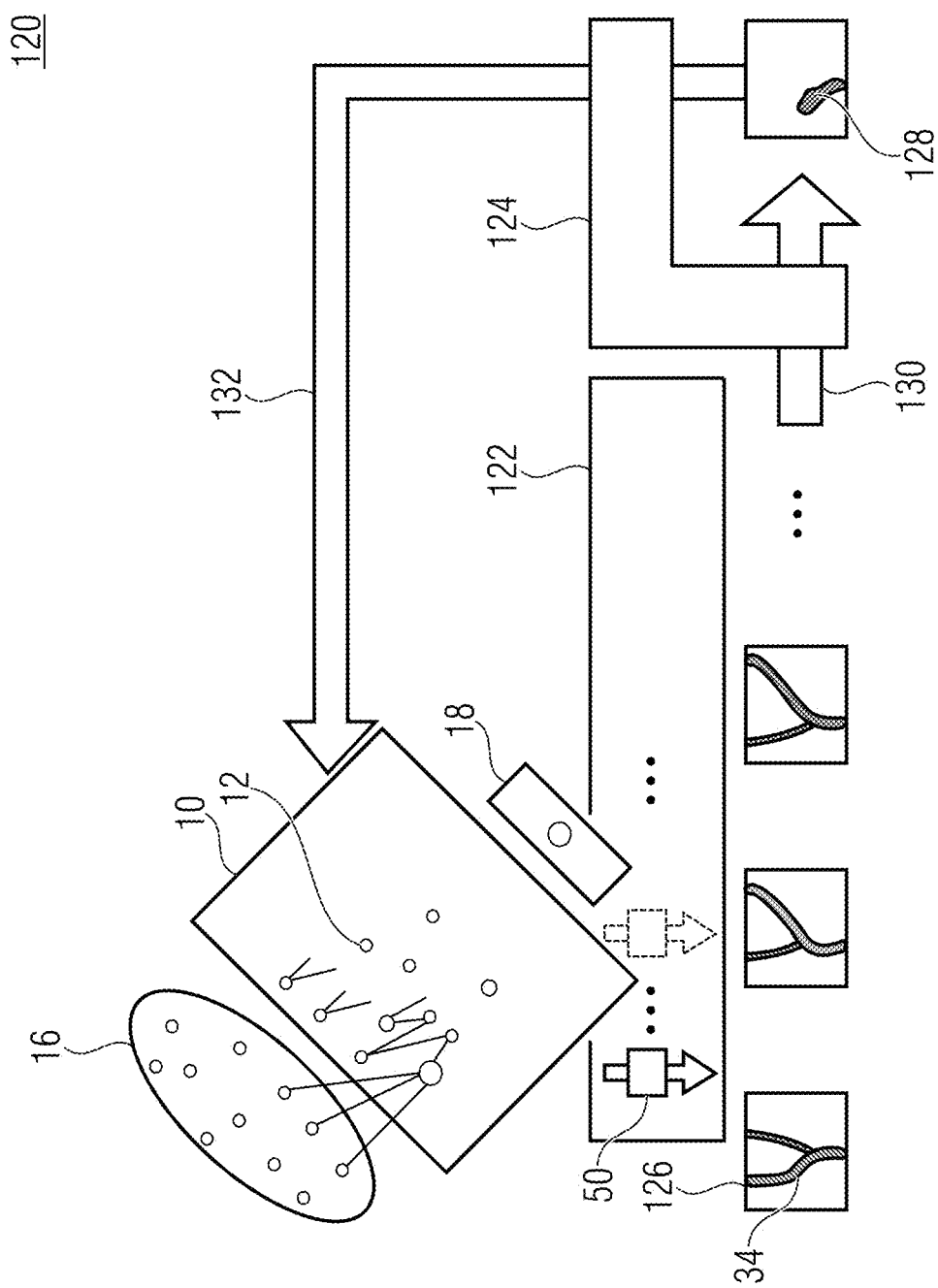
FIG. 14 shows a neural network optimization system in accordance with an embodiment.
Figure 15:
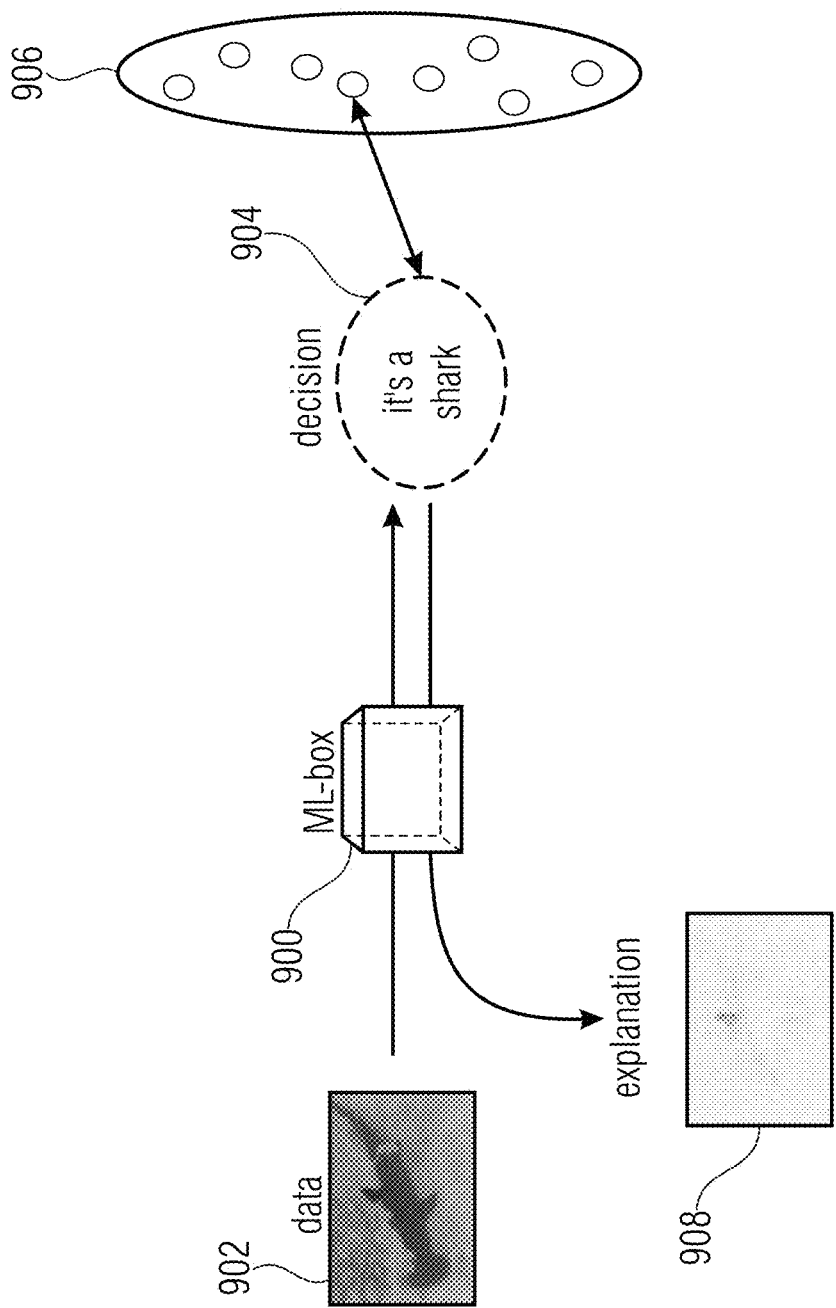
FIG. 15 shows a schematic diagram illustrating the task of relevance score assignment with respect to an artificial neural network and the relation to the usual prediction task of an artificial neural network.

FIG. 14 illustrates a system for optimizing a neural network. The system is generally indicated using reference sign 120 and comprises the relevance score assigner 50, an application apparatus 122 and a detection and optimizing apparatus 124. The application apparatus 122 is configured to apply apparatus 50 onto a plurality of different sets 16 of items. Thus, for each application, apparatus 50 determines the relevance scores for the items of set 16. This time, however, apparatus 50 also outputs the relevance values assigned to the individual intermediate neurons 12 of neural network 10 during the reverse propagation, thereby obtaining the aforementioned relevance paths 34 for each application. In other words, for each application of apparatus 50 onto a respective set 16, detection and optimizing apparatus 124 obtains a relevant propagation map 126 of neural network 10. Apparatus 124 detects a portion 128 of increased relevance within the neural network 10 by accumulating 130 or overlaying the relevances assigned to the intermediate neurons 12 of network 10 during the apparatus' 50 application onto the different sets 16. In other words, apparatus 124 overlays or accumulates, by overlay, the different relevance propagation maps 126 so as to obtain the portion 128 of neural network 10 including those neurons which propagate a high percentage of the relevance in the reverse propagation process of apparatus 50 over the population of sets 16. This information may then be used by apparatus 124 so as to optimize 132 the artificial neural network 10. In particular, for example, some of the interconnections of neurons 12 of artificial neural network 10 may be left off in order to render the artificial neural network 10 smaller without compromising its prediction ability. Other possibilities exist, however, as well.

Further, it may be that the relevance Score Assignment process gives out a heatmap, and that same is analyzed with respect to e.g. smoothness and other properties. Based on the analysis, some action may be triggered. For example, a training of a neural network may be stopped because it captures the concepts "good enough" according to the heatmap analysis. Further it should be noted that the heatmap analysis result may be used along with the neural network prediction results, i.e. the prediction, to do something. In particular, relying on both heatmap and prediction results may be advantageous over relying on only the prediction results only because, for example, the heatmap may tell something about the certainty of the prediction. The quality of a neural network can be potentially evaluated by analysis the heatmap.

Finally, it is emphasized that the proposed relevance propagation has primarily illustrated above with respect to networks trained on classification tasks, but without loss of generality, the embodiments described above may be applied to any network that assigns a score attributed to output classes. These scores can be learned using other techniques such as regression or ranking.

Thus, in the above description, embodiments have been presented which embody a methodology which may be termed Layer-wise relevance propagation that allows to understand neural network predictors. Different applications of this novel principle were demonstrated. For images it has been shown that pixel contributions can be visualized as heatmaps and can be provided to a human expert who can intuitively not only verify the validity of the classification decision, but also focus further analysis on regions of potential interest. The principle can be applied to a variety of tasks, classifiers and types of data i.e. is not limited to images, as noted above.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

List of References

[6] Christopher M Bishop et al. Pattern recognition and machine learning, volume 1. springer New York, 2006.

[10] Hendrik Dahlkamp, Adrian Kaehler, David Stavens, Sebastian Thrun, and Gary R. Bradski. Self-supervised monocular road detection in desert terrain. In Robotics: Science and Systems, 2006.

[11] Jia Deng, Alex Berg, Sanjeev Satheesh, Hao Su, Aditya Khosla, and Fei-Fei Li. The ImageNet Large Scale Visual Recognition Challenge 2012 (ILSVRC2012). http://www.image-net.org/challenges/LSVRC/2012/.

[12] Dumitru Erhan, Yoshua Bengio, Aaron Courville, and Pascal Vincent. Visualizing higher-layer features of a deep network. Technical Report 1341, University of Montreal, June 2009.

[15] L. Fei-Fei and P. Perona. A bayesian hierarchical model for learning natural scene categories. In Computer Vision and Pattern Recognition, 2005. CVPR 2005. IEEE Computer Society Conference on, volume 2, pages 524-531 vol. 2, 2005.

[16] Muriel Gevrey, Ioannis Dimopoulos, and Sovan Lek. Review and comparison of methods to study the contribution of variables in artificial neural network models. Ecological Modelling, 160(3):249-264, 2003.

[17] Ronny Hänsch and Olaf Hellwich. Object recognition from polarimetric SAR images. In Uwe Soergel, editor, Radar Remote Sensing of Urban Areas, volume 15 of Remote Sensing and Digital Image Processing, pages 109-131. Springer Netherlands, 2010.

[20] Yangqing Jia. Caffe: An open source convolutional architecture for fast feature embedding. http://caffe.berkeleyvision.org/, 2013.

[23] Alex Krizhevsky, Ilya Sutskever, and Geoffrey E. Hinton. Imagenet classification with deep convolutional neural networks. In Peter L. Bartlett, Fernando C. N. Pereira, Christopher J. C. Burges, Léon Bottou, and Kilian Q. Weinberger, editors, NIPS, pages 1106-1114, 2012.

[25] Yann LeCun and Corinna Cortes. The MNIST database of handwritten digits. http://yann.lecun.com/exdb/mnist/, 1998.

[26] Yann LeCun, Koray Kavukcuoglu, and Clément Farabet. Convolutional networks and applications in vision. In ISCAS, pages 253-256. IEEE, 2010.

[27] Quoc V. Le. Building high-level features using large scale unsupervised learning. In ICASSP, pages 8595-8598, 2013.

[31] Grégoire Montavon, Genevieve B. Orr, and Klaus-Robert Müller, editors. Neural Networks: Tricks of the Trade, Reloaded, volume 7700 of Lecture Notes in Computer Science (LNCS). Springer, 2nd edn edition, 2012.

[34] Julian D Olden, Michael K Joy, and Russell G Death. An accurate comparison of methods for quantifying variable importance in artificial neural networks using simulated data. Ecological Modelling, 178(3-4):389-397, 2004.

[36] Nicolas Pinto, David D Cox, and James J DiCarlo. Why is real-world visual object recognition hard? PLoS Comput Biol, 4(1):27, 1 2008.

[39] David E. Rumelhart, Geoffrey E. Hinton, and Ronald J. Williams. Learning representations by back-propagating errors. Nature, 323:533-536, October 1986.

[41] Rudy Setiono and Huan Liu. Understanding neural networks via rule extraction. In IJCAI, pages 480-487. Morgan Kaufmann, 1995.

[42] Karen Simonyan, Andrea Vedaldi, and Andrew Zisserman. Deep inside convolutional networks: Visualising image classification models and saliency maps. CoRR, abs/1312.6034, 2013.

[43] Christian Szegedy, Wojciech Zaremba, Ilya Sutskever, Joan Bruna, Dumitru Erhan, Ian J. Goodfellow, and Rob Fergus. Intriguing properties of neural networks. CoRR, abs/1312.6199, 2013.

[49] Paul A. Viola and Michael J. Jones. Rapid object detection using a boosted cascade of simple features. In CVPR (1), pages 511-518, 2001.

[50] Ross Walker, Paul Jackway, Brian Lovell, and Dennis Longstaff. Classification of cervical cell nuclei using morphological segmentation and textural feature extraction. In Australian New Zealand Conference on Intelligent Information Systems, 1994.

[54] Matthew D. Zeiler and Rob Fergus. Visualizing and understanding convolutional networks. CoRR, abs/1311.2901, 2013.

[55] Matthew D. Zeiler, Graham W. Taylor, and Rob Fergus. Adaptive deconvolutional networks for mid and high level feature learning. In ICCV, pages 2018-2025, 2011.

The invention claimed is:

1. A processor implemented apparatus for assigning a relevance score to a set of items, the relevance score indicating a relevance with respect to an application of an artificial neural network composed of neurons onto the set of items so as to map the set of items onto a network output, the apparatus being configured to
redistribute an initial relevance score derived from the network output onto the set of items by reversely propagating the initial relevance score through the artificial neural network so as to acquire a relevance score for each item,
wherein the apparatus is configured to perform the reverse propagation in a manner so that for each neuron, preliminarily redistributed relevance scores of a set of downstream neighbor neurons of the respective neuron are distributed to a set of upstream neighbor neurons of the respective neuron using a distribution function,
wherein the apparatus is configured such that the distribution function is a function of
weights of the artificial neural network, determining a degree of influence of the respective neuron by the set of upstream neighbor neurons of the respective neuron,
neuron activations of the set of upstream neighbor neurons as manifesting themselves upon the application of the artificial neural network onto the set of items, and
a sum of preliminarily redistributed relevance scores of the set of downstream neighbor neurons of the respective neuron,
wherein the set of items is, or is a combination of,
a picture with each of the items of the set of items corresponding to one or more of the pixels or subpixels of the picture, and/or
a video with each of the items of the set of items corresponding to one or more pixels or subpixels of pictures of the video, pictures of the video or picture sequences of the video, and/or
an audio signal with each item of the set of items corresponding to one or more audio samples of the audio signal, and/or
a feature map of local features or a transform locally or globally extracted from a picture, video or audio signal with the items of the set of items corresponding to local features, and/or
a text with the items of the set of items corresponding to words, sentences or paragraphs of the text, and/or
a graph such as a social network relations graph with the items of the set of items corresponding to nodes or edges or sets of nodes or a set of edges or subgraphs.

2. The apparatus according to claim 1 wherein the apparatus is configured such that the distribution function is designed such that a sum of all relevance scores remains constant over the reverse propagation.

3. The apparatus according to claim 1 wherein the apparatus is configured to perform the reverse propagation with equally using one distribution function for all neurons of the artificial neural network.

4. The apparatus according to claim 1 wherein the apparatus is configured such that, for each neuron j, the distribution function yielding how much relevance is redistributed as a relevance message $R_{ij}$ from the respective neuron j to the upstream neighbor neuron i is $$R_{ij} = q(i) \cdot m(\{R_{jk}, k \text{ is downstream neighbor neuron of } j\})$$

where $m(\mapsto^K)$ with K being the number of downstream neighbors of the respective neuron j is a monotonically increasing function for all its components and yields the preliminarily redistributed relevance score $R_j = m(\{R_{jk}, k \text{ is downstream neuron of } j\})$ of the respective neuron j and $q(i)$ is a function depending on weights $w_{ij}$ connecting the upstream neighbor neuron i to the respective neuron j, an activation $x_i$ of upstream neighbor neuron i of the respective neuron j as resulting from the application of the artificial neural network onto the set of items, and a possibly zero-valued bias term $b_j$ of neuron j.

5. The apparatus according to claim 4 wherein $m(\{R_{jk}, k \text{ is downstream neuron of } j\}) = \Sigma_k R_{jk}$.

6. The apparatus according to claim 4 wherein the apparatus is configured such that the function $q(i)$ is a function p of weighted activations $z_{ij} = s(x_i, w_{ij}, b_j)$ which are computed by a function s, so that $q(i) = p(\{z_{ij} | i \text{ is upstream neighbor neuron of } j\})$.

7. The apparatus according to claim 6 wherein function s is selected such that the weighted activation $z_{ij}$ is given as $$z_{ij} = x_i w_{ij},$$

Or $$z_{ij} = x_i w_{ij} + \frac{b_j}{l}$$

with l being the number of upstream neighbor neurons i of neuron j.

8. The apparatus according to claim 4 wherein the apparatus is configured such that the function $q(i)$ satisfies, for each neuron j for which $R_j > 0$, an ordering property,
the ordering property being satisfied if
a) if $\Sigma_i z_{ij} > 0$, then for all $i_1$ and $i_2$ being upstream neighbor neurons of neuron j for which $$z_{i_1 j} < z_{i_2 j}$$

it holds true that $q(i_1) \leq q(i_2)$
b) OR for all $i_1$ and $i_2$ being upstream neighbor neurons of neuron j for which $$z_{i_1 j} > 0 \text{ and } z_{i_2 j} > 0 \text{ and } z_{i_1 j} < z_{i_2 j}$$

Then it holds true that $0 \leq q(i_1) \leq q(i_2)$.

9. The apparatus according to claim 4 wherein the apparatus is configured such that the function $q(i)$ satisfies an ordering property,
the ordering property being satisfied if for all $i_1$ and $i_2$ being upstream neighbor neurons of neuron j for which $$g(z_{i_1 j}) < g(z_{i_2 j})$$

it holds true that $|q(i_1)| \leq |q(i_2)|$ for a function $g(\cdot)$ that comprises its minimum at zero, and that is monotonically decreasing on the interval $(-\infty, 0)$ and monotonically increasing on the interval $(0, +\infty)$.

10. The apparatus according to claim 9 wherein the apparatus is configured such that the function g(·) is given as follows:

$$g(z) = \alpha \max(0, z) - \beta \min(0, z) \text{ with } \alpha > 0, \beta \geq 0.$$

11. The apparatus according to claim 4, wherein the apparatus is configured such that the function q(i) inherits or is proportional to the Taylor decomposition of a neural network function of the neurons.

12. The apparatus according to claim 4, wherein the apparatus is configured such that the relevance message $R_{ij}$ is proportional to the Taylor decomposition of a function that is learnt from data and that maps activations $x_i$ of upstream neighbors i of a neuron j to the value m({$R_{jk}$, k is downstream neuron of j}) up to an approximation error.

13. The apparatus according to claim 1, wherein the apparatus is configured such that the distribution function is $$R_{ij} = \frac{x_i w_{ij} + \frac{b_j}{n}}{h\left(\sum_r \left(x_r w_{rj} + \frac{b_j}{n}\right)\right)} \cdot m(\{R_{jk}, k \text{ is downstream neighbor neuron of } j\})$$

Or $$R_{ij} = \frac{x_i w_{ij}}{h\left(\sum_r \left(x_r w_{rj} + \frac{b_j}{n}\right)\right)} \cdot m(\{R_{jk}, k \text{ is downstream neighbor neuron of } j\})$$

where n is the number of upstream neighbor neurons of the respective neuron j, $R_{ij}$ is the relevance message redistributed from the respective neuron j to the upstream neighbor neuron i and $R_{jk}$ is the relevance message redistributed from the downstream neighbor neuron k to the respective neuron j, $x_i$ is the activation of upstream neighbor neuron i during the application of the neural network onto the set of items, $w_{ij}$ is the weight connecting the upstream neighbor neuron i to the respective neuron j, $w_{rj}$ is also a weight connecting the upstream neighbor neuron r to the respective neuron j, and $b_j$ is a bias term of the respective neuron j, and h( ) is a scalar function, and where m($\mapsto^K$) with K being the number of downstream neighbors of the respective neuron j is a monotonically increasing function for all its components and yields the preliminarily redistributed relevance score $R_j$=m({$R_{jk}$, k is downstream neuron of j}) of the respective neuron j.

14. The apparatus according to claim 13 wherein m({$R_{jk}$, k is downstream neuron of j})=$\Sigma_k R_{jk}$.

15. The apparatus according to claim 13 wherein h( )is a stabilizing function h(t)=t+ε·sign(t).

16. The apparatus according to claim 1 wherein the apparatus is configured such that the distribution onto the set of upstream neighbor neurons i of the respective neuron j is performed using a distribution function, wherein the distribution function is $$R_{ij} = \left(\alpha \frac{\left(x_i w_{ij} + \frac{b_j}{n}\right)_+}{h\left(\left(b_j\right)_+ + \sum_r (x_r w_{rj})_+\right)} - \beta \frac{\left(x_i w_{ij} + \frac{b_j}{n}\right)_-}{h\left(\left(b_j\right)_- + \sum_r (x_r w_{rj})_-\right)}\right).$$

m({$R_{jk}$, k is downstream neighbor neuron of j})

Or $$R_{ij} = \left(\alpha \frac{\left(x_i w_{ij} + \frac{b_j}{n}\right)_+}{h\left(\left(b_j\right)_+ + \sum_r (x_r w_{rj})_+\right)} - \beta \frac{\left(x_i w_{ij} + \frac{b_j}{n}\right)_-}{h\left(\left(b_j\right)_- + \sum_r (x_r w_{rj})_-\right)}\right).$$

m({$R_{jk}$, k is downstream neighbor neuron of j})

Where $(z)_+$=max(0, z), $(z)_-=min$(0, z), n is the number of upstream neighbor neurons of the respective neuron, $R_{ij}$ is the relevance message redistributed from the respective neuron j to the upstream neighbor neuron i and $R_{jk}$ is the relevance message redistributed from the downstream neighbor neuron k to the respective neuron j, $x_i$ is the activation of upstream neighbor neuron i during the application of the neural network onto the set of items, $w_{ij}$ is the weight connecting the upstream neighbor neuron i to the respective neuron j, $w_{rj}$ is also a weight connecting the upstream neighbor neuron r to the respective neuron j and $b_j$ is a bias term of the respective neuron j, and h( ) is a scalar function, and α>0, β≥0, α−β=1 and m($\mapsto^K$) with K being the number of downstream neighbors of the respective neuron j is a monotonically increasing function for all its components and yields the preliminarily redistributed relevance score $R_j$=m({$R_{jk}$, k is downstream neuron of j}) of the respective neuron j.

17. The apparatus according to claim 1 wherein the apparatus is configured to compute, for each item i, the relevance scores $R_i$ of the respective item i by summing up the relevance messages of neurons comprising the respective item as upstream neighbor neuron, redistributed to the respective item.

18. The apparatus according to claim 1 wherein the artificial neural network is directly applied onto the set of items so that the items of the set of items form upstream neighbors for a subset of the artificial neurons of the artificial neural network, and the network output corresponds to a neuron activation of a neuron at a downstream end of the artificial neural network.

19. The apparatus according to claim 1 wherein the network output is a scalar with the initial relevance score derived therefrom equaling, or being derived by applying a monotonically increasing function onto, a value of the scalar, or the network output is a vector with the initial relevance value equaling, or being derived by applying a monotonically increasing function onto, a value of one or more components of the vector.

20. The apparatus according to claim 1 wherein the apparatus is configured to perform the reverse propagation so that 0.95·R≤f(Σ$R_i$)≤1.05·R with Σ$R_i$ denoting a sum over the relevance scores of all items i of the set of items and f being a monotonic function solely depending on Σ$R_i$.

21. The apparatus according to claim 20 wherein the apparatus is configured to such that f is an identity function.

22. The apparatus according to claim 1 wherein the apparatus is configured such that for each neuron, a sum of relevance message values distributed to the set of upstream neighbor neurons of the respective neuron by the distribution function equals ξ($S_N$) or deviates therefrom by no more than 5% with $S_N$ denoting the sum of relevance messages from the set of downstream neighbor neurons of the respective neuron to the respective neuron and $\xi$ denoting a monotonic function solely depending on $S_N$.

23. The apparatus according to claim 22 wherein the apparatus is configured such that $\xi$ is an identity function.

24. The apparatus according to claim 1 wherein the artificial neural network is layered so that each neuron belongs to one of a sequence of layers and the apparatus is configured to perform the reverse propagation with equally using one distribution function for all neurons of the artificial neural network.

25. The apparatus according to claim 1 wherein the artificial neural network is layered so that each neuron belongs to one of a sequence of layers and the apparatus is configured to perform the reverse propagation so that, for each layer, a sum of relevance message values distributed to the neurons of the respective layer equals $\zeta(S_L)$ or deviates therefrom by no more than 5% with $S_L$ denoting the sum of preliminarily redistributed relevance scores of the neurons of a layer downstream to the respective layer and $\zeta$ denoting a monotonic function solely depending on $S_L$.

26. A processor implemented system for data compression, comprising
an apparatus for assigning a relevance score to a set of items, the relevance score indicating a relevance with respect to an application of an artificial neural network composed of neurons onto the set of items so as to map the set of items onto a network output, the apparatus being configured to
redistribute an initial relevance score derived from the network output onto the set of items by reversely propagating the initial relevance score through the artificial neural network so as to acquire a relevance score for each item,
wherein the apparatus is configured to perform the reverse propagation in a manner so that for each neuron, preliminarily redistributed relevance scores of a set of downstream neighbor neurons of the respective neuron are distributed to a set of upstream neighbor neurons of the respective neuron using a distribution function, and
wherein the apparatus is configured such that the distribution function is a function of
weights of the artificial neural network, determining a degree of influence of the respective neuron by the set of upstream neighbor neurons of the respective neuron,
neuron activations of the set of upstream neighbor neurons as manifesting themselves upon the application of the artificial neural network onto the set of items, and
a sum of preliminarily redistributed relevance scores of the set of downstream neighbor neurons of the respective neuron, and
a data compression apparatus for lossy compressing the set of items by decreasing a lossiness of the lossy processing for items having higher relevance scores assigned therewith than compared to items having lower relevance scores assigned therewith,
wherein the set of items is, or is a combination of,
a picture with each of the items of the set of items corresponding to one or more of the pixels or subpixels of the picture, and/or
a video with each of the items of the set of items corresponding to one or more pixels or subpixels of pictures of the video, pictures of the video or picture sequences of the video, and/or
an audio signal with each item of the set of items corresponding to one or more audio samples of the audio signal, and/or
a feature map of local features or a transform locally or globally extracted from a picture, video or audio signal with the items of the set of items corresponding to local features, and/or
a text with the items of the set of items corresponding to words, sentences or paragraphs of the text, and/or
a graph such as a social network relations graph with the items of the set of items corresponding to nodes or edges or sets of nodes or a set of edges or subgraphs.

27. A processor implemented visualization system comprising
an apparatus for assigning a relevance score to a set of items, the relevance score indicating a relevance with respect to an application of an artificial neural network composed of neurons onto the set of items so as to map the set of items onto a network output, the apparatus being configured to
redistribute an initial relevance score derived from the network output onto the set of items by reversely propagating the initial relevance score through the artificial neural network so as to acquire a relevance score for each item,
wherein the apparatus is configured to perform the reverse propagation in a manner so that for each neuron, preliminarily redistributed relevance scores of a set of downstream neighbor neurons of the respective neuron are distributed to a set of upstream neighbor neurons of the respective neuron using a distribution function, and
wherein the apparatus is configured such that the distribution function is a function of
weights of the artificial neural network, determining a degree of influence of the respective neuron by the set of upstream neighbor neurons of the respective neuron,
neuron activations of the set of upstream neighbor neurons as manifesting themselves upon the application of the artificial neural network onto the set of items, and
a sum of preliminarily redistributed relevance scores of the set of downstream neighbor neurons of the respective neuron, and
a visualization apparatus configured to visualizing the set of items with highlighting selected items of the set of items, selected depending on the relevance scores,
wherein the set of items is, or is a combination of,
a picture with each of the items of the set of items corresponding to one or more of the pixels or subpixels of the picture, and/or
a video with each of the items of the set of items corresponding to one or more pixels or subpixels of pictures of the video, pictures of the video or picture sequences of the video, and/or
an audio signal with each item of the set of items corresponding to one or more audio samples of the audio signal, and/or
a feature map of local features or a transform locally or globally extracted from a picture, video or audio signal with the items of the set of items corresponding to local features, and/or
a text with the items of the set of items corresponding to words, sentences or paragraphs of the text, and/or
a graph such as a social network relations graph with the items of the set of items corresponding to nodes or edges or sets of nodes or a set of edges or subgraphs.

28. A processor implemented data replenishment system comprising
   an apparatus for assigning a relevance score to a set of items, the relevance score indicating a relevance with respect to an application of an artificial neural network composed of neurons onto the set of items so as to map the set of items onto a network output, the apparatus being configured to
   redistribute an initial relevance score derived from the network output onto the set of items by reversely propagating the initial relevance score through the artificial neural network so as to acquire a relevance score for each item,
   wherein the apparatus is configured to perform the reverse propagation in a manner so that for each neuron, preliminarily redistributed relevance scores of a set of downstream neighbor neurons of the respective neuron are distributed to a set of upstream neighbor neurons of the respective neuron using a distribution function, and
   wherein the apparatus is configured such that the distribution function is a function of
      weights of the artificial neural network, determining a degree of influence of the respective neuron by the set of upstream neighbor neurons of the respective neuron,
      neuron activations of the set of upstream neighbor neurons as manifesting themselves upon the application of the artificial neural network onto the set of items, and
      a sum of preliminarily redistributed relevance scores of the set of downstream neighbor neurons of the respective neuron, and, a data replenishment apparatus configured to priorize read items of the set of items from a memory, or performing a further measurement of items of the set of items, among the items of the set of data items depending on the relevance scores,
   wherein the set of items is, or is a combination of,
   a picture with each of the items of the set of items corresponding to one or more of the pixels or subpixels of the picture, and/or
   a video with each of the items of the set of items corresponding to one or more pixels or subpixels of pictures of the video, pictures of the video or picture sequences of the video, and/or
   an audio signal with each item of the set of items corresponding to one or more audio samples of the audio signal, and/or
   a feature map of local features or a transform locally or globally extracted from a picture, video or audio signal with the items of the set of items corresponding to local features, and/or
   a text with the items of the set of items corresponding to words, sentences or paragraphs of the text, and/or
   a graph such as a social network relations graph with the items of the set of items corresponding to nodes or edges or sets of nodes or a set of edges or subgraphs.

29. A processor implemented system for optimizing an artificial neural network composed of neurons and comprising a network output, comprising
   a first apparatus for assigning a relevance score to a set of items the relevance score indicating a relevance with respect to an application of the artificial neural network onto the set of items so as to map the set of items onto the network output, wherein the first apparatus is configured to
      redistribute an initial relevance score derived from the network output onto the set of items by reversely propagating the initial relevance score through the artificial neural network so as to obtain a relevance score for each item,
      perform the reverse propagation in a manner so that for each neuron, preliminarily redistributed relevance scores of a set of downstream neighbor neurons of the respective neuron are distributed to a set of upstream neighbor neurons of the respective neuron using a distribution function,
   wherein the first apparatus is configured such that the distribution function is a function of
      weights of the artificial neural network, determining a degree of influence of the respective neuron by the set of upstream neighbor neurons of the respective neuron,
      neuron activations of the set of upstream neighbor neurons as manifesting themselves upon the application of the artificial neural network onto the set (16) of items, and
      a sum of preliminarily redistributed relevance scores of the set of downstream neighbor neurons of the respective neuron,
   wherein the system further comprises
   a second apparatus for applying the first apparatus onto a plurality of different sets of items; and
   a third apparatus for detecting a portion of increased relevance within the neural network by accumulating relevance scores assigned to the neurons of the network during the application of the first apparatus onto the plurality of different sets of items, and optimizing the artificial neural network depending on the portion of increased relevance by leaving out some of the interconnections of neurons of the artificial neural network.

30. A processor implemented method for assigning a relevance score to a set of items, the relevance score indicating a relevance with respect to an application of an artificial neural network composed of neurons onto the set of items so as to map the set of items onto a network output, the method comprising
   redistributing an initial relevance score derived from the network output onto the set of items by reversely propagating the initial relevance score through the artificial neural network so as to acquire a relevance score for each item,
   wherein the reverse propagation is performed in a manner so that for each neuron, preliminarily redistributed relevance scores of a set of downstream neighbor neurons of the respective neuron are distributed to a set of upstream neighbor neurons of the respective neuron using a distribution function,
   wherein the distribution function is a function of
      weights of the artificial neural network, determining a degree of influence of the respective neuron by the set of upstream neighbor neurons of the respective neuron,
      neuron activations of the set of upstream neighbor neurons as manifesting themselves upon the application of the artificial neural network onto the set of items, and
      a sum of preliminarily redistributed relevance scores of the set of downstream neighbor neurons of the respective neuron,
   wherein the set of items is, or is a combination of, a picture with each of the items of the set of items corresponding to one or more of the pixels or subpixels of the picture, and/or a video with each of the items of the set of items corresponding to one or more pixels or subpixels of pictures of the video, pictures of the video or picture sequences of the video, and/or an audio signal with each item of the set of items corresponding to one or more audio samples of the audio signal, and/or a feature map of local features or a transform locally or globally extracted from a picture, video or audio signal with the items of the set of items corresponding to local features, and/or a text with the items of the set of items corresponding to words, sentences or paragraphs of the text, and/or a graph such as a social network relations graph with the items of the set of items corresponding to nodes or edges or sets of nodes or a set of edges or subgraphs.

31. A non-transitory digital storage medium having stored thereon a computer program for performing a method for assigning a relevance score to a set of items, the relevance score indicating a relevance with respect to an application of an artificial neural network composed of neurons onto the set of items so as to map the set of items onto a network output, the method comprising redistributing an initial relevance score derived from the network output onto the set of items by reversely propagating the initial relevance score through the artificial neural network so as to acquire a relevance score for each item, wherein the reverse propagation is performed in a manner so that for each neuron, preliminarily redistributed relevance scores of a set of downstream neighbor neurons of the respective neuron are distributed to a set of upstream neighbor neurons of the respective neuron using a distribution function, when said computer program is run by a computer, wherein the distribution function is a function of weights of the artificial neural network, determining a degree of influence of the respective neuron by the set of upstream neighbor neurons of the respective neuron, neuron activations of the set of upstream neighbor neurons as manifesting themselves upon the application of the artificial neural network onto the set of items, and a sum of preliminarily redistributed relevance scores of the set of downstream neighbor neurons of the respective neuron, wherein the set of items is, or is a combination of, a picture with each of the items of the set of items corresponding to one or more of the pixels or subpixels of the picture, and/or a video with each of the items of the set of items corresponding to one or more pixels or subpixels of pictures of the video, pictures of the video or picture sequences of the video, and/or an audio signal with each item of the set of items corresponding to one or more audio samples of the audio signal, and/or a feature map of local features or a transform locally or globally extracted from a picture, video or audio signal with the items of the set of items corresponding to local features, and/or a text with the items of the set of items corresponding to words, sentences or paragraphs of the text, and/or a graph such as a social network relations graph with the items of the set of items corresponding to nodes or edges or sets of nodes or a set of edges or subgraphs.

* * * * *

UNITED STATES PATENT AND TRADEMARK OFFICE
CERTIFICATE OF CORRECTION

PATENT NO. : 12,061,966 B2  
APPLICATION NO. : 15/710455  
DATED : August 13, 2024  
INVENTOR(S) : Sebastian Lapuschkin et al.

Page 1 of 1

It is certified that error appears in the above-identified patent and that said Letters Patent is hereby corrected as shown below:

In the Claims

In Claim 16, Column 52, Lines 5-10 should read:

$$R_{ij} = \left( \alpha \frac{(x_i\, w_{ij})_+}{h\left((b_j)_+ + \Sigma_r (x_r\, w_{rj})_+\right)} - \beta \frac{(x_i\, w_{ij})_-}{h\left((b_j)_- + \Sigma_r (x_r\, w_{rj})_-\right)} \right)$$

$$\cdot\, m\left( \{R_{jk}, k \text{ is downstream neighbor neuron of } j\} \right)$$

Signed and Sealed this  
Fifteenth Day of April, 2025

Coke Morgan Stewart  
*Acting Director of the United States Patent and Trademark Office*